United States Patent
Akiyama et al.

(10) Patent No.: US 11,975,520 B2
(45) Date of Patent: *May 7, 2024

(54) SHEET PROCESSING DEVICE, SHEET LAMINATOR, IMAGE FORMING APPARATUS, AND IMAGE FORMING SYSTEM

(71) Applicant: Ricoh Company, Ltd., Tokyo (JP)

(72) Inventors: Joji Akiyama, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Yohsuke Haraguchi, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,903

(22) Filed: Mar. 8, 2022

(65) Prior Publication Data

US 2022/0194071 A1 Jun. 23, 2022

Related U.S. Application Data

(63) Continuation of application No. 17/306,995, filed on May 4, 2021, now Pat. No. 11,292,240.

(30) Foreign Application Priority Data

May 8, 2020 (JP) .................................. 2020-082571
May 19, 2020 (JP) .................................. 2020-087347

(51) Int. Cl.
*B32B 43/00* (2006.01)
*B32B 37/00* (2006.01)
*B65H 3/06* (2006.01)

(52) U.S. Cl.
CPC ........ *B32B 43/006* (2013.01); *B32B 37/0053* (2013.01); *B65H 3/0669* (2013.01); *B32B 2037/0061* (2013.01)

(58) Field of Classification Search
None
See application file for complete search history.

(56) References Cited

U.S. PATENT DOCUMENTS

| | | | | |
|---|---|---|---|---|
| 5,217,561 A | * | 6/1993 | Ueda ................... | B32B 38/0036 219/508 |
| 6,830,244 B2 | * | 12/2004 | Komatsu ................. | B65H 5/38 271/10.09 |

(Continued)

FOREIGN PATENT DOCUMENTS

| JP | H03-112626 A | 5/1991 |
|---|---|---|
| JP | 9-164593 A | 6/1997 |

(Continued)

OTHER PUBLICATIONS

Office Action issued Jan. 12, 2024 in Japanese Patent Application No. 2020-082571, 5 pages.

*Primary Examiner* — Michael N Orlando
*Assistant Examiner* — Abhishek A Patwardhan
(74) *Attorney, Agent, or Firm* — XSENSUS LLP

(57) ABSTRACT

A sheet processing device is configured to separate a non-bonding portion of a two-ply sheet in which two sheets are overlapped and bonded together at one end as a bonding portion of the two-ply sheet. The sheet processing device includes a first sheet feeder configured to feed the two-ply sheet, a second sheet feeder configured to feed an inner sheet to be inserted between the two sheets of the two-ply sheet in a state in which the non-bonding portion of the two-ply sheet is separated, and circuitry configured to cause the first sheet feeder to feed the two-ply sheet, perform a sheet separating operation on the two-ply sheet to separate the non-bonding (Continued)

portion of the two-ply sheet, and cause the second sheet feeder to start feeding the inner sheet before completion of the sheet separating operation on the two-ply sheet.

8 Claims, 33 Drawing Sheets

(56) References Cited

U.S. PATENT DOCUMENTS

| | | | | |
|---|---|---|---|---|
| 6,893,521 B2* | 5/2005 | Sasaki | ............ | B32B 37/185 |
| | | | | 156/367 |
| 7,946,326 B2* | 5/2011 | Lee | ............ | B65H 5/305 |
| | | | | 156/367 |
| 8,794,618 B2* | 8/2014 | Kondo | ............ | B65H 3/0684 |
| | | | | 271/157 |
| 11,053,090 B1* | 7/2021 | Noviello | ............ | H04N 1/00039 |
| 11,385,588 B2* | 7/2022 | Nozaki | ............ | G03G 15/6591 |
| 2004/0033095 A1* | 2/2004 | Saffari | ............ | G07F 17/3202 |
| | | | | 400/120.01 |
| 2005/0079968 A1* | 4/2005 | Trovinger | ............ | B65H 45/142 |
| | | | | 493/356 |
| 2005/0173063 A1* | 8/2005 | Hiramoto | ............ | B32B 38/004 |
| | | | | 156/324 |
| 2011/0073234 A1* | 3/2011 | Lee | ............ | B32B 37/142 |
| | | | | 156/364 |
| 2011/0248440 A1* | 10/2011 | Sugiyama | ............ | G03G 15/6552 |
| | | | | 271/272 |
| 2014/0062001 A1* | 3/2014 | Nogami | ............ | B65H 3/56 |
| | | | | 271/109 |
| 2016/0257100 A1* | 9/2016 | Tachibana | ............ | B32B 37/0053 |
| 2017/0021603 A1* | 1/2017 | Kikuchi | ............ | B32B 37/182 |
| 2018/0257900 A1 | 9/2018 | Suzuki et al. | | |
| 2018/0259895 A1* | 9/2018 | Shibasaki | ............ | B65H 31/38 |
| 2019/0010011 A1 | 1/2019 | Watanabe et al. | | |
| 2019/0276263 A1 | 9/2019 | Hidaka et al. | | |
| 2019/0284008 A1 | 9/2019 | Sakano et al. | | |
| 2019/0284009 A1 | 9/2019 | Suzuki et al. | | |
| 2019/0284010 A1 | 9/2019 | Asami et al. | | |
| 2019/0284011 A1 | 9/2019 | Furuhashi et al. | | |
| 2019/0284012 A1 | 9/2019 | Yoneyama et al. | | |
| 2019/0367317 A1 | 12/2019 | Haraguchi et al. | | |
| 2020/0140222 A1 | 5/2020 | Takahashi et al. | | |
| 2020/0239265 A1 | 7/2020 | Suzuki et al. | | |
| 2020/0247107 A1 | 8/2020 | Morinaga et al. | | |
| 2020/0247636 A1 | 8/2020 | Furuhashi et al. | | |
| 2020/0270093 A1 | 8/2020 | Suzuki et al. | | |
| 2020/0338877 A1* | 10/2020 | Takahashi | ............ | B65H 3/0638 |
| 2020/0341414 A1 | 10/2020 | Watanabe et al. | | |
| 2020/0385231 A1 | 12/2020 | Kunieda et al. | | |
| 2020/0407187 A1 | 12/2020 | Hidaka et al. | | |
| 2021/0039900 A1 | 2/2021 | Shimazu et al. | | |
| 2021/0039916 A1 | 2/2021 | Sugiyama et al. | | |

FOREIGN PATENT DOCUMENTS

| | | |
|---|---|---|
| JP | H09-150456 A | 6/1997 |
| JP | 2006-160429 A | 6/2006 |
| JP | 2007-090773 A | 4/2007 |
| JP | 2011-068115 A | 4/2011 |

* cited by examiner

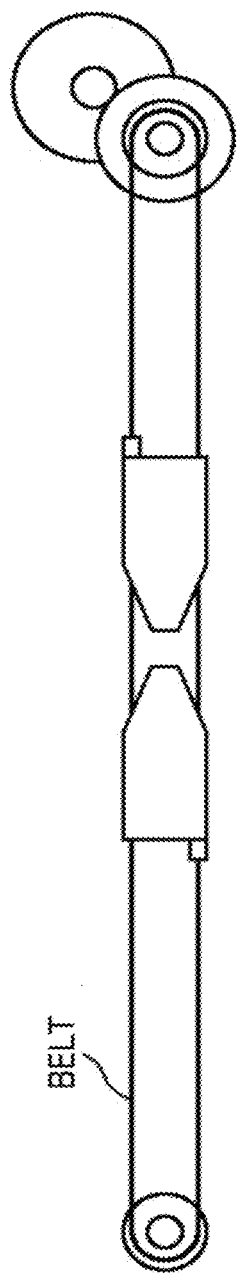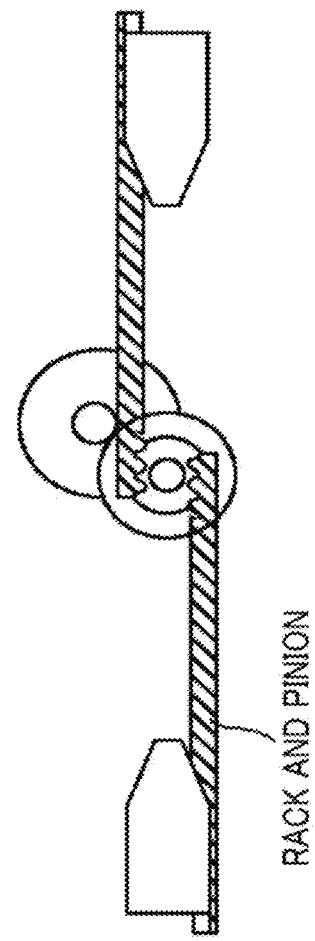

SHEET PROCESSING DEVICE, SHEET LAMINATOR, IMAGE FORMING APPARATUS, AND IMAGE FORMING SYSTEM

CROSS-REFERENCE TO RELATED APPLICATIONS

This patent application is a continuation application of U.S. application Ser. No. 17/306,995, filed May 4, 2021, which is based on and claims priority pursuant to 35 U.S.C. § 119(a) to Japanese Patent Application Nos. 2020-082571, filed on May 8, 2020, and 2020-087347, filed on May 19, 2020, in the Japan Patent Office, the entire disclosure of each of which is hereby incorporated by reference herein.

BACKGROUND

Technical Field

Embodiments of the present disclosure relate to a sheet processing device configured to separate the non-bonding portion of a two-ply sheet in which two sheets are overlapped and bonded together at a bonding portion of the two-ply sheet, a sheet laminator including the sheet separation device, an image forming apparatus including the sheet separation device, such as a copier, a printer, a facsimile machine, and a multi-functional apparatus having at least two functions of the copier, the printer, and the facsimile machine, and an image forming system including the sheet separation device.

Background Art

Various types of sheet separation devices (sheet laminators) are known to separate a two-ply sheet in which two sheets are overlapped and bonded (connected) together at a bonding portion on one end of the two-ply sheet.

Specifically, a known sheet laminator includes the sheet laminator (sheet separation device) is known to provide the technique of sheet lamination that separates two sheets of a laminated sheet that is a two-ply sheet in which one sides of the two sheets are bonded at one end of the two-ply sheet, inserts protective paper that is an inner sheet between the two sheets, and applies heat and pressure to bond the two sheets of the two-ply sheet together.

For example, the known sheet laminator separates a lamination film with the leading ends of two sheets bonded together, by a separation and release device (upper and lower vacuum devices), and then inserts a protected paper sheet between the two sheets of the lamination film.

In addition, a known image forming apparatus including a controller configured to control operations of a fixing device based on the thickness of a lamination sheet, so as to perform desired sheet lamination on the lamination sheet.

SUMMARY

Embodiments of the present disclosure described herein provide a novel sheet processing device that is configured to separate a non-bonding portion of a two-ply sheet in which two sheets are overlapped and bonded together at one end as a bonding portion of the two-ply sheet. The sheet processing device includes a first sheet feeder, a second sheet feeder, and circuitry. The first sheet feeder is configured to feed the two-ply sheet. The second sheet feeder is configured to feed an inner sheet to be inserted between the two sheets of the two-ply sheet in a state in which the non-bonding portion of the two-ply sheet is separated. The circuitry is configured to cause the first sheet feeder to feed the two-ply sheet, perform a sheet separating operation on the two-ply sheet to separate the non-bonding portion of the two-ply sheet, and cause the second sheet feeder to start feeding the inner sheet before completion of the sheet separating operation on the two-ply sheet.

Further, embodiments of the present disclosure described herein provide a sheet laminator including the above-described sheet processing device and a sheet lamination device configured to perform a sheet laminating operation on the two-ply sheet in which an inner sheet is inserted between the two sheets separated by the sheet processing device. Further, embodiments of the present disclosure described herein provide an image forming apparatus including an image forming device configured to form an image on a sheet, and one of the above-described sheet processing device and the above-described sheet laminator.

Further, embodiments of the present disclosure described herein provide an image forming system including an image forming apparatus configured to form an image on a sheet, and one of the above-described sheet processing device and the above-described sheet laminator.

BRIEF DESCRIPTION OF THE SEVERAL VIEWS OF THE DRAWINGS

Exemplary embodiments of this disclosure will be described in detail based on the following figures, wherein:

FIG. 11 including

FIGS. 35A and 35B is a schematic view, each illustrating an example of the drive configuration of the separation claw illustrated in FIG. 34;

FIG. 43 including

Figure 1:
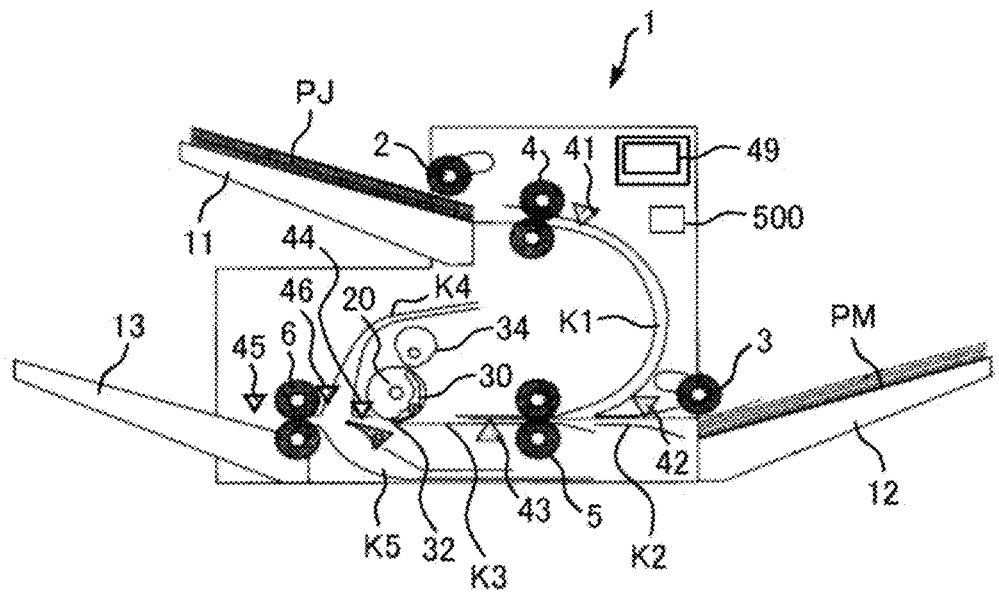
FIG. 1 is a schematic view illustrating the overall configuration of a sheet separation device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a sheet processing device, a sheet laminator, an image forming apparatus, and an image forming system, according to an embodiment of the present disclosure, with reference to drawings. Note that identical parts or equivalents are given identical reference numerals and redundant descriptions are summarized or omitted accordingly.

A description is given of the overall configuration and operations of a sheet separation device 1, with reference to FIG. 1.

The sheet separation device 1 separates the non-bonding portion of a two-ply sheet PJ in which two sheets, which are a first sheet P1 and a second sheet P2, are overlapped and bonded together at one end of the two-ply sheet PJ as a bonding portion A of the two-ply sheet PJ (see FIGS. 10A to 10E and other drawings). The sheet separation device 1 functions as a sheet processing device.

In particular, in the present embodiment, the two-ply sheet PJ is made of the first sheet P1 and the second sheet P2 overlapped and bonded together at one side of four sides as the bonding portion A. That is, in the two-ply sheet PJ including the first sheet P1 and the second sheet P2, one side (the bonding portion A) of the first sheet P1 and one side (the bonding portion A) of the second sheet P2 are connected by, e.g., thermal welding, and the other side of the first sheet P1 and the other side of the second sheet P2 are not connected. As the first sheet P1 and the second sheet P2 constructing the two-ply sheet PJ, a transparent film sheet (that is, a lamination sheet) may be employed.

The sheet separation device 1 separates the first sheet P1 and the second sheet P2 constructing the two-ply sheet PJ, in other words, separates the other side of the two sheets that is opposite the bonding portion A that maintains bonding of the first sheet P1 and the second sheet P2. Subsequently, the sheet separation device 1 performs an operation in which an inner sheet PM is inserted between the separated two sheets, which are the first sheet P1 and the second sheet P2 constructing the two-ply sheet PJ. The inner sheet PM is a sheet including at least one plain sheet or a photograph.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, an ejection tray 13, a first sensor 41, a second sensor 42, a third sensor 43, a fourth sensor 44, a fifth sensor 45, an abnormality detection sensor 46 as an abnormality detector, a winding roller 20, a moving mechanism 30, and a separation claw 16 as a separator (see FIGS. 6A to 6C or FIGS. 10A to 10E). Each of the first conveyance roller pair 4, the second conveyance roller pair 5, and the third conveyance roller pair 6 functions as a conveyance member. The ejection tray 13 functions as a sheet stacker. The sheet separation device 1 further includes a controller 500 that controls sheet conveyance of the sheet (i.e., the two-ply sheet PJ and the inner sheet PM) by performing, e.g., a sheet separating operation, a sheet laminating operation, and a sheet inserting operation. The controller 500 is connected to various drivers driving various parts and units, for example, the above-described parts and units included in the sheet separation device 1.

The sheet separation device 1 further includes a plurality of sheet conveyance passages such as a first sheet conveyance passage K1, a second sheet conveyance passage K2, a third sheet conveyance passage K3, a first branched sheet conveyance passage K4, and a second branched sheet conveyance passage K5. Each of the first sheet conveyance passage K1, the second sheet conveyance passage K2, the third sheet conveyance passage K3, the first branched sheet conveyance passage K4, and the second branched sheet conveyance passage K5 includes two conveyance guides (guide plates) facing each other to guide and convey the sheet such as the two-ply sheet PJ and the inner sheet PM.

In particular, in the present embodiment, the first sheet conveyance passage K1 is a reverse conveyance passage in which the two-ply sheet PJ fed from the first feed tray 11 is reversed upside down. Further, the second sheet conveyance passage K2 is a straight sheet conveyance passage in which the inner sheet PM fed from the second feed tray 12 is not reversed upside down. Then, the first sheet conveyance passage K1 and the second sheet conveyance passage K2 merge at the merging point to connect to the third sheet conveyance passage K3 that is a straight sheet conveyance passage.

To be more specific, the two-ply sheet PJ is loaded on the first feed tray 11. The first feed roller 2 feeds the uppermost two-ply sheet PJ on the first feed tray 11, to the first conveyance roller pair 4, and the first conveyance roller pair 4 conveys the two-ply sheet PJ along the first sheet conveyance passage K1.

Each of the first feed tray 11 and the first feed roller 2 functions as a first sheet feeder to feed the two-ply sheet PJ. The first sheet feeder is controlled by the controller 500. To be more specific, the controller 500 drives and rotates the first feed roller 2 to feed the two-ply sheet PJ from the first feed tray 11.

Further, the inner sheet PM is loaded on the second feed tray 12. Then, the second feed roller 3 feeds the uppermost two-ply sheet PJ on the second feed tray 12.

As described above, each of the second feed tray 12 and the second feed roller 3 functions as a second sheet feeder to feed the inner sheet PM that is a sheet to be inserted between the two sheets, which are the first sheet P1 and the second sheet P2 of the two-ply sheet PJ with the non-bonding portion being separated. Then, the controller causes the second feed roller 3 to drive and rotate as a second sheet feeder, so as to feed the inner sheet PM from the second feed tray 12 as a second sheet feeder.

Then, in the sheet separation device 1 according to the present embodiment, the controller 500 causes the second feed roller 3 (second sheet feeder) to start feeding the inner sheet PM from the second feed tray 12 (second sheet feeder)

after the first feed roller 2 (first sheet feeder) has fed the two-ply sheet PJ from the first feed tray 11 (first sheet feeder) and before the operation to separate the non-bonding portion of the two-ply sheet PJ is completed.

That is, in the present embodiment, the feeding of the two-ply sheet PJ and the feeding of the inner sheet PM are not performed separately (operated by a user via the operation display panel 49) but are performed in a single operation. To be more specific, as a user presses the button on the operation display panel 49 once to start the operation, the sheet separating operation in which the two-ply sheet PJ is fed and separated and the sheet inserting operation in which the inner sheet PM is inserted into the two-ply sheet PJ between the first sheet P1 and the second sheet P2 separated from each other are collectively performed automatically based on the single instruction.

The operation to start feeding the inner sheet PM from the second feed tray 12 is performed not after completion of the sheet separating operation of the two-ply sheet PJ but performed before completion of the sheet separating operation of the two-ply sheet PJ. Therefore, the time required for a series of steps from when the two-ply sheet PJ is fed from the first feed tray 11 to when the inner sheet PM is completely inserted in the two-ply sheet PJ is reduced efficiently, and therefore the productivity of the sheet separation device 1 is enhanced. That is, the time required for the operation from the start to the end performed by the sheet separation device 1 is reduced.

Each of the first conveyance roller pair 4, the second conveyance roller pair 5, and the third conveyance roller pair 6 includes a drive roller and a driven roller, and conveys the sheet nipped by the respective nip regions. The third sheet conveyance passage K3 includes the second conveyance roller pair 5, the winding roller 20, and the third conveyance roller pair 6 in this order from upstream to downstream in the sheet conveyance direction. In particular, the winding roller 20 and the third conveyance roller pair 6 are configured to be rotatable in a forward direction or in a reverse direction. The third conveyance roller pair 6 conveys the sheet in the forward direction that is the left direction in FIG. 1 and in the reverse direction that is the right direction in FIG. 1. The third conveyance roller pair 6 also functions as an ejection roller pair that ejects the sheet to the ejection tray 13.

Each of the first sensor 41, the second sensor 42, the third sensor 43, the fourth sensor 44, and the fifth sensor 45 functions as a sheet detector employing a reflective photosensor that optically detects whether the sheet is present at the position of each sensor. The first sensor 41 is disposed downstream from the first conveyance roller pair 4 in the sheet conveyance direction. The second sensor 42 is disposed downstream from the second feed roller 3 in the sheet conveyance direction. The third sensor 43 is disposed downstream from the second conveyance roller pair 5 in the sheet conveyance direction. The fourth sensor 44 is disposed downstream from the winding roller 20 in the forward direction (that is, the left side of the winding roller 20 in FIG. 1) and upstream from the third conveyance roller pair 6 in the forward direction (that is, the right side of the third conveyance roller pair 6 in FIG. 1). The fifth sensor 45 is disposed downstream from the third conveyance roller pair 6 in the forward direction (that is, the left side of the third conveyance roller pair 6 in FIG. 1).

A description is given of the winding roller 20 with reference to FIGS. 2A, 2B, 3A, 3B, 5B, 5C, 5D, and 6A.

Figure 5A:
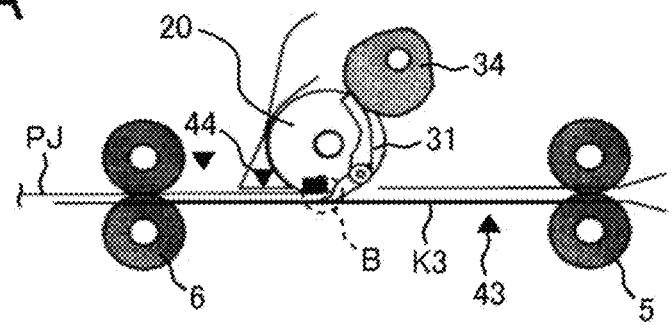
FIGS. 5A to 5D are schematic views, each illustrating the sheet separating operation performed in the sheet separation device, subsequent from the sheet separating operation of FIGS. 4A to 4D.
Figure 5B:
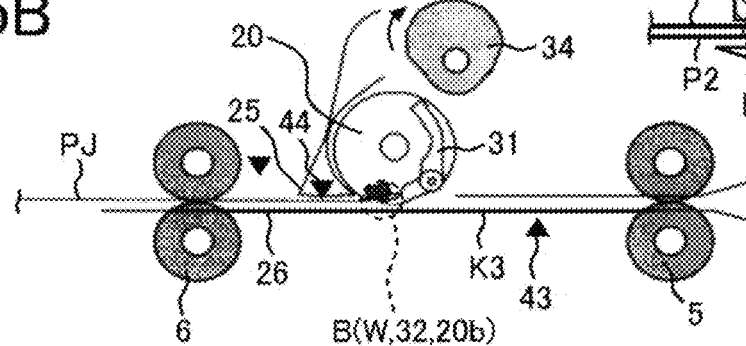

The winding roller 20 functions as a roller including a gripper 32 (handle) that grips a gripped portion B of the two-ply sheet PJ at a winding start position W (see FIG. 5B). The gripped portion B is an end of the two-ply sheet PJ that is opposite an end at which the bonding portion A is formed and also is a leading end of the two-ply sheet PJ in the sheet conveyance direction to be conveyed in the right direction in FIG. 1, which is referred to as the other end of the two-ply sheet PJ. In a state in which the gripper 32 grips the gripped portion B of the two-ply sheet PJ, the winding roller 20 rotates in a predetermined rotational direction (counterclockwise direction in FIGS. 5B to 5D) to wind the two-ply sheet PJ around the winding roller 20. The winding roller 20 is rotatable about a rotary shaft 20a in the forward direction and in the reverse direction. The controller 500 controls a drive motor that drives the winding roller 20.

To be more specific, the two-ply sheet PJ starts from the first feed tray 11 and passes through the first sheet conveyance passage K1, and the second conveyance roller pair 5 conveys the two-ply sheet PJ in the forward direction along the third sheet conveyance passage K3. The two-ply sheet PJ passes through the winding start position W of the winding roller 20 once and is conveyed to a position of the third conveyance roller pair 6 that is a position at which the trailing end of the two-ply sheet PJ passes through the fourth sensor 44 but does not pass through the third conveyance roller pair 6, that is, the position before the third conveyance roller pair 6. Thereafter, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed in a state in which the other end (leading end) of the two-ply sheet PJ is nipped, and the winding roller 20 rotates in the counterclockwise direction in FIG. 1 to wind the two-ply sheet PJ around the winding roller 20.

Figure 5C:
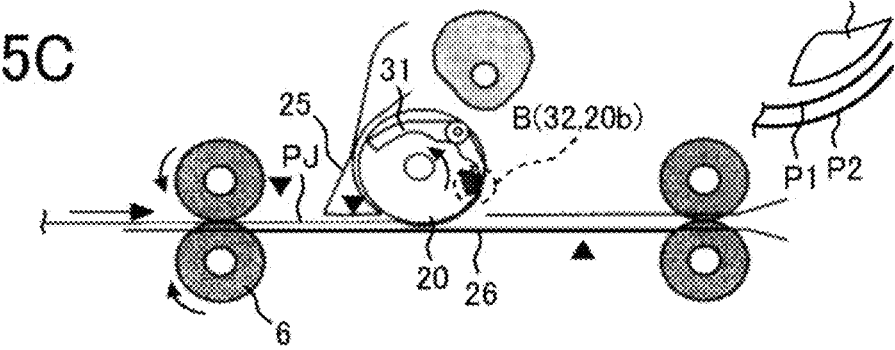
Figure 5D:
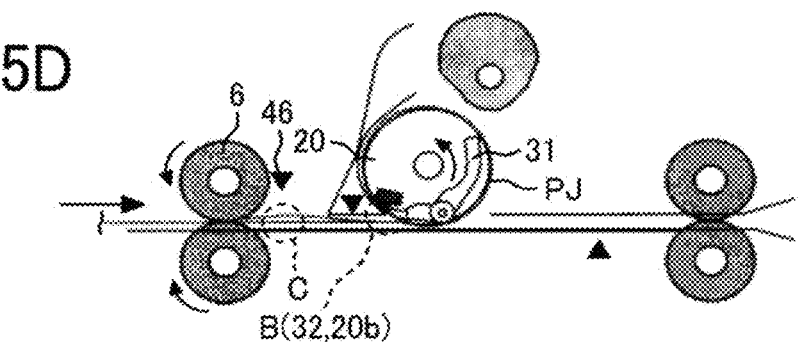
Figure 6A:
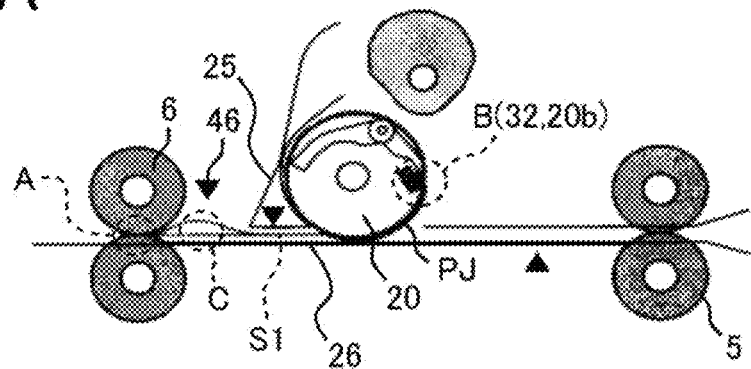
FIGS. 6A to 6C are schematic views, each illustrating the sheet separating operation performed in the sheet separation device, subsequent from the sheet separating operation of each of FIGS. 5A to 5D.

With reference to FIG. 5C', when the two-ply sheet PJ is wound around the winding roller 20, the length of a sheet wound around the winding roller 20 is proportional to the diameter of the winding roller 20. Therefore, since a first sheet P1 is on the inner side to the center of the winding roller 20, that is, closer to the inner circumferential surface of the winding roller 20, than a second sheet P2 on the outer side to the center of the winding roller 20, that is, closer to the outer circumferential surface of the winding roller 20, the length of the first sheet P1 wound around the winding roller 20 is shorter than the length of the second sheet P2 wound around the winding roller 20. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. The misalignment causes the first sheet P1 to slack and bend toward the second sheet P2, forming a gap C between the two sheets, which are the first sheet P1 and the second sheet P2, in the vicinity of the bonding portion A of the two-ply sheet PJ, as illustrated in FIGS. 5D and 6A. In other words, when the first sheet P1 that is placed on the second sheet P2 is warped upward, the gap C is formed between the first sheet P1 and the second sheet P2 at one end of the two-ply sheet PJ, that is, the upstream side in the sheet conveyance direction when the two-ply sheet PJ is conveyed in the right direction in FIG. 1. As described above, the first sheet P1 and the second sheet P2 that are in close contact with each other without any gap are separated from each other.

Particularly in the present embodiment, in order to significantly form the gap C as described above, that is, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 to wind the two-ply sheet PJ around the rotary shaft 20a, the two-ply sheet PJ is separatable without increasing the size and cost of the sheet separation device 1.

Here, as illustrated in FIG. 5B', the gripper 32 in the present embodiment is configured to grip the gripped portion B of the two-ply sheet PJ without contacting the end surface of the other end of the two-ply sheet PJ, in other words, without contacting the end surface close to the gripped portion B and close to the leading end of the two-ply sheet PJ in the sheet conveyance direction in which the two-ply sheet PJ is conveyed in the right side direction in FIG. 1. By so doing, the two-ply sheet PJ is wound around the winding roller 20 starting from the other end (leading end) of the two-ply sheet PJ in a state in which the other ends (leading ends) of the first sheet P1 and the other ends (leading ends) of the second sheet P2 of the two-ply sheet PJ remain stationary.

To be more specific, the gripper 32 is configured to nip and grip the gripped portion B of the two-ply sheet PJ between the gripper 32 and a receiving portion 20b of the winding roller 20 without causing any member to contact the end surface of the other end of the two-ply sheet PJ, in other words, without causing any member to hit or contact the end surface of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 in a state in which a specific member such as the gripper 32 contacts the end surface of the other end (that is the leading end face). The two-ply sheet PJ is nipped and gripped by the gripper 32 and the receiving portion 20b while the end surface of the other end (leading end face) does not contact any member. In this state, the gripper is located close to the second sheet P2 on the outer side to the center of the winding roller 20 and the receiving portion 20b is located close to the first sheet P1 on the inner side to the center of the winding roller 20.

Therefore, when compared with a configuration in which the leading end face of the two-ply sheet PJ contacts a member, the above-described structure according to the present embodiment restrains damage on the two-ply sheet PJ (particularly, the leading end). In particular, once the leading end face of the two-ply sheet PJ is damaged, it is difficult to perform lamination on the damaged leading end face. Therefore, the configuration of the present disclosure is useful.

Note that, in the present embodiment, the bonding portion A of the two-ply sheet PJ wound around the winding roller 20 is the one end of the two-ply sheet PJ. The one end is opposite to the other end functioning as the gripped portion B.

In the present embodiment, at least one of the gripper 32 (handle) and the receiving portion 20b is made of elastic material such as rubber.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, the sheet separation device 1 including the gripper 32 and the receiving portion 20b made of the elastic material easily exhibits the above-described effect.

As illustrated in FIGS. 2A to 3B, the moving mechanism 30 moves the gripper 32 between a gripping position (e.g., the position illustrated in FIGS. 2A and 3A) at which the gripper 32 grips the two-ply sheet PJ and a releasing position (e.g., the position illustrated in FIGS. 2B and 3B) at which the gripper 32 is released from the gripping position.

To be more specific, the moving mechanism 30 includes an arm 31, a compression spring 33, a cam 34, and a motor. The compression spring 33 functions as a biasing member. The motor drives to rotate the cam 34 in the forward direction or the reverse direction.

The arm 31 holds the gripper 32. The arm 31 and the gripper 32 are held together by the winding roller 20 to be rotatable together about a support shaft 31a. In the present embodiment, the gripper 32 is connected to the tip of the arm 31, and the gripper 32 and the arm 31 are made (held) as a single unit. Alternatively, the gripper 32 and the arm 31 may be made as separate members, and the gripper 32 may be mounted on the arm 31, that is, may be held by the arm 31. In any case, the arm 31 holding the gripper 32 rotates about the rotary shaft 20a together with the winding roller 20.

Figure 2A:
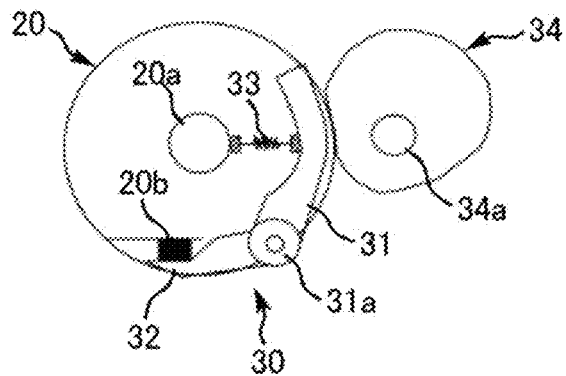
FIG. 2A is a side view illustrating a gripper that has moved to a gripping position in the sheet separation device illustrated in FIG. 1
Figure 2B:
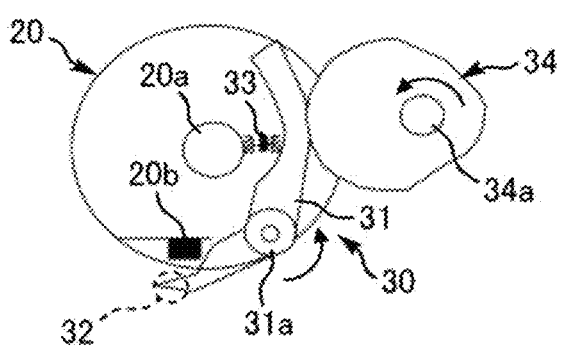
FIG. 2B is a side view illustrating the gripper that has moved to a releasing position in the sheet separation device illustrated in FIG. 1.

The compression spring 33 functions as a biasing member that biases the arm 31 so that the gripper 32 moves from the releasing position illustrated in FIG. 2B to the gripping position illustrated in FIG. 2A. To be more specific, one end of the compression spring 33 is connected to a fixed position near the rotary shaft 20a, and the other end of the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 that functions as the biasing member, so that the gripper 32 moves from the gripping position illustrated in FIG. 2A to the releasing position illustrated in FIG. 2B. The motor controlled by the controller 500 drives the cam 34 to rotate in the forward direction or the reverse direction at a desired rotation angle. The cam 34 is held by the housing of the sheet separation device 1 so as to be rotatable about a cam shaft 34a of the cam 34, separately from the winding roller 20.

In the moving mechanism 30 configured as described above, as illustrated in FIGS. 2A and 3A, in a state in which the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

Figure 3A:
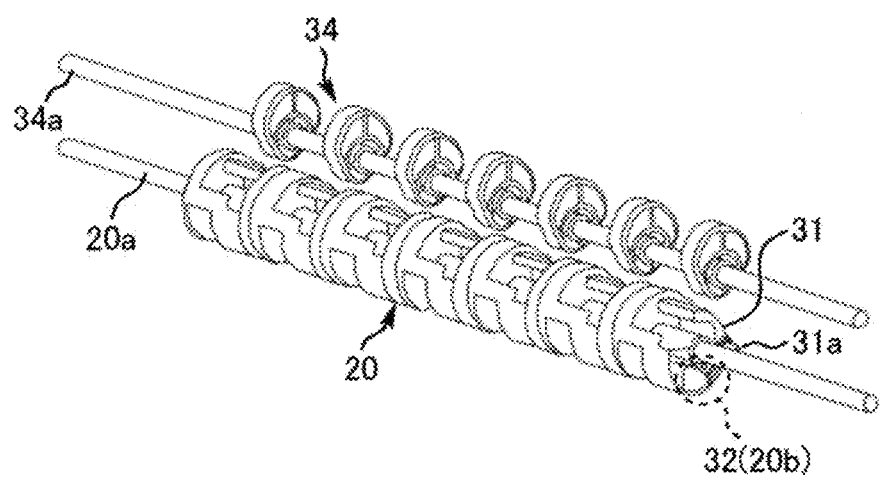
FIG. 3A is a perspective view illustrating the gripper that has moved to the gripping position in the sheet separation device illustrated in FIG. 1
Figure 3B:
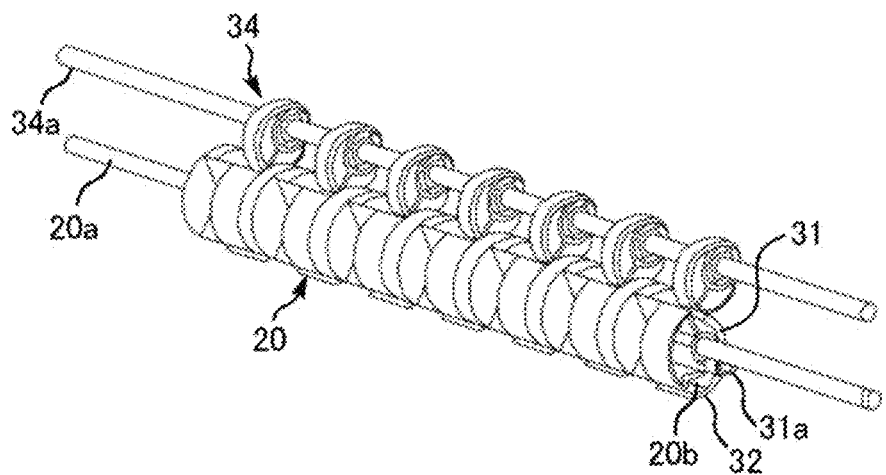
FIG. 3B is a perspective view illustrating the gripper that has moved to the releasing position in the sheet separation device illustrated in FIG. 1.

By contrast, as illustrated in FIGS. 2B and 3B, in a state in which the cam 34 is contacts and presses the arm 31, the arm 31 rotates in the counterclockwise direction in FIG. 2B about the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

Note that, in the present embodiment, as illustrated in FIGS. 3A and 3B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions separated in the axial direction to grip the two-ply sheet PJ as described above, that is, not setting the entire area of the winding roller 20 and the cam 34 in the axial direction to grip the two-ply sheet PJ share load necessary to grip the two-ply sheet PJ. The above-described configuration is useful when a gripping force required to grip the two-play sheet PJ increases.

Figure 4A:
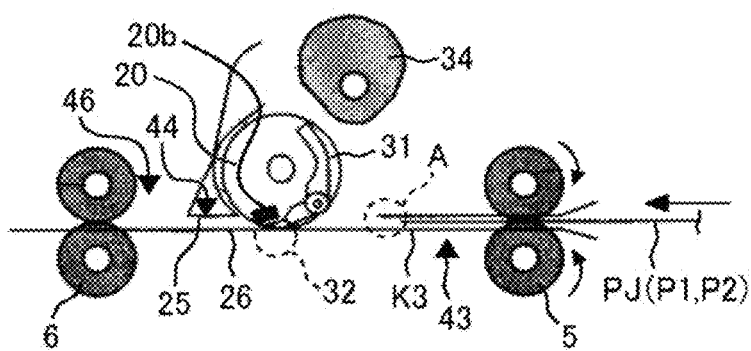
FIGS. 4A to 4D are schematic views, each illustrating the sheet separating operation performed in the sheet separation device illustrated in FIG. 1.
Figure 4B:
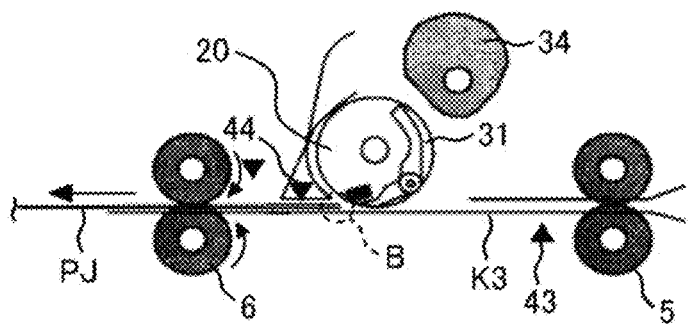
Figure 4C:
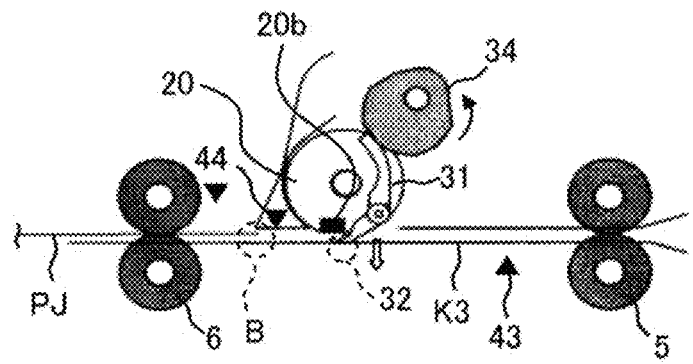
Figure 4D:
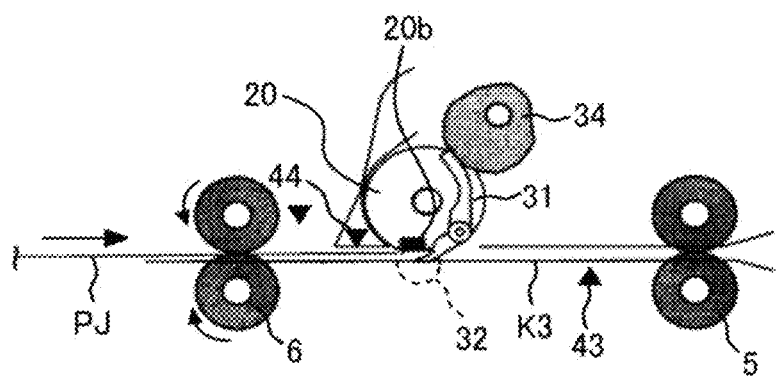

Here, a description is given of the fourth sensor 44 in the sheet separation device 1 according to the present embodiment, with reference to FIGS. 1, 4D, and 5A.

The fourth sensor 44 functions as a sheet detector to detect the two-ply sheet PJ conveyed between the winding roller 20 and the third conveyance roller pair 6. The fourth sensor 44 detects the leading end of the two-ply sheet PJ conveyed to the winding roller 20 in the sheet conveyance direction by the third conveyance roller pair 6. Based on the detection results detected by the fourth sensor 44, the controller 500 controls the moving mechanism 30.

To be more specific, the fourth sensor 44 is disposed in the sheet conveyance passage between the winding roller 20 and the third conveyance roller pair 6. As illustrated in FIGS. 4D and 5A, when the third conveyance roller pair 6 conveys the two-ply sheet PJ in the reverse direction toward the position of the winding roller 20 with the gripped portion B of the two-ply sheet PJ being the leading end, the fourth sensor 44 detects the leading end (that is, the tip of one end of the gripped portion B) of the two-ply sheet PJ conveyed in the reverse direction. In response to the detection timing at which the fourth sensor 44 detects the leading end (in the reverse direction) of one end of the gripped portion B, the controller 500 adjusts and controls a timing to stop the two-ply sheet PJ at the gripping position and a timing at which the gripper 32 grips the gripped portion B. To be more specific, after a predetermined time has passed since the fourth sensor 44 detected the leading end of the two-ply sheet PJ, the third conveyance roller pair 6 stops the reverse direction conveyance of the two-ply sheet PJ, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the other end (leading end) of the two-ply sheet PJ is nipped by the gripper 32 and the receiving portion 20b without contacting the end surface of the two-ply sheet PJ on any member.

As described above, the third conveyance roller pair 6 is a sheet conveying roller pair that conveys the two-ply sheet PJ with the other end (i.e., the gripped portion B) as a leading end, toward the winding start position W of the winding roller 20 in the third sheet conveyance passage K3 (sheet conveyance passage) between the third conveyance roller pair 6 and the winding roller 20.

Now, a description is given of the separation claws 16 each functioning as a separator, with reference to FIGS. 6A to 6C, 9, 10A to 10E, and 12.

Figure 10A:
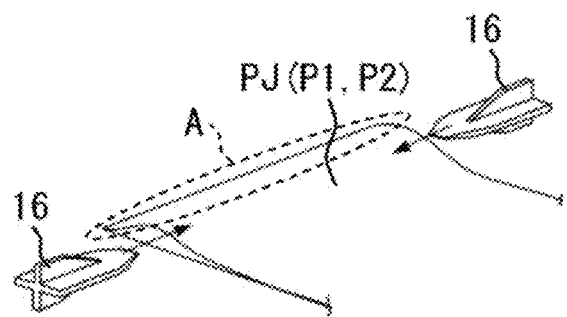
FIGS. 10A to 10E are perspective views, each illustrating the operation of the separation claws.

Each of the separation claws 16 is a claw-shaped member that moves from the standby position illustrated in FIG. 10A and is inserted into the gap C formed between the first sheet P1 and the second sheet P2 of the two-ply sheet PJ at a predetermined position of the two-ply sheet PJ.

To be more specific, the separation claws 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ in a state in which the other end (that is the gripped portion B) is wound by the winding roller 20 and the one end (that is the bonding portion A) is nipped by the third conveyance roller pair 6.

Figure 6B:
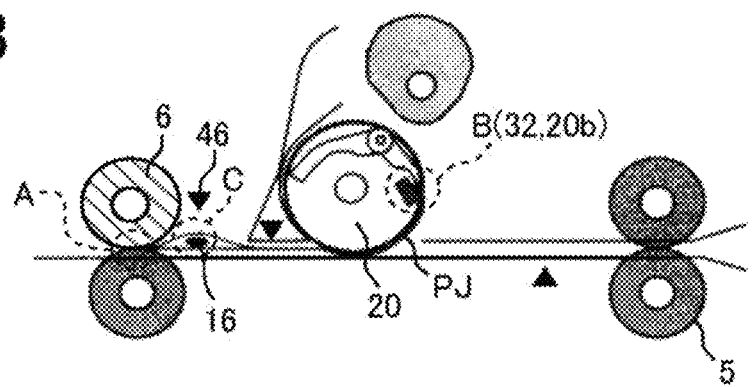
Figure 6C:
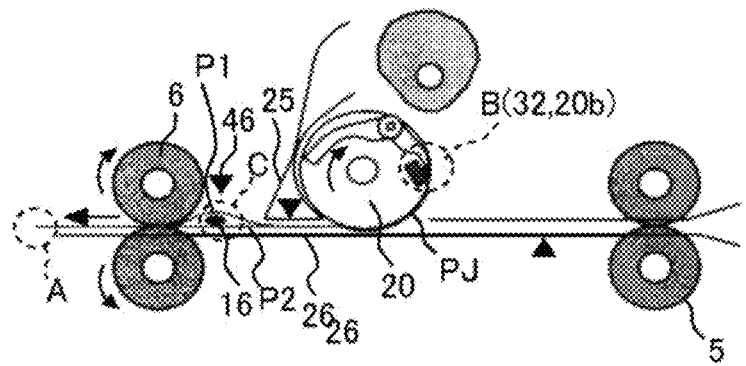
Figure 9:
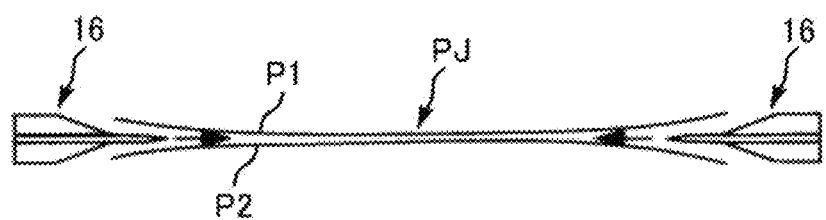
FIG. 9 is a schematic view illustrating separation claws inserted into a two-ply sheet in a width direction of the two-ply sheet.
Figure 12:
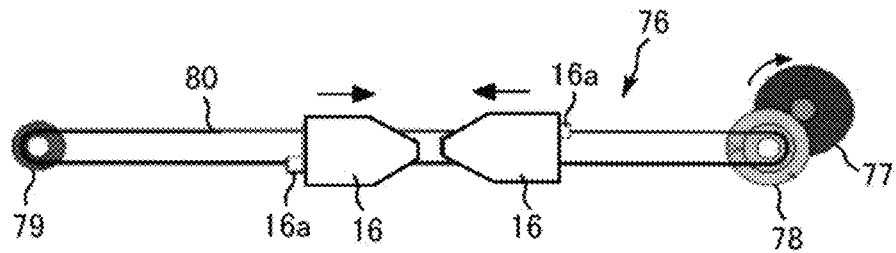
FIG. 12 is a schematic view illustrating the configuration of a moving mechanism to move the separation claws.

More specifically, in the present embodiment, the separation claws 16 are a pair of separation claws that functions as a pair of separators disposed at both sides of the two-ply sheet PJ in the width direction that is the direction perpendicular to a plane on which FIGS. 6A to 6C are illustrated and the horizontal direction in FIGS. 9 and 12. As illustrated in FIGS. 10A to 10E, the vertical length of each of the separation claws 16 in the vertical direction (thickness direction) of the two-ply sheet PJ gradually increases from the tip of each of the separation claws 16 near the center in the width direction of the two-ply sheet PJ, to the rear end of the separation claw 16 near the outsides in the width direction of the two-ply sheet PJ. Further, the separation claws 16 are movable in the width direction of the two-ply sheet PJ by a driving device 76 (see FIG. 12) controlled by the controller 500.

Figure 10B:
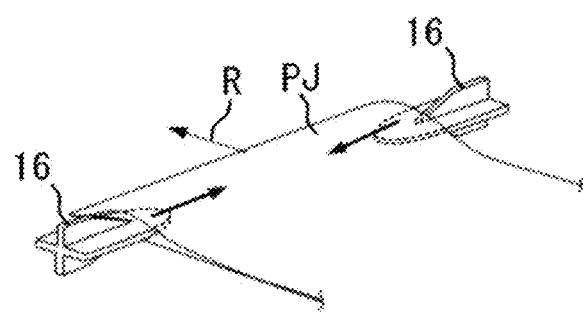

The separation claws 16 configured as described above ordinarily stand by at respective standby positions at which the separation claws 16 do not interfere with conveyance of the sheet such as the two-ply sheet PJ in the third sheet conveyance passage K3. As illustrated in FIG. 10A, the standby positions of the separation claws 16 are outside of the two-ply sheet PJ (including the first sheet P1 and the second sheet P2) in the width direction of the two-ply sheet PJ. Subsequently, as illustrated in FIGS. 9 and 10B, the separation claws 16 enter the gap C in the two-ply sheet PJ when separating the two-ply sheet PJ (including the first sheet P1 and the second sheet P2). As a result, the separation claws 16 secure the gap C to be relatively large.

As illustrated in FIG. 12, the driving device 76 that moves the pair of separation claws 16 in the width direction includes a motor 77, a gear pulley 78, a pulley 79, and a timing belt 80. The gear pulley 78 has a step-like ring shape including a gear and a pulley. The gear meshes with a motor gear mounted on a motor shaft of the motor 77. The pulley stretches and supports the timing belt 80 together with the pulley 79. One separation claw 16 of the pair of separation claws 16 includes a fixed portion 16a that is fixed to a part of the belt surface of the timing belt 80 that is the upper side of the belt surface in FIG. 12. The other separation claw 16 includes a fixed portion 16a that is fixed to a part of the other belt surface of the timing belt 80 that is the lower side of the belt surface in FIG. 12.

In the driving device 76 as configured described above, the motor 77 drives to rotate the motor shaft in a direction indicated by arrow in FIG. 12 (i.e., clockwise direction), the gear pulley 78 rotates counterclockwise, the timing belt 80 rotates in the counterclockwise direction, and the pair of separation claws 16 moves from the outside in the width direction of the two-ply sheet PJ to the center in the width direction of the two-ply sheet PJ (that is, the pair of separation claws 16 approaches each other). By contrast, when the motor 77 drives to rotate the motor shaft in the direction opposite to the arrow direction in FIG. 12, the pair of separation claws 16 moves from the center in the width direction of the two-ply sheet PJ toward the outside in the width direction of the two-ply sheet PJ (that is, the pair of the separation claws 16 moves in a direction away from each other).

In a state in which the separation claws 16 are inserted into the gap C in the two-ply sheet PJ, the separation claws 16 relatively move from the one end of the two-ply sheet PJ near the bonding portion A to the other end of the two-ply sheet PJ near the gripped portion B. Then, the separation claws 16 move in the width direction between the first sheet P1 and the second sheet P2 at the other end of the two-ply sheet PJ.

Figure 10C:
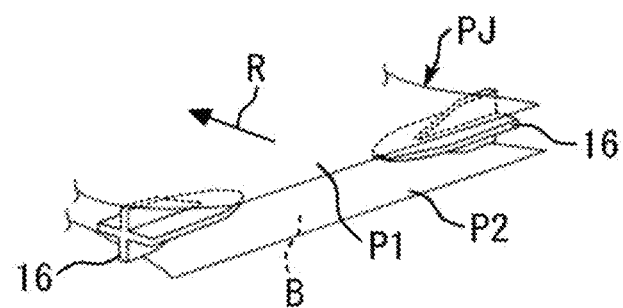
Figure 10D:
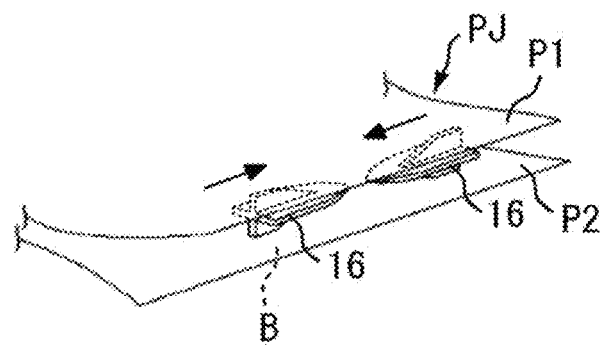

Specifically, the controller 500 controls the driving device 76 (see FIG. 12) to move the pair of separation claws 16 as follows. As illustrated in FIGS. 10B and 10C, the pair of separation claws 16 is inserted into both ends of the gap C in the two-ply sheet PJ in the width direction and relatively moves to the other end of the two-ply sheet PJ that is the gripped portion B. After the pair of separation claws 16 has relatively moved to the other end of the two-ply sheet PJ, as illustrated in FIG. 10D, the pair of separation claws 16 on the other end of the two-ply sheet PJ moves in the width direction from both ends of the two-ply sheet PJ to the center of the two-ply sheet PJ between the first sheet P1 and the second sheet P2. In order to cause the pair of separation claws 16 to move as described above, the driving device 76 is configured so that the pair of separation claws 16 moves from the standby positions to the positions at which the separation claws 16 come close to each other.

The above-described mechanism, which includes the winding roller 20 to wind the two-ply sheet PJ and the separation claws 16 to be inserted into the two-ply sheet PJ so as to separate the two-ply sheet PJ, reduces the size of the sheet separation device 1, when compared with a mechanism using a large-scale device such as a vacuum device to separate the two-ply sheet PJ. That is, without increasing the size of the sheet separation device 1, the above-described mechanism reliably separates the first sheet P1 and the second sheet P2 constructing the two-ply sheet PJ.

In particular, since the separation claws 16 in the present embodiment move over substantially the entire area in the width direction of the two-ply sheet PJ on the other end of the two-ply sheet PJ (that is, the trailing end of the two-ply sheet PJ in the forward direction), the separation claws 16 sufficiently separate (in other words, peel) the other ends of the first sheet P1 and the second sheet P2 constructing the two-ply sheet PJ that is opposite the bonding portion A. Therefore, it is less likely that the above-described configuration causes an inconvenience that the other end of the two-ply sheet PJ that is opposite the bonding portion A is not sufficiently separated and that the inner sheet PM (see FIG. 10E) would not be inserted into the other end of the two-ply sheet PJ from the other end of the two-ply sheet PJ. Additionally, the above-described configuration allows the separation claws 16 to easily function as a switcher, that is, to separately guide the first sheet P1 and the second sheet P2 to the first branched sheet conveyance passage K4 and the second branched sheet conveyance passage K5, respectively.

Here, a description is given of the separation claws 16 that functions as a switcher, with reference to FIGS. 7A to 10E.

Figure 7A:
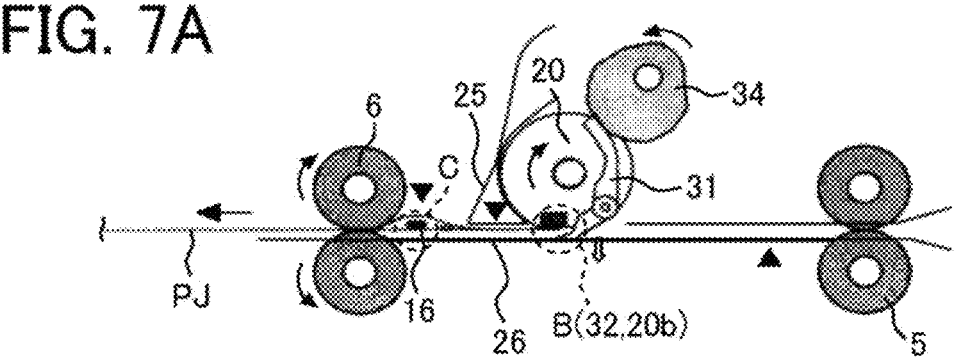
FIGS. 7A to 7C are schematic views, each illustrating the sheet separating operation performed in the sheet separator, subsequent from the sheet separating operation of FIGS. 6A to 6C.
Figure 7B:
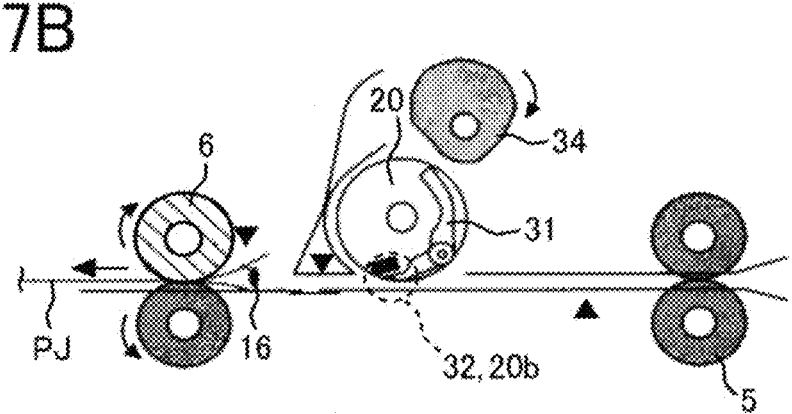
Figure 7C:
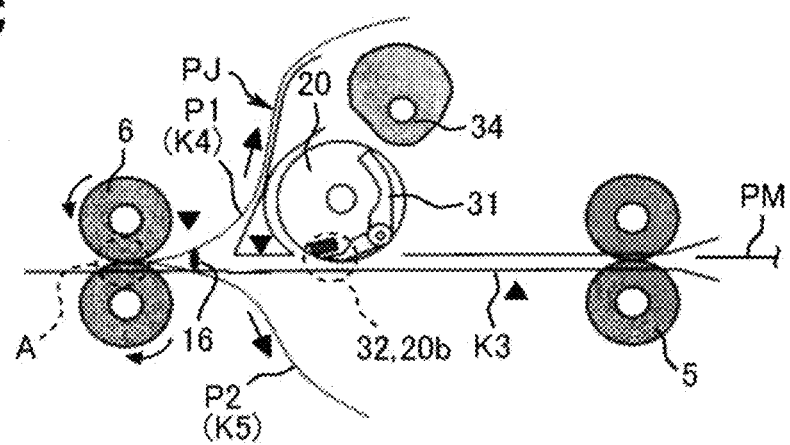

In the present embodiment, the separation claws 16 that functions as a separator also function as a switcher that guides the first sheet P1 and the second sheet P2 separated by the separation claws 16, to the first branched sheet conveyance passage K4 and the second branched sheet conveyance passage K5 branching off in different directions, respectively (see FIG. 7C).

To be more specific, as illustrated in FIG. 7C, the first branched sheet conveyance passage K4 and the second branched sheet conveyance passage K5 branch off in different directions from the third sheet conveyance passage K3 between the winding roller 20 and each of the separation claws 16 (separator). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 7A to 7C, after the separation claws 16 are inserted into the gap C, the third conveyance roller pair 6 conveys the one end of the two-ply sheet PJ to the left side in FIGS. 7A to 7C so that the winding of the other end of the two-ply sheet PJ on the winding roller 20 is released (see FIG. 10A to FIG. 10C). After the winding of the other end of the two-ply sheet PJ on the winding roller 20 is released, the separation claws 16 move to the center in the width direction of the two-ply sheet PJ as illustrated in FIG. 10D, and stop at the center in the width direction of the two-ply sheet PJ. Then, while the separation claws 16 remain in the above-described state, the third conveyance roller pair 6 conveys the other end of the two-ply sheet PJ to the right side in FIGS. 7A to 7C again. Thereafter, the separation claws 16 guide the first sheet P1 and the second sheet P2 separated by the separation claws 16, to the first branched sheet conveyance passage K4 and the second branched sheet conveyance passage K5, respectively. That is, the first sheet P1 is guided to the first branched sheet conveyance passage K4, and the second sheet P2 is guided to the second branched sheet conveyance passage K5. Subsequently, as illustrated in FIGS. 8A to 8C and 10E, the separation claws 16 move to the standby positions, and the second conveyance roller pair 5 conveys the inner sheet PM to the one end of the third sheet conveyance passage K3, that is, the right side in FIGS. 8A to 8C, to insert the inner sheet PM between the first sheet P1 and the second sheet P2 separated from the two-ply sheet PJ.

As described above, each of the separation claws 16 in the present embodiment functions as a separator that separates (in other words, peels) the non-bonding portion of the first sheet P1 and the second sheet P2 constructing the two-ply sheet PJ, and also functions as a switcher that separately guides the separated two sheets, which are the first sheet P1 and the second sheet P2, to the first branched sheet conveyance passage K4 and the second branched sheet conveyance passage K5, respectively. Accordingly, the above-described configuration reduces the size and cost of the sheet separation device 1, when compared with the configuration of a sheet separation device including the separator and the switcher as different units. That is, the above-described configuration efficiently and reliably separates the first sheet P1 and the second sheet P2 constructing the two-ply sheet PJ.

Note that each separation claw 16 in the present embodiment functions as both a separator and a switcher. However, the sheet separation device 1 according to the present embodiment may further include a member that functions as a switcher, different from the separation claw 16 that functions as a separator.

Here, a description is given of a first guide 25 provided in the sheet separation device 1 according to the present embodiment, with reference to, for example, FIGS. 6A to 7C.

The first guide 25 is disposed between the separation claws 16 and the winding roller in the third sheet conveyance passage K3. The first guide 25 functions as a limiter to limit an amount of slack (in other words, a deflection amount) of the first sheet P1 that is wound around the winding roller 20 on the inner side of the first sheet P1 and the second sheet P2 of the two-ply sheet PJ wound around the winding roller 20.

To be more specific, the first guide 25 that functions as a limiter is a conveyance guide disposed on the side in which the winding roller 20 is disposed with respect to an imaginary plane S1, that is, above the imaginary plane S1 in FIG. 6A, in the third sheet conveyance passage K3. The imaginary plane S1 (see FIG. 6A) is an imaginary plane passing through the winding start position W of the winding roller 20 and the nip region of the third conveyance roller pair 6 in the third sheet conveyance passage K3. The first guide 25 has a shape like substantially a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third sheet conveyance passage K3 and a conveyance guide of the first branched sheet conveyance passage K4. That is, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits bending the two-ply sheet PJ upward (in particular, bending the first sheet P1 upward) between the winding roller 20 and the third conveyance roller pair 6. Therefore, the gap C in the two-ply sheet PJ that is mainly formed by bending the first sheet P1 upward is intensively formed between the first guide 25 and the third conveyance roller pair 6. Accordingly, the above-described configuration increases the size of the gap C even if the winding amount of the two-ply sheet PJ wound around the winding roller 20 is not large, and the separation claws 16 smoothly enter the gap C to separate the two-ply sheet PJ.

Now, a description is given of a second guide 26 provided in the sheet separation device 1 according to the present embodiment, with reference to FIGS. 6A to 7C.

The second guide 26 is disposed between the separation claws 16 and the winding roller 20 in the third sheet conveyance passage K3. The second guide 26 functions as a guide to guide the second sheet P2 that is an outer sheet of the two sheets P1 and P2 of the two-ply sheet PJ wound around the winding roller 20.

To be more specific, the second guide 26 that functions as a guide is a sheet conveyance guide disposed on the side in which the winding roller 20 is not disposed with respect to the imaginary plane S1, that is, below the imaginary plane S1 in FIG. 6A, in the third sheet conveyance passage K3. The second guide 26 is disposed to face the lower surface of the sheet from a portion close and upstream from the second conveyance roller pair in the forward direction to a portion downstream from the third conveyance roller pair 6 in the forward direction. That is, the second guide 26 guides the sheet conveyed on the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness is conveyed. Since this setting limits a gap between the first sheet P1 and the second sheet P2 constructing the two-ply sheet PJ so as not to be too large between the first guide 25 and the second guide 26, the gap C in the two-ply sheet PJ that is mainly formed by bending the first sheet P1 upward is intensively formed. Accordingly, the separation claws 16 smoothly enter the gap C to separate the two-ply sheet PJ.

Here, a description is given of the abnormality detection sensor 46, with reference to FIGS. 6A to 6C.

The abnormality detection sensor 46 functions as an abnormality detector to detect an abnormal state in which the gap C formed between the first sheet P1 and the second sheet P2 at a predetermined position (that is, a position between the third conveyance roller pair 6 and the winding roller 20) is not larger than a predetermined size before movements of the separation claws 16 from the standby positions (that is, movements from the standby positions illustrated in FIG. 12 to the separation positions illustrated in FIGS. 9 and 10A). The predetermined size is a size of the gap C into which the separation claws 16 enter and is determined by experiments. That is, the abnormality detection sensor 46 that functions as the abnormality detector detects the abnormal state in which the gap C formed between the first sheet P1 and the second sheet P2 at a predetermined position is not larger than the predetermined size before the separation claws 16 are inserted into the gap C.

In other words, at a timing at which the gap C is formed between the first sheet P1 and the second sheet P2, as illustrated in FIGS. 5D, 6A, and 6C, the abnormality detection sensor 46 that functions as the abnormality detector detects the abnormal state such as a state in which the gap is not formed at all or a state in which the gap is not formed as a sufficient gap C.

In the present embodiment, the controller 500 notifies occurrence of an abnormal state when the abnormal state is detected by the abnormality detection sensor 46 that is the abnormality detector. To be more specific, as illustrated in FIG. 1, the sheet separation device 1 includes an operation display panel 49 that functions as an operation display device on the exterior of the sheet separation device 1 to display various kinds of information about the sheet separation device 1 and input various kinds of commands. When the controller 500 determines the abnormal state based on the results detected by the abnormality detection sensor 46, that is, when the two-ply sheet PJ does not have the sufficiently large gap C, the controller 500 controls the operation display panel 49 to display that the abnormal state is detected. For example, the operation display panel 49 displays "Since an abnormality has occurred, the process of inserting the inner sheet is stopped. Please check the setting direction of the two-ply sheet in the first feed tray. If the setting direction is correct and similar abnormalities are repeated, please contact a service person."

The above-described abnormality detection sensor 46 that functions as the abnormality detector device may be, for example, a lever type sensor that comes into contact with the upper first sheet P1 of the two-ply sheet PJ forming the gap C larger than the predetermined size.

Now, a description is given of the operations performed in the sheet separation device 1 to separate the two-ply sheet PJ, with reference to FIGS. 4 to 8C.

Further, in the description of the operations, the operations of the separation claws 16 are appropriately described with reference to FIGS. 9 to 10E, and the control flow is described with reference to a flowchart of FIG. 11, that is, FIGS. 11A and 11B.

Figure 11A:
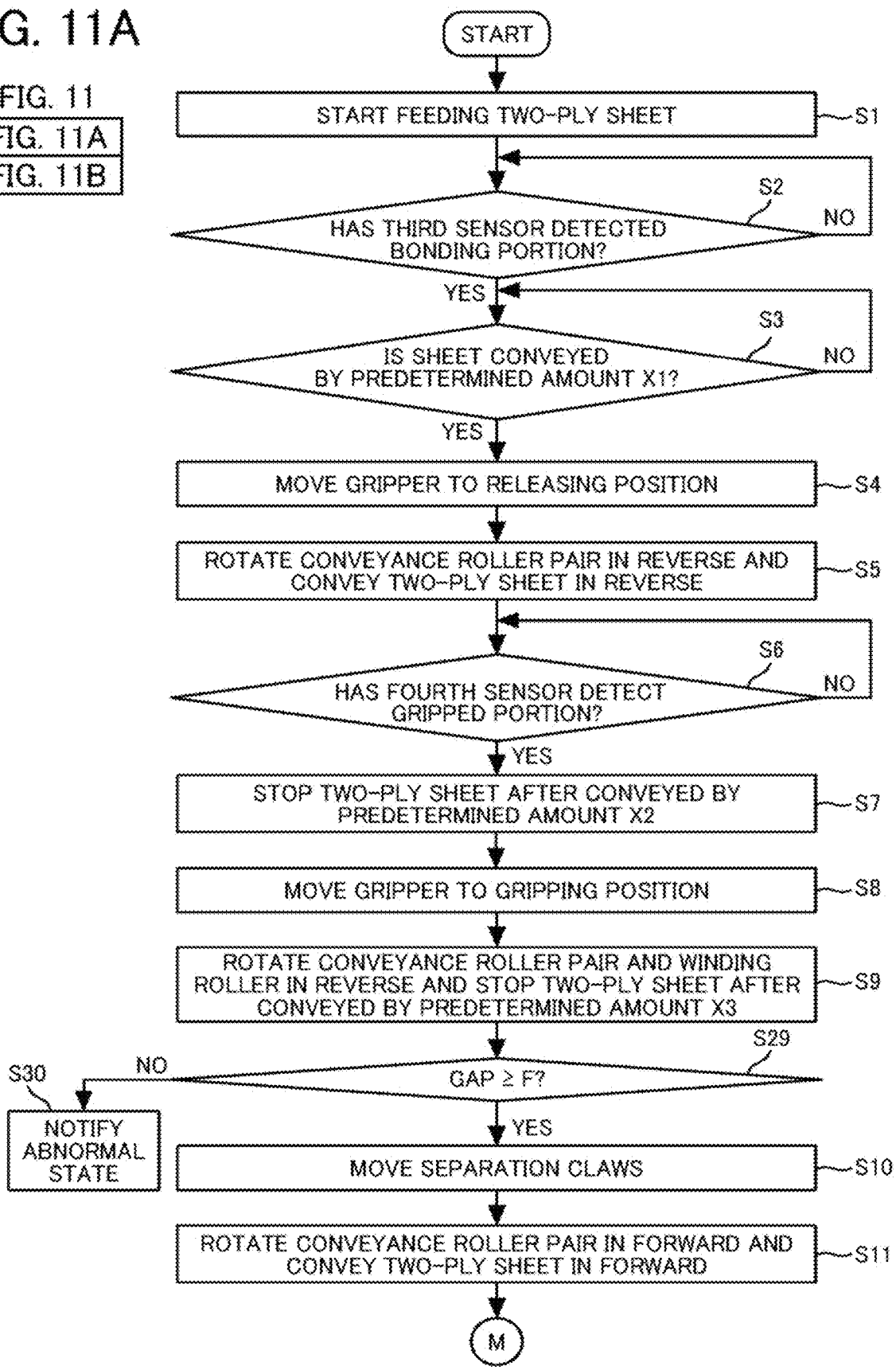
FIGS. 11A and 11B is a flowchart illustrating control performed in the sheet separation device.

First, the first feed roller 2 and the first conveyance roller pair 4 start feeding the two-ply sheet PJ from the first feed tray 11 in step S1 of FIG. 11A. Then, as illustrated in FIG. 4A, the second conveyance roller pair 5 conveys the two-ply sheet PJ with the bonding portion A as a leading end of the two-ply sheet PJ in the forward direction that is a direction from the right side to the left side in FIGS. 4A to 4D in the third sheet conveyance passage K3.

At this time, the controller 500 controls the moving mechanism 30 so that the gripper 32 is positioned at the gripping position. That is, the cam 34 moves to a rotational position at which the cam 34 does not press the arm 31. When the gripper 32 is positioned at the gripping position as described above, the gripper 32 does not block conveyance of the sheet in the third sheet conveyance passage K3. The separation claws 16 stand by at the standby positions (illustrated in FIG. 10A) at which the separation claws 16 do not block conveyance of the sheet in the third sheet conveyance passage K3.

Then, as illustrated in FIG. 4B, the controller 500 determines whether the third sensor 43 has detected the bonding portion A of the two-ply sheet PJ (that is the leading end of the two-ply sheet PJ conveyed in the forward direction, in other words, the one end of the two-ply sheet PJ), in step S2 of FIG. 11A. When the third sensor 43 has not detected the bonding portion A of the two-ply sheet PJ (NO in step S2 of FIG. 11A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 11A), in response to the timing of detection of the bonding portion A of the two-ply sheet PJ by the third sensor 43, the controller 500 causes the third conveyance roller pair 6 to convey the two-ply sheet PJ in the forward direction by a predetermined amount X1 until the gripped portion B of the two-ply sheet PJ (that is the trailing end of the two-ply sheet PJ conveyed in the forward direction, in other words, the other end of the two-ply sheet PJ) passes the position of the winding roller 20, in step S3 of FIG. 11A. When the two-ply sheet PJ is not conveyed by the predetermined amount X1 (NO in step S3 of FIG. 11A), step S3 is repeated until the two-ply sheet PJ is not conveyed by the predetermined amount X1. By contrast, when the two-ply sheet PJ is conveyed by the predetermined amount X1 (YES in step S3 of FIG. 11A), the operation goes on to step S4.

In this state, as illustrated in FIG. 4C, the controller 500 causes the third conveyance roller pair 6 to temporarily stop conveying the two-ply sheet PJ conveyed by the predetermined amount X1 and causes the gripper 32 to move from the gripping position to the releasing position in step S4 of FIG. 11A. That is, the cam 34 moves to a rotational position at which the cam 34 presses the arm 31. In this state, the gripped portion B of the two-ply sheet PJ is received between the gripper 32 and the receiving portion 20b.

Then, as illustrated in FIG. 4D, the controller 500 causes the third conveyance roller pair 6 to rotate in the reverse direction to start conveyance of the two-ply sheet PJ in the reverse direction in step S5 of FIG. 11A. At this time, the fourth sensor 44 detects the gripped portion B of the two-ply sheet PJ, that is, the other end of the two-ply sheet PJ and the leading end of the two-ply sheet PJ conveyed in the reverse direction.

Subsequently, the controller 500 determines whether the fourth sensor 44 has detected the gripped portion B of the two-ply sheet PJ, in step S6 of FIG. 11A. When the fourth sensor 44 has not detected the gripped portion B (NO in step S6 of FIG. 11A), step S6 is repeated until the fourth sensor 44 detects the gripped portion B of the two-ply sheet PJ. By contrast, when the fourth sensor 44 has detected the gripped portion B (YES in step S6 of FIG. 11A), as illustrated in FIG. 5A, in response to the timing of detection of the gripped portion B of the two-ply sheet PJ by the fourth sensor 44, the controller 500 causes the third conveyance roller pair 6 to convey the two-ply sheet PJ by a predetermined amount X2 until the gripped portion B of the two-ply sheet PJ reaches the position of the winding roller 20, that is, the winding start position W. Then, the controller 500 causes the third conveyance roller pair 6 to stop conveyance of the two-ply sheet PJ, in step S7 of FIG. 11A.

Then, as illustrated in FIG. 5B, the gripper 32 is moved from the releasing position to the gripping position in the state in which the gripped portion B of the two-ply sheet PJ is at the winding start position W, in step S8 of FIG. 11A. That is, the cam 34 moves to a rotational position at which the cam 34 does not press the arm 31. In this state, as illustrated in FIG. 5B', the end surface of the other end of the two-ply sheet PJ does not contact any member, and the gripped portion B of the two-ply sheet PJ is gripped between the gripper 32 and the receiving portion 20b.

Then, as illustrated in FIG. 5C, the winding roller 20 rotates in the reverse direction (that is, the counterclockwise direction) in a state in which the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 5D. At this time, as the gap C is formed, the first guide 25 and the second guide 26 limit the warp (slack) of the two-ply sheet PJ in the vicinity of the winding roller 20. Accordingly, the gap C of the two-ply sheet PJ is intensively formed near the third conveyance roller pair 6.

Since the controller 500 determines the timing at which the gripper 32 and the receiving portion 20b grip the gripped portion B of the two-ply sheet PJ in response to the timing of detection of the leading end of the two-ply sheet PJ conveyed in the reverse direction by the fourth sensor 44 disposed downstream from the third conveyance roller pair 6 in the reverse direction, the gripped portion B of the two-ply sheet PJ is accurately conveyed to a desired gripping position regardless of variations in the sheet lengths with respect to the sheet conveyance amount X2. Note that the size of sheets includes an error even if the sheets are sold as the same size.

Further, by detecting the leading end of the two-ply sheet PJ conveyed in the reverse direction by the fourth sensor 44, the sheet conveyance amount X2 that is measured according to the detection is reduced regardless of the sheet length. Therefore, the above-described configuration reduces variation in the sheet conveyance amount X2 and accurately conveys the gripped portion B of the two-ply sheet PJ to the desired gripping position.

Accordingly, the fourth sensor 44 is preferably disposed near the winding roller 20. Further, a description is given of a mechanism that generates the gap C in the two-ply sheet PJ, with reference to FIG. 5C'.

The gap C is generated in the two-ply sheet PJ between the winding roller 20 and the third conveyance roller pair 6 by winding the two-ply sheet PJ around the winding roller 20.

The following description additionally indicates the mechanism.

The two-ply sheet PJ wound around the winding roller 20 is gripped by the gripper 32, restricting misalignment in the sheet. Therefore, a slip is generated between the first sheet P1 and the second sheet P2 by the amount of the circumferential length of the winding roller 20. As a result, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 one or more rounds, the difference in the winding circumferential length is generated between the inner circumference and the outer circumference additionally by the thickness of the sheet, which generates the warp (slack).

To be more specific, a distance from the rotary shaft 20a (i.e., the axial center) of the winding roller 20 to the second sheet P2 on the outer side of the winding roller 20 is R+ΔR, where a distance from the rotary shaft 20a (i.e., the axial center) of the winding roller 20 to the first sheet P1 on the inner side of the winding roller 20 is "R" and the thickness of the inner sheet (first sheet P1) is "ΔR". Since the radius of the first sheet P1 wound around the inner side of the winding roller 20 and the radius of the second sheet P2 wound around the outer side of the first sheet P1 are different by the thickness A R of the first sheet P1 (wound around the inner side of the winding roller 20), a circumferential length difference of 2×ΔR×π is generated between the inner sheet (first sheet P1) and the outer sheet (second sheet P2), when the two-ply sheet PJ is wound around the winding roller 20 by one round. Therefore, when the number of winding the two-ply sheet PJ around the winding roller 20 is M times, the slack of the inner sheet (first sheet P1) is generated by the circumferential length difference of 2×ΔR×π×M.

Finally, the warp (slack) is accumulated between the third conveyance roller pair 6 and the winding roller 20, and the gap C corresponding to 2×ΔR×π×M is formed between the first sheet P1 and the second sheet P2.

Then, the controller 500 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 500 causes the third conveyance roller pair 6 to stop conveyance of the two-ply sheet PJ and the winding roller 20 to stop winding the two-ply sheet PJ, as illustrated in FIG. 6A, in step S9 of FIG. 11A. In this state, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is widened, the controller 500 determines whether the abnormality detection sensor 46 detects that the gap C equal to or larger than a predetermined distance F is formed in the two-ply sheet PJ, in step S29 of FIG. 11A.

As a result, when the controller 500 determines that the gap C is the sufficiently large gap equal to or greater than the predetermined size F, the controller 500 determines that the subsequent sheet separating operations of the separation claws 16 do not cause a problem and controls the separation claws 16 to insert into the gap C sufficiently widened in the two-ply sheet PJ, as illustrated in FIG. 6B, in step S10 of FIG. 11A. That is, as illustrated in FIGS. 9 and 10A, each of the separation claws 16 in pair is moved from the standby position to the separation position.

Then, as illustrated in FIG. 6C, the third conveyance roller pair 6 and the winding roller 20 start rotating in the forward direction, that is, in the clockwise direction, in step S11 of FIG. 11A, in the state in which the separation claws 16 are inserted in the gap C. That is, as illustrated in FIGS. 10A to 10C, the separation claws 16 that is inserted in the gap C of the two-ply sheet PJ relatively move from the one end (bonding portion A) to the other end (gripped portion B) with respect to the two-ply sheet PJ. Note that the above-described relative movement in the present embodiment is achieved by moving the two-ply sheet PJ itself in a direction indicated by arrow in FIGS. 10A to 10C without changing the positions of the separation claws 16 in the sheet conveyance direction.

Figure 11B:
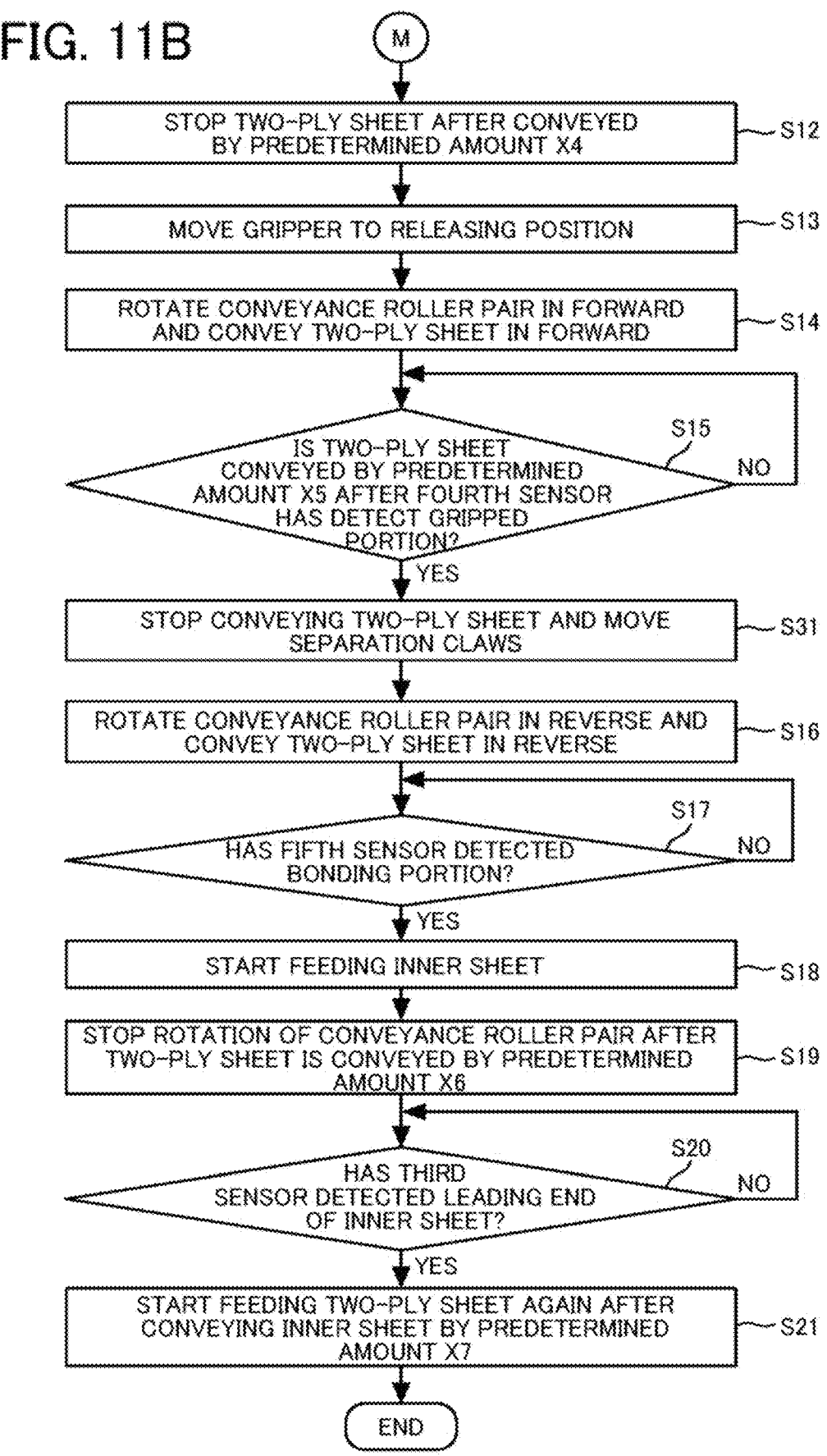

Then, as illustrated in FIG. 7A, the controller 500 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 11B. At this time, the gripped portion B of the two-ply sheet PJ is positioned on the third sheet conveyance passage K3 (that is, at the winding start position W illustrated in FIG. 5B), which is a state in which the gripper 32 may release the gripped portion B. In addition, as illustrated in FIG. 10C, the separation claws 16 stop near the other end of the two-ply sheet PJ after the separation claws 16 are inserted into the gap C of the two-ply sheet PJ and relatively move to the other end (gripped portion B) of the two-ply sheet PJ with respect to the two-ply sheet PJ.

In this state, the gripper 32 moves from the gripping position to the releasing position in step S13 of FIG. 11B. That is, the cam 34 moves to a rotational position at which the cam 34 does not press the arm 31. This state indicates that the gripper 32 releases the two-ply sheet PJ from the gripping. Note that, in the present embodiment, the cam 34 in the moving mechanism 30 moves to release the gripping of the gripper 32. However, in a case in which the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 is released by pulling the two-ply sheet PJ from the gripper 32 due to conveyance of the two-ply sheet PJ without moving the cam 34 in the moving mechanism 30.

Thereafter, as illustrated in FIG. 7B, the controller 500 causes the third conveyance roller pair 6 to rotate in the forward direction again to start conveyance of the two-ply sheet PJ in the forward direction, in step S14 of FIG. 11B. In addition, after the gripped portion B of the two-ply sheet PJ, that is, the other end of the two-ply sheet PJ and the trailing end of the two-ply sheet PJ, passes over the branch portion between the third sheet conveyance passage K3 and each of the first branched sheet conveyance passage K4 and the second branched sheet conveyance passage K5, the gripper 32 moves from the releasing position to the gripping position. Further, at this time, the fourth sensor 44 detects the gripped portion B of the two-ply sheet PJ, that is, the other end of the two-ply sheet PJ and the trailing end of the two-ply sheet PJ conveyed in the forward direction. Then, the controller 500 determines whether the third conveyance roller pair 6 is conveyed the two-ply sheet PJ by a predetermined amount X5 in response to the timing at which the fourth sensor 44 detects the trailing end of the two-ply sheet PJ conveyed in the forward direction, in other words, after the fourth sensor 44 has detected the gripped portion B of the two-ply sheet PJ, in step S15 of FIG. 11B. When the third conveyance roller pair 6 is not conveyed the two-ply sheet PJ by the predetermined amount X5 after the fourth sensor 44 has detected the gripped portion B of the two-ply sheet PJ (NO in step S15 of FIG. 11B), step S15 is repeated until the third conveyance roller pair 6 is conveyed the two-ply sheet PJ by the predetermined amount X5 after the fourth sensor 44 has detected the gripped portion B of the two-ply sheet PJ. By contrast, when the third conveyance roller pair 6 is conveyed the two-ply sheet PJ by the predetermined amount X5 after the fourth sensor 44 has detected the gripped portion B of the two-ply sheet PJ (YES in step S15 of FIG. 11B), as illustrated in FIG. 10D, the controller 500 causes the third conveyance roller pair 6 to stop conveying the two-ply sheet PJ and causes the separation claws 16 to move in the width direction of the two-ply sheet PJ, in step S31 of FIG. 11B. As a result, as illustrated in FIG. 7B, the trailing ends of the first sheet P1 and the second sheet P2 of the two-ply sheet PJ conveyed in the forward direction are separated and largely opened (see FIG. 10D). At this time, the controller 500 starts to perform the sheet separating operation on the two-ply sheet PJ.

Then, as illustrated in FIG. 7C, the third conveyance roller pair 6 rotates in the reverse direction to start conveying the two-ply sheet PJ in the reverse direction, in step S16 of FIG. 11B. At this time, since the separation claws 16 are disposed at the switching positions at which the separation claws 16 block the two-ply sheet PJ moving to the third sheet conveyance passage K3 (that is, the position illustrated in FIG. 10D), the first sheet P1 and the second sheet P2 separated each other are guided to the first branched sheet conveyance passage K4 and the second branched sheet conveyance passage K5, respectively, as illustrated in FIG. 7C. At this time, the fifth sensor 45 (see FIG. 1) detects the bonding portion A of the two-ply sheet PJ, that is, the one end of the two-ply sheet PJ and the trailing end of the two-ply sheet PJ conveyed in the reverse direction. Subsequently, the controller 500 determines whether the fifth sensor 45 (see FIG. 1) that functions as a sheet detector has detected the trailing end of the two-ply sheet PJ conveyed in the reverse direction, that is, the bonding portion A, in step S17 of FIG. 11B. In response to the timing of detection of the trailing end of the two-ply sheet PJ in the reverse direction by the fifth sensor 45 (see FIG. 1), the controller 500 causes the second feed roller 3 to start feeding the inner sheet PM from the second feed tray 12, in step S18 of FIG. 11B.

Figure 8A:
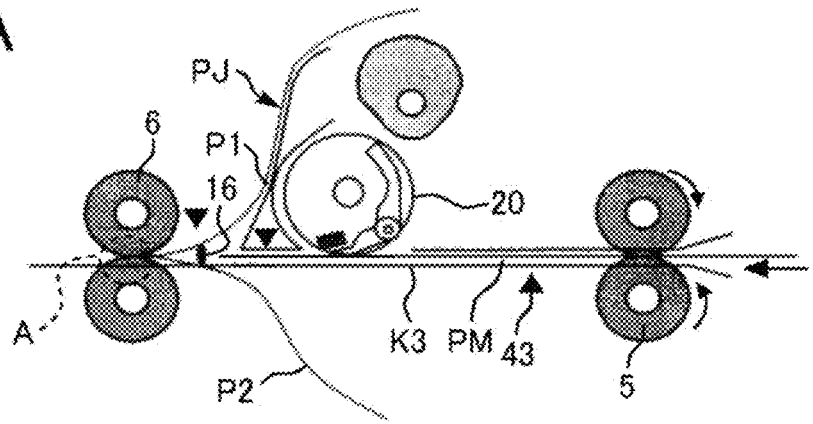
FIGS. 8A to 8C are schematic views of the main part of the sheet separation device illustrated in FIG. 1, illustrating operations of the sheet separation device, subsequent from the operations of FIGS. 7A to 7C.

Subsequently, as illustrated in FIG. 8A, in response to the timing of detection of the trailing end of the two-ply sheet PJ in the reverse direction by the fifth sensor 45 (see FIG. 1), the controller 500 causes the third conveyance roller pair 6 to rotate to convey the two-ply sheet PJ by a predetermined amount X6, and stop the conveyance of the two-ply sheet PJ when the two-ply sheet PJ has been conveyed by the predetermined amount X6, in step S19 of FIG. 11B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. That is, the third conveyance roller pair 6 nips the one end of the two-ply sheet PJ. Then, this state is a state in which the sheet separating operation of the two-ply sheet PJ is completed.

Further, before completion of the sheet separating operation of the two-ply sheet PJ, the controller 500 has already started feeding the inner sheet PM from the second feed tray 12. Therefore, as illustrated in FIG. 8A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 constructing the two-ply sheet PJ.

Figure 8B:
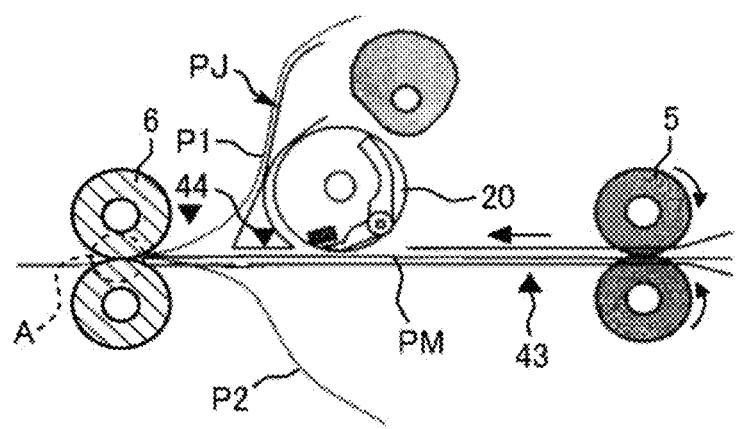

On the other hand, the third sensor 43 detects the leading end of the inner sheet PM (i.e., at one end of the inner sheet PM in the forward direction). In addition, as illustrated in FIG. 8B, in response to the detection timing, the separation claws 16 move to the respective standby positions at the timing at which the separation claws 16 do not block conveyance of the inner sheet PM.

Figure 8C:
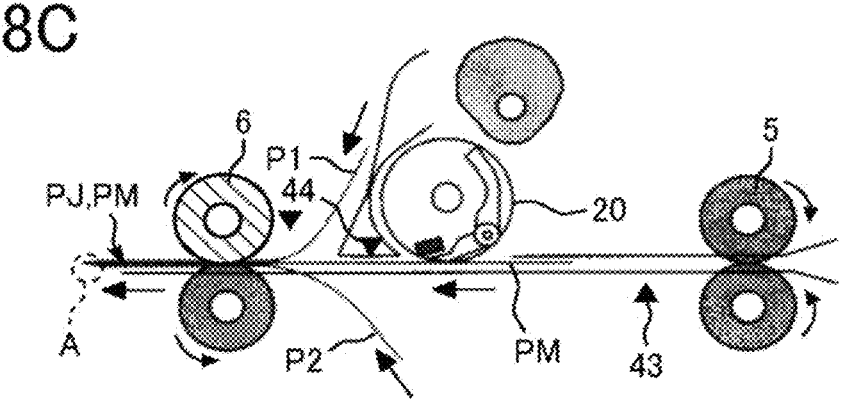
Figure 10E:
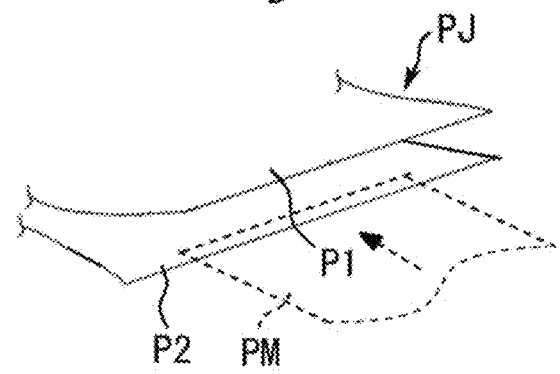

Further, as illustrated in FIGS. 8C and 10E, the controller 500 determines whether the third sensor 43 has detected the leading end of the inner sheet PM in the forward direction, in step S20 of FIG. 11B. When the third sensor 43 has not detected the leading end of the inner sheet PM in the forward direction (NO in step S20 of FIG. 11B), step S20 is repeated until the third sensor 43 has not detected the leading end of the inner sheet PM in the forward direction. By contrast, when the third sensor 43 has detected the leading end of the inner sheet PM in the forward direction (YES in step S20 of FIG. 11B), in response to the detection timing, the controller 500 causes the second conveyance roller pair 5 to convey the inner sheet PM by a predetermined amount X7. Then, the controller 500 causes the third conveyance roller pair 6 to start conveying the two-ply sheet PJ in the forward direction again, in step S21 of FIG. 11B. At this time, the inner sheet PM is accurately nipped at a desired position between the first sheet P1 and the second sheet P2 of the two-ply sheet PJ.

Thus, the controller 500 finishes the sheet inserting operation to insert the inner sheet PM in the two-ply sheet PJ, in other words, between the first sheet P1 and the second sheet P2 of the two-ply sheet PJ. The third conveyance roller pair 6 conveys the two-ply sheet PJ in the forward direction, and the two-ply sheet PJ is ejected and placed on the ejection tray 13 in a state in which the inner sheet PM is inserted into the two-ply sheet PJ (see FIG. 1).

Thus, in the present embodiment, the controller 500 causes the second feed tray 12 (second sheet feeder) to start feeding the inner sheet PM from the second feed tray 12 (second sheet feeder) after the controller 500 has caused the first feed roller 2 (first sheet feeder) to feed the two-ply sheet PJ from the first feed tray 11 (first sheet feeder) and before the operation to separate the non-bonding portion of the two-ply sheet PJ is completed. Accordingly, the time required the operation from the start to the end performed by the sheet separation device 1 is reduced.

By contrast, when the controller 500 determines that the gap C in the two-ply sheet PJ is not the sufficiently large gap equal to or larger than the predetermined distance F, in step S29 of FIG. 11A, that is, when the controller 500 determines that the abnormal state occurs based on the results detected by the abnormality detection sensor 46, the controller 500 determines that the subsequent sheet separating operations of the separation claws 16 cause various kinds of problems, and therefore does not move the separation claws 16 from the standby positions to the separation positions. At this time, the controller 500 causes the operation display panel 49 (see FIG. 1) to notify that the occurrence of the abnormal state stops the sheet separating operation of the two-ply sheet PJ and the sheet inserting operation of the inner sheet PM, in step S30 of FIG. 11A.

Variation 1

Figure 13:
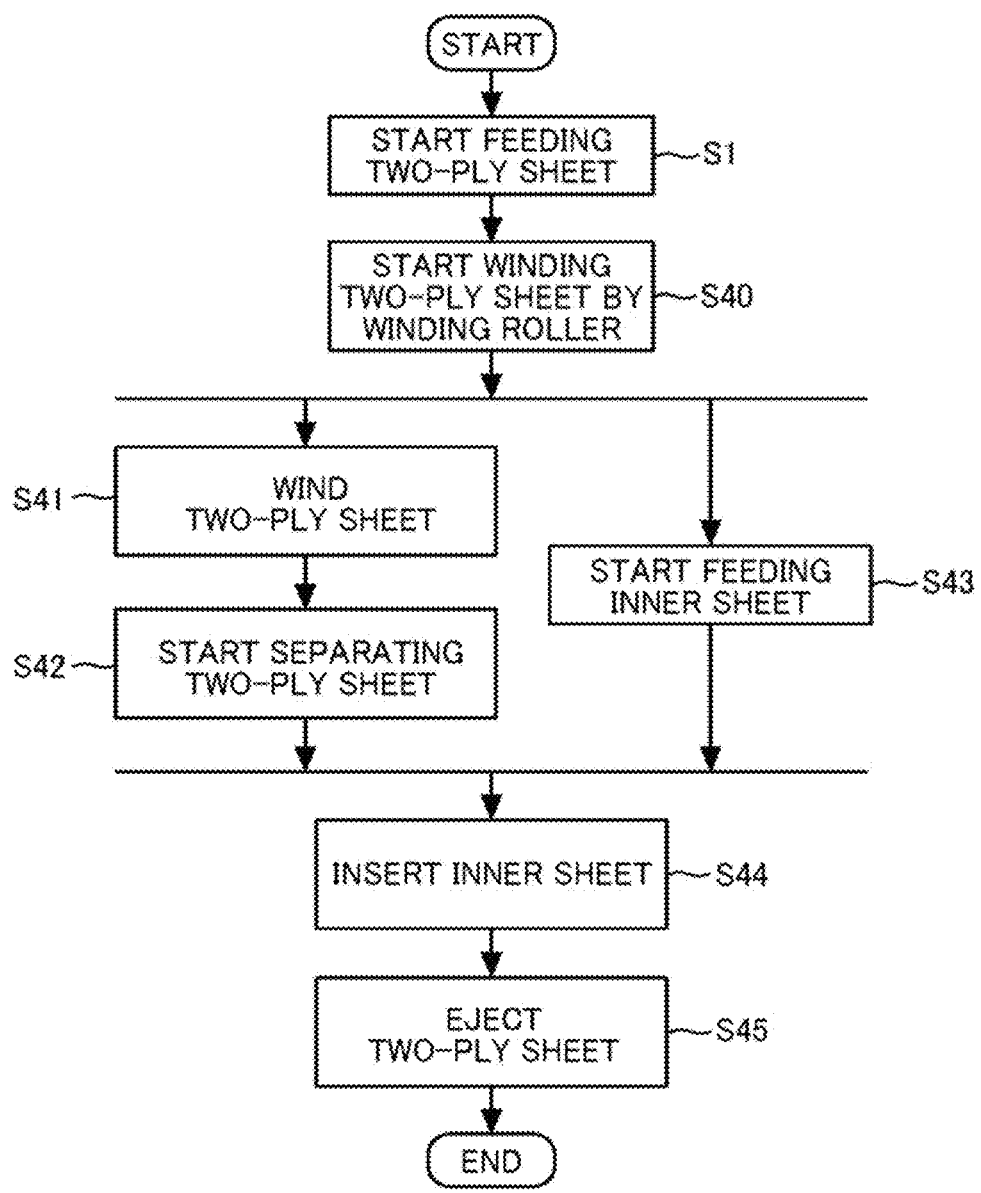
FIG. 13 is a flowchart illustrating the control process executed in the sheet separation device, according to Variation 1.

Next, a description is given of the sheet separation device 1 according to Variation 1, with reference to FIG. 13.

FIG. 13 is a flowchart illustrating the control process executed in the sheet separation device 1, according to Variation 1.

As in the above-described embodiment, in the sheet separation device 1 according to Variation 1, the controller 500 causes the second feed roller 3 (second sheet feeder) to start feeding the inner sheet PM from the second feed tray 12 (second sheet feeder) after the controller 500 has caused the first feed roller 2 (first sheet feeder) to feed the two-ply sheet PJ from the first feed tray 11 (first sheet feeder) the first feed roller 2 (first sheet feeder) has fed the two-ply sheet PJ from the first feed tray 11 (first sheet feeder) and before the operation to separate the non-bonding portion of the two-ply sheet PJ is completed.

Here, in Variation 1, the controller 500 causes the second feed roller 3 (second sheet feeder) to start feeding the inner sheet PM from the second feed tray 12 (second sheet feeder) to start feeding the inner sheet PM after the winding roller 20 has started winding of the two-ply sheet PJ.

To be more specific, as illustrated in FIG. 13, the controller 500 causes the first feed roller 2 (first sheet feeder) to start feeding the two-ply sheet PJ from the first feed tray 11 (first sheet feeder) (step S1 of FIG. 13), and then causes the winding roller 20 to start winding the two-ply sheet PJ (step S40 of FIG. 13). The above-described operations are same as the operations in steps S1 to S8 in the flowchart of FIG. 11A.

Thereafter, as illustrated in FIG. 13, the controller 500 causes the winding roller 20 to wind the two-ply sheet PJ, in other words, to perform the winding operation on the two-ply sheet PJ (step S41 of FIG. 13). Then, the controller 500 causes the separation claws 16 to separate the two-ply sheet PJ, in other words, to perform the sheet separating operation on the two-ply sheet PJ (step S42 of FIG. 13). Before completion of the sheet separating operation on the two-ply sheet PJ, the controller 500 causes the second feed roller 3 (second sheet feeder) to start feeding the inner sheet PM from the second feed tray 12 (second sheet feeder) (step S43 of FIG. 13). Further, the controller 500 causes the third conveyance roller pair 6 to rotate to insert the inner sheet PM into the two-ply sheet PJ, in other words, to perform the sheet inserting operation on the inner sheet PM (step S44 of FIG. 13). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S45 of FIG. 13).

Variation 2

Figure 14:
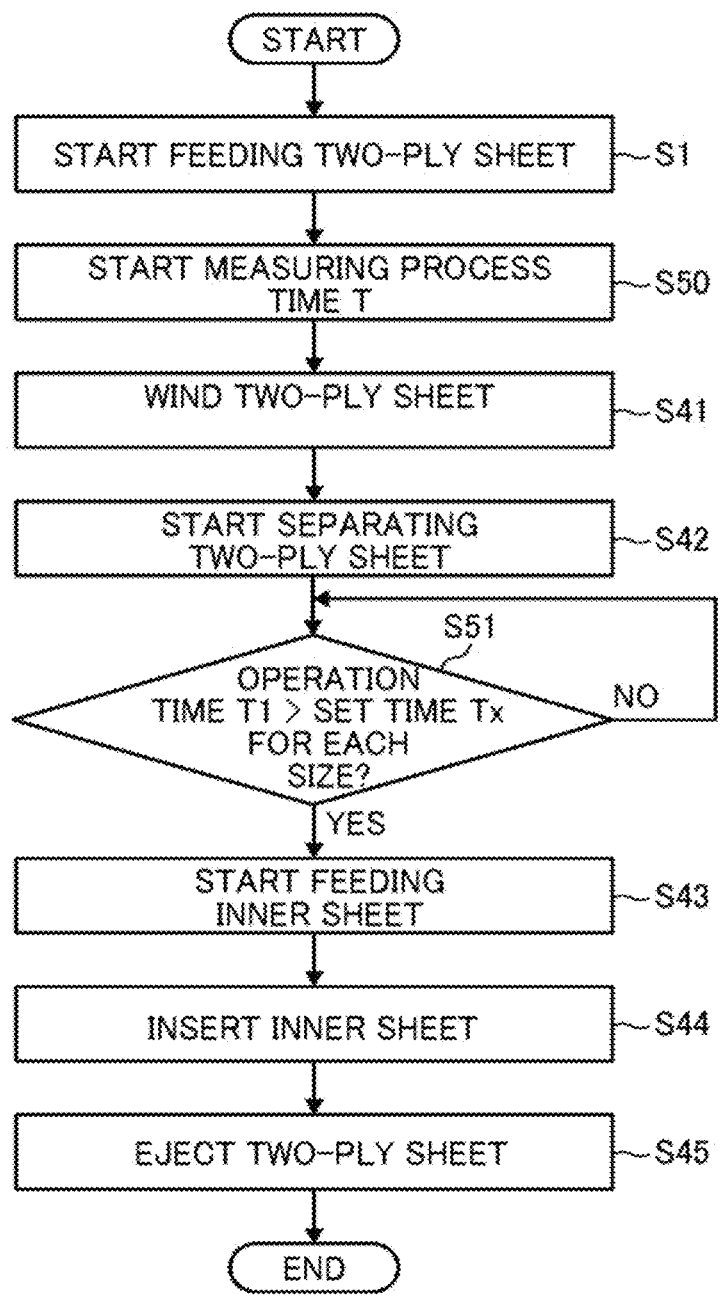
FIG. 14 is a flowchart illustrating the control process executed in the sheet separation device, according to Variation 2.

Next, a description is given of the sheet separation device 1 according to Variation 2, with reference to FIG. 14.

FIG. 14 is a flowchart illustrating the control process executed in the sheet separation device 1, according to Variation 2.

In the sheet separation device 1 according to Variation 2, the controller 500 causes the second feed roller 3 (second sheet feeder) to start feeding the inner sheet PM from the second feed tray 12 (second sheet feeder) after the controller 500 has caused the first feed roller 2 (first sheet feeder) to start feeding the two-ply sheet PJ from the first feed tray 11 (first sheet feeder) and after a set time Tx that is previously set for each size of the two-ply sheet PJ in the sheet feed direction (sheet conveyance direction) has elapsed.

Specifically, since the time from the start of feeding the two-ply sheet PJ to the end of the sheet separating operation is substantially constant, as long as the size (length) of the two-ply sheet PJ in the sheet feed direction is same as the size (length) of the inner sheet PM in the sheet feed direction, the feeding of the inner sheet PM may start before the end of the sheet separating operation of the two-ply sheet PJ based on the time from the start of feeding the two-ply sheet PJ. Therefore, the time from the start to the end of the operations in the sheet separation device 1 is reduced. However, the time from the start of feeding the two-ply sheet PJ to the end of the sheet separating operation takes longer when the size of the two-ply sheet PJ in the sheet feed direction is greater than the size of the inner sheet PM in the sheet feed direction, than when compared with a case in which the size of the two-ply sheet PJ in the sheet feed direction is smaller than the size of the inner sheet PM in the sheet feed direction. Therefore, in Variation 2, the start timing of feeding the inner sheet PM is slower when the size of the two-ply sheet PJ in the sheet feed direction is greater than the size of the inner sheet PM in the sheet feed direction, than when the size of the two-ply sheet PJ in the sheet feed direction is smaller than the size of the inner sheet PM in the sheet feed direction.

To be more specific, as illustrated in FIG. 14, the controller 500 causes the first feed roller 2 (first sheet feeder) to start feeding the two-ply sheet PJ from the first feed tray 11 (first sheet feeder) (step S1 of FIG. 14), and then starts measuring the operation time T (step S50 of FIG. 14). Thereafter, as illustrated in FIG. 14, the controller 500 causes the winding roller to wind the two-ply sheet PJ, in other words, to perform the winding operation on the two-ply sheet PJ (step S41 of FIG. 14). Then, the controller 500 causes the separation claws 16 to start separating the two-ply sheet PJ, in other words, to perform the sheet separating operation on the two-ply sheet PJ (step S42 of FIG. 14). Then, the controller 500 determines whether the operation time T measured in step S50 has reached the set time Tx for each size (step S51 of FIG. 14). Then, when the operation time T has not reached the set time Tx (NO in step S51 of FIG. 14), step S51 is repeated until the operation time T reaches the set time Tx. By contrast, when the operation time T has reached the set time Tx (YES in step S51 of FIG. 14), the controller 500 causes the second feed roller 3 (second sheet feeder) to start feeding the inner sheet PM from the second feed tray 12 (second sheet feeder) (step S43 of FIG. 14). Further, the controller 500 causes the third conveyance roller pair 6 to rotate to insert the inner sheet PM into the two-ply sheet PJ, in other words, to perform the sheet inserting operation on the inner sheet PM (step S44 of FIG. 14). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S45 of FIG. 14).

The above-described control also enhances the productivity of the sheet separation device 1.

Variation 3

Figure 15:
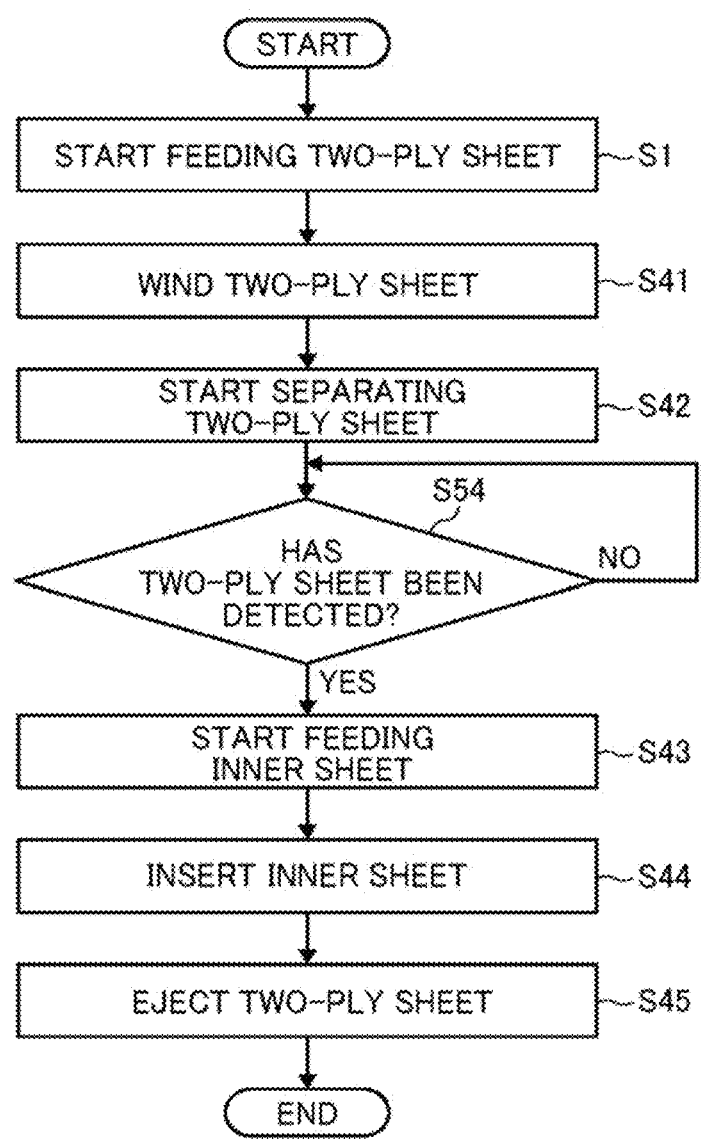
FIG. 15 is a flowchart illustrating the control process executed in the sheet separation device, according to Variation 3.

Next, a description is given of the sheet separation device 1 according to Variation 3, with reference to FIG. 15.

FIG. 15 is a flowchart illustrating the control process executed in the sheet separation device 1, according to Variation 3.

The sheet separation device 1 according to Variation 3 includes the fifth sensor 45 that functions as a sheet detector (see FIG. 1) to detect the presence of the two-ply sheet PJ at the predetermined position that is a position near the nip region of the third conveyance roller pair 6 on the downstream side in the forward direction of the two-ply sheet PJ. As in the above-described variations, in Variation 3, the controller 500 causes the second feed roller 3 (second sheet feeder) to start feeding the inner sheet PM from the second feed tray 12 (second sheet feeder) based on the detection result of the fifth sensor 45.

To be more specific, as illustrated in FIG. 15, the controller 500 causes the first feed roller 2 (first sheet feeder) to start feeding the two-ply sheet PJ from the first feed tray 11 (first sheet feeder) (step S1 of FIG. 15). Then, the controller 500 causes the winding roller 20 to wind the two-ply sheet PJ, in other words, to perform the winding operation on the two-ply sheet PJ (step S41 of FIG. 15). Then, the controller 500 causes the separation claws 16 to start separating the two-ply sheet PJ, in other words, to perform the sheet separating operation on the two-ply sheet PJ (step S42 of FIG. 15).

Then, the controller 500 causes the fifth sensor 45 to detect whether the one end (i.e., the bonding portion A) of the two-ply sheet PJ has been detected (step S54 of FIG. 15). Specifically, the timing at which the one end (i.e., the bonding portion A) of the two-ply sheet PJ passes the position of the fifth sensor 45 is optically detected.

Then, when the one end (i.e., the bonding portion A) of the two-ply sheet PJ has not been detected (NO in step S54 of FIG. 15), step S54 is repeated until the fifth sensor 45 detects the one end (i.e., the bonding portion A) of the two-ply sheet PJ. On the other hand, when the one end (i.e., the bonding portion A) of the two-ply sheet PJ has been detected (YES in step S54 of FIG. 15), the controller 500 causes the second feed roller 3 (second sheet feeder) to start feeding the inner sheet PM from the second feed tray 12 (second sheet feeder) (step S43 of FIG. 15). Further, the controller 500 causes the third conveyance roller pair 6 to rotate to insert the inner sheet PM into the two-ply sheet PJ, in other words, to perform the sheet inserting operation on the inner sheet PM (step S44 of FIG. 15). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S45 of FIG. 15).

Note that, in Variation 3, the controller 500 causes the second feed roller 3 (second sheet feeder) to start feeding the inner sheet PM from the second feed tray 12 (second sheet feeder) based on the detection result of the fifth sensor 45. However, the feeding of the inner sheet PM may be started based on the detection result of another sensor (sheet detector) such as the fourth sensor 44 instead of the fifth sensor 45.

Accordingly, the above-described control also enhances the productivity of the sheet separation device 1.

Variation 4

Figure 16:
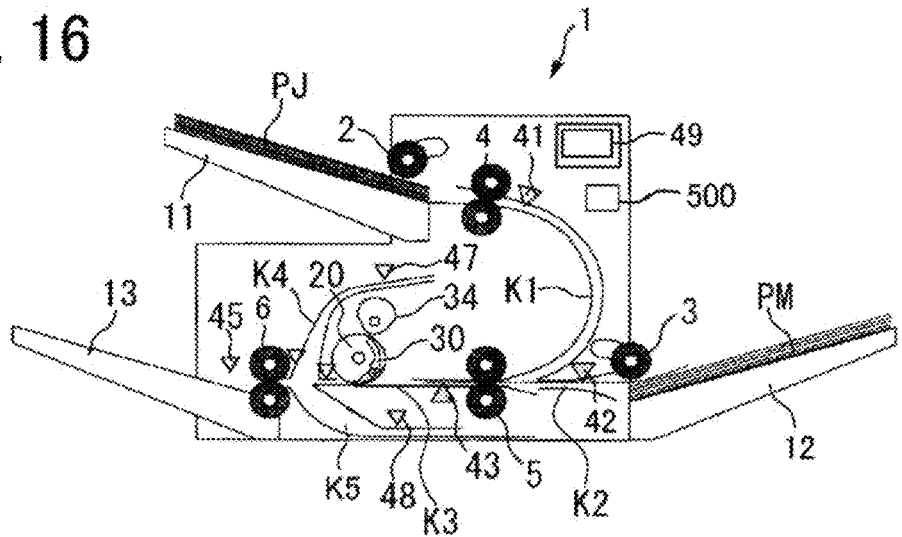
FIG. 16 is a diagram illustrating a sheet separation device, according to Variation 4.
Figure 17:
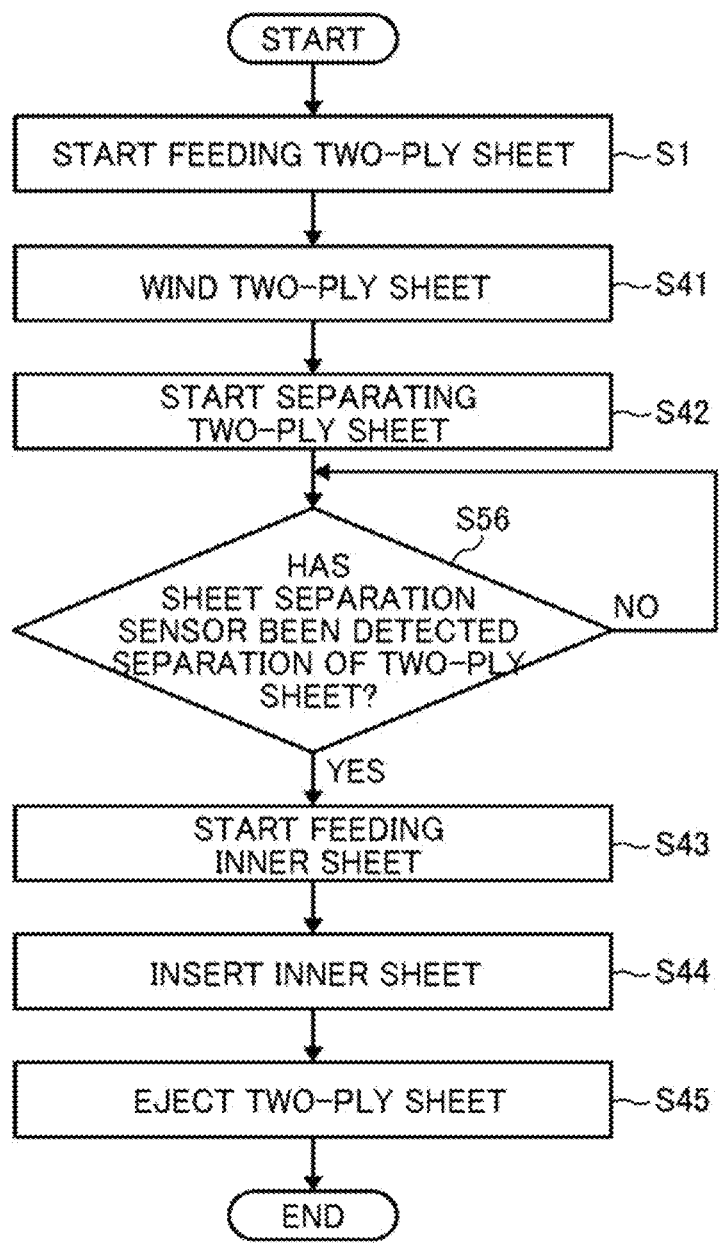
FIG. 17 is a flowchart illustrating the control process executed in the sheet separation device of FIG. 16.

Next, a description is given of the sheet separation device 1 according to Variation 4, with reference to FIGS. 16 and 17.

FIG. 16 is a flowchart illustrating the control process executed in the sheet separation device 1, according to Variation 4.

FIG. 17 is a flowchart illustrating the control process executed in the sheet separation device 1 of FIG. 16.

The sheet separation device 1 according to Variation 4 includes the seventh sensor 47 and the eighth sensor 48, each functioning as a sheet separation detector to detect the state in which the non-bonding portion of the two-ply sheet PJ is successfully separated. The seventh sensor 47 and the eighth sensor 48 are disposed in the first branched sheet conveyance passage K4 and the second branched sheet conveyance passage K5.

Specifically, the seventh sensor 47 is disposed in the first branched sheet conveyance passage K4 to optically detect whether the first sheet P1 that is one of the separated sheets of the two-ply sheet PJ has reached the position of the seventh sensor 47. Further, the eighth sensor 48 is disposed in the second branched sheet conveyance passage K5 to optically detect whether the second sheet P2 that is the other of the separated sheets of the two-ply sheet PJ has reached the position of the eighth sensor 48. Therefore, after a certain time has elapsed since the sheet separating operation of the two-ply sheet PJ started and, at the same time, when neither of the seventh sensor 47 and the eighth sensor 48 has detected the sheet (i.e., the first sheet P1 and the second sheet P2), the controller 500 determines that the two-ply sheet PJ has not been separated successfully. Note that, in Variation 4, in a case in which such an abnormality is detected, the controller 500 causes the operation display panel 49 to display the abnormality state. Further, the position to set the seventh sensor 47 and the position to set the eighth sensor 48 are sufficiently upstream (i.e., close to the bonding portion A) from the position of the leading end (the other end) of the first sheet P1 and the leading end (the other end) of the second sheet P2 in the sheet conveyance direction when the sheet separating operation of the two-ply sheet PJ is completed. According to this configuration, the seventh sensor 47 and the eighth sensor 48 are set to detect the first sheet P1 and the second sheet P2, respectively, at the timing before completion of the sheet separating operation of the two-ply sheet PJ.

Then, in Variation 4, the controller 500 causes the second feed roller 3 (second sheet feeder) to start feeding the inner sheet PM from the second feed tray 12 (second sheet feeder) based on the detection results of the seventh sensor 47 and the eighth sensor 48, each functioning as a sheet separation detector.

To be more specific, as illustrated in the flowchart of FIG. 17, the controller 500 causes the first feed roller 2 (first sheet feeder) to start feeding the two-ply sheet PJ from the first feed tray 11 (first sheet feeder) (step S1 of FIG. 17). Then, the controller 500 causes the winding roller 20 to wind the two-ply sheet PJ, in other words, to perform the winding operation on the two-ply sheet PJ (step S41 of FIG. 17). Then, the controller 500 causes the separation claws 16 to start separating the two-ply sheet PJ, in other words, to perform the sheet separating operation on the two-ply sheet PJ (step S42 of FIG. 17).

Then, the controller 500 determines whether the seventh sensor 47 and the eighth sensor 48 has detected normal separation of the two-ply sheet PJ (step S56 of FIG. 17). Then, when the seventh sensor 47 and the eighth sensor 48 has not detected normal separation of the two-ply sheet PJ (NO in step S56 of FIG. 17), step S56 is repeated until the seventh sensor 47 and the eighth sensor 48 detect normal separation of the two-ply sheet PJ. On the other hand, when the seventh sensor 47 and the eighth sensor 48 has detected normal separation of the two-ply sheet PJ (YES in step S56 of FIG. 17), the controller 500 causes the second feed roller 3 (second sheet feeder) to start feeding the inner sheet PM from the second feed tray 12 (second sheet feeder) (step S43 of FIG. 17). Further, the controller 500 causes the third conveyance roller pair 6 to rotate to insert the inner sheet PM into the two-ply sheet PJ, in other words, to perform the sheet inserting operation on the inner sheet PM (step S44 of FIG. 17). Then, the controller 500 causes the third conveyance roller pair 6 and the ejection roller pair 7 to eject the two-ply sheet PJ in which the inner sheet PM is inserted, to the ejection tray 13 on which the two-ply sheet PJ is stacked (step S45 of FIG. 17).

The above-described control also enhances the productivity of the sheet separation device 1.

In particular, in Variation 4, the controller 500 starts feeding the inner sheet PM after checking the state in which the two-ply sheet PJ has been successfully separated. Therefore, this configuration in Variation 4 prevents the inconvenience in which the inner sheet PM is fed in a state in which the two-ply sheet PJ has not been separated successfully, resulting in waste of the inner sheet PM.

Variation 5

Figure 18:
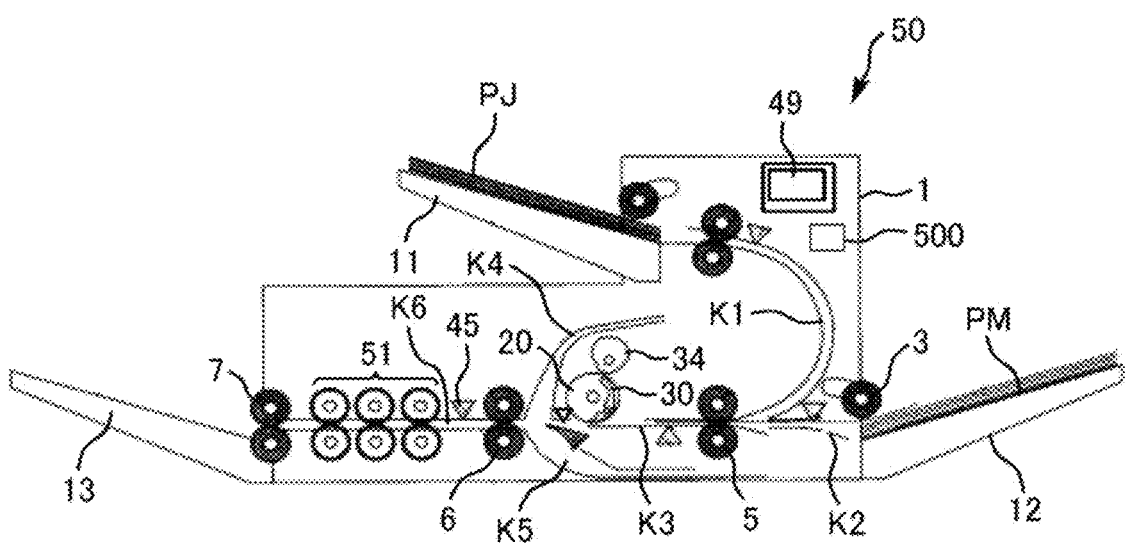
FIG. 18 is a schematic view illustrating a sheet laminator, according to Variation 5.

Next, a description is given of a sheet laminator according to Variation 5, with reference to FIG. 18.

IG. 18 is a schematic view illustrating a sheet laminator, according to Variation 5. As illustrated in FIG. 18, a sheet laminator 50 according to Variation 5 includes the sheet separation device 1 illustrated in FIG. 1.

The sheet laminator 50 includes a sheet lamination device 51 disposed downstream from the third conveyance roller pair 6 of the sheet separation device 1 in the forward direction. The sheet lamination device 51 performs a sheet laminating operation on the two-ply sheet PJ (that is, the normally processed two-ply sheet PJ) in which the inner sheet PM is inserted between the first sheet P1 and the second sheet P2 separated by the sheet separation device 1.

The sheet lamination device 51 includes a plurality of heat and pressure roller pairs, each of which applies heat and pressure to the two-ply sheet PJ while conveying the two-ply sheet PJ in the forward direction with the inner sheet PM being inserted in the two-ply sheet PJ. Further, a fourth sheet conveyance passage K6 is disposed between the third conveyance roller pair 6 and the sheet lamination device 51.

As described above with reference to FIGS. 4A to 8C, the two-ply sheet PJ (in which the inner sheet PM has been inserted after the sheet separating operation) passes through the fourth sheet conveyance passage K6 and is conveyed to the sheet lamination device 51. After the two-ply sheet PJ in which the inner sheet PM is inserted passes through the sheet lamination device 51, the entire region of the two-ply sheet PJ is bonded. Then, the two-ply sheet PJ on which the sheet laminating operation is performed as described above is ejected to the outside of the sheet lamination device 51 by an ejection roller pair 7 and is stacked on the ejection tray 13.

As described above, the sheet laminator 50 according to Variation 5 performs the sheet laminating operation as a sequence of the following operations: an operation to feed the two-ply sheet PJ and the inner sheet PM; an operation to separate the first sheet P1 and the second sheet P2 of the two-ply sheet PJ; an operation to insert the inner sheet PM into the space between the first sheet P1 and the second sheet P2; and an operation to perform the sheet laminating operation on the two-ply sheet PJ inside which the inner sheet PM is inserted. By so doing, the user convenience for the sheet laminator 50 is enhanced.

Note that the sheet laminator 50 includes the operation display panel 49. When the controller 500 determines that the abnormal state occurs based on the results detected by the abnormality detection sensor 46, the controller 500 causes the operation display panel 49 to display that the occurrence of the abnormal state stops the sheet separating operation of the two-ply sheet PJ and the sheet inserting operation of the inner sheet PM.

Further, when the sheet laminating operation is not performed, another sheet conveyance passage may be branched from the fourth sheet conveyance passage K6 between the sheet lamination device 51 of the fourth sheet conveyance passage K6 and the fifth sensor and be merged with the fourth sheet conveyance passage K6 between the sheet lamination device 51 of the fourth sheet conveyance passage K6 and the ejection roller pair 7, so that the inner sheet PM detours the sheet lamination device 51 and is ejected to the ejection tray 13.

Variation 6

Figure 19:
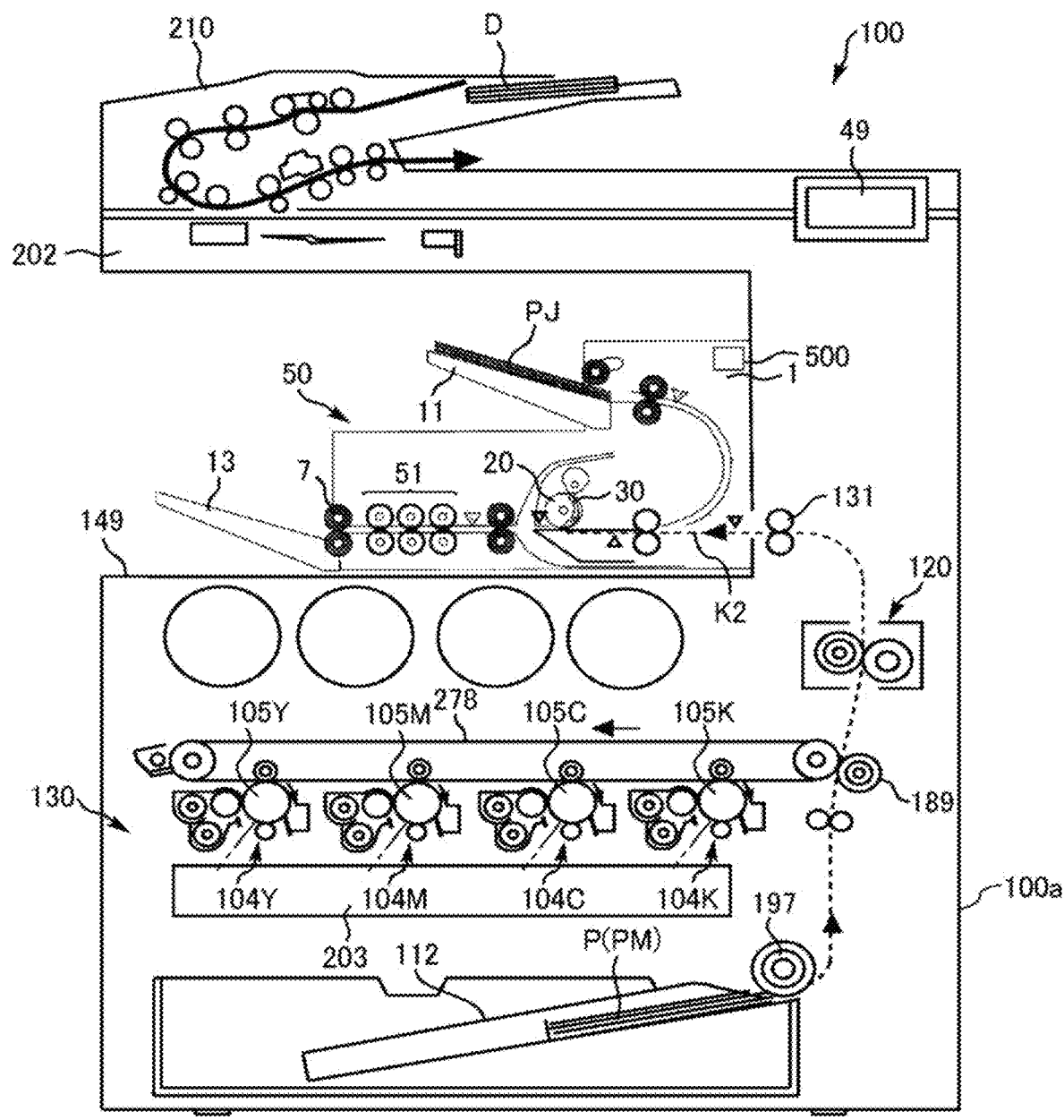
FIG. 19 is a schematic view illustrating an image forming apparatus, according to Variation 6.

A description is given of an image forming apparatus according to Variation 6, with reference to FIG. 19.

FIG. 19 is a schematic view illustrating an image forming apparatus, according to Variation 6.

As illustrated in FIG. 19, an image forming apparatus 100 according to Variation 6 that forms an image on a sheet P includes the sheet laminator 50 illustrated in FIG. 18, on a housing 100a of the image forming apparatus 100. The housing 100a holds an image forming device 130 that performs an image forming operation in the image forming apparatus 100 to form an image on a sheet such as the inner sheet PM.

With reference to FIG. 19, in the image forming apparatus 100, multiple pairs of sheet conveying rollers disposed in a document feeder 210 feed an original document D from a document loading table and convey the original document D in a direction indicated by arrow in FIG. 19. By so doing, the original document D passes over a document reading device 202. At this time, the document reading device 202 optically reads image data of the original document D passing over the document reading device 202.

The image data optically read by the document reading device 202 is converted into electrical signals and transmitted to a writing device 203. The writing device 203 emits laser beams onto photoconductor drums 105Y, 105M, 105C, and 105K, based on the electrical signals of the image data in each of colors, respectively. By so doing, an exposure process is executed by the writing device 203.

On the photoconductor drums 105Y, 105M, 105C, and 105K of respective image forming units 104Y, 104M, 104C, and 104K, a charging process, the exposure process, and a developing process are executed to form desired images on the photoconductor drums 105Y, 105M, 105C, and 105K, respectively.

The images formed on the photoconductor drums 105Y, 105M, 105C, and 105K are transferred and superimposed onto an intermediate transfer belt 278 to form a color image. The color image formed on the intermediate transfer belt 278 is transferred onto the surface of a sheet P (which is a sheet to function as the inner sheet PM) fed and conveyed by a feed roller 197 from a feeding device 112 that functions as a second sheet feeder, at a position at which the intermediate transfer belt 278 faces a secondary transfer roller 189.

After the color image is transferred onto the surface of the sheet P (that is, the inner sheet PM), the sheet P is conveyed to the position of a fixing device 120. The fixing device 120 fixes the transferred color image on the surface of the sheet P, to the sheet P.

Thereafter, the sheet P is ejected from the image forming device 130 of the image forming apparatus 100 by an ejection roller pair 131, and is fed as the inner sheet PM, into the sheet laminator 50. At this time, when the sheet laminator 50 receives the inner sheet PM, the sheet laminator 50 has completed the operation described with reference to FIGS. 4A to 7C (that is, the operation to separate the two-ply sheet PJ) and performs the operation described with reference to FIGS. 8A to 8C (that is, the operation to insert the inner sheet PM into the two-ply sheet PJ) after the sheet laminator 50 receives the inner sheet PM. Further, after the sheet lamination device 51 has completed the sheet laminating operation on the two-ply sheet PJ in which the inner sheet PM is inserted, the ejection roller pair 7 ejects the two-ply sheet PJ to the outside of the sheet lamination device 51 to stack the two-ply sheet PJ on the ejection tray 13.

As described above, a series of image forming operations (i.e., the printing operations) in the image forming apparatus 100 and a series of sheet separating operation of the two-ply sheet PJ and the sheet laminating operation of the inner sheet PM on which the image is formed are completed.

As described above, in Variation 6, the feeding device 112 provided in the image forming device 130 of the image forming apparatus 100 functions as a second sheet feeder to feed the inner sheet PM. By contrast, the first sheet conveyance passage K1 to convey the two-ply sheet PJ is provided in the sheet laminator 50. Therefore, the length of the sheet conveyance passage to convey the two-ply sheet PJ is shorter than the length of the sheet conveyance passage to convey the inner sheet PM. Therefore, the feeding of the inner sheet PM starts before completion of the sheet separating operation on the two-ply sheet PJ, thereby enhancing the overall productivity of the image forming apparatus 100 and the sheet laminator 50.

Note that, in Variation 6, the image forming apparatus 100 includes the sheet laminator 50 but the image forming apparatus 100 may include the sheet separation device 1 illustrated in FIG. 1.

Further, the image forming apparatus 100 includes the operation display panel 49. When the controller 500 determines that the abnormal state occurs based on the results detected by the abnormality detection sensor 46, the controller 500 causes the operation display panel 49 to display that the occurrence of the abnormal state stops the sheet separating operation of the two-ply sheet PJ and the sheet inserting operation of the inner sheet PM.

Further, the image forming apparatus 100 according to Variation 6 of the present disclosure is a color image forming apparatus but may be a monochrome image forming apparatus. Further, the image forming apparatus 100 according to Variation 6 of the present disclosure employs electrophotography, but the present disclosure is not limited to an electrophotographic image forming apparatus. For example, the present disclosure may be applied to other types of image forming apparatuses such as an inkjet image forming apparatus and a stencil printing machine.

Variation 7

Figure 20:
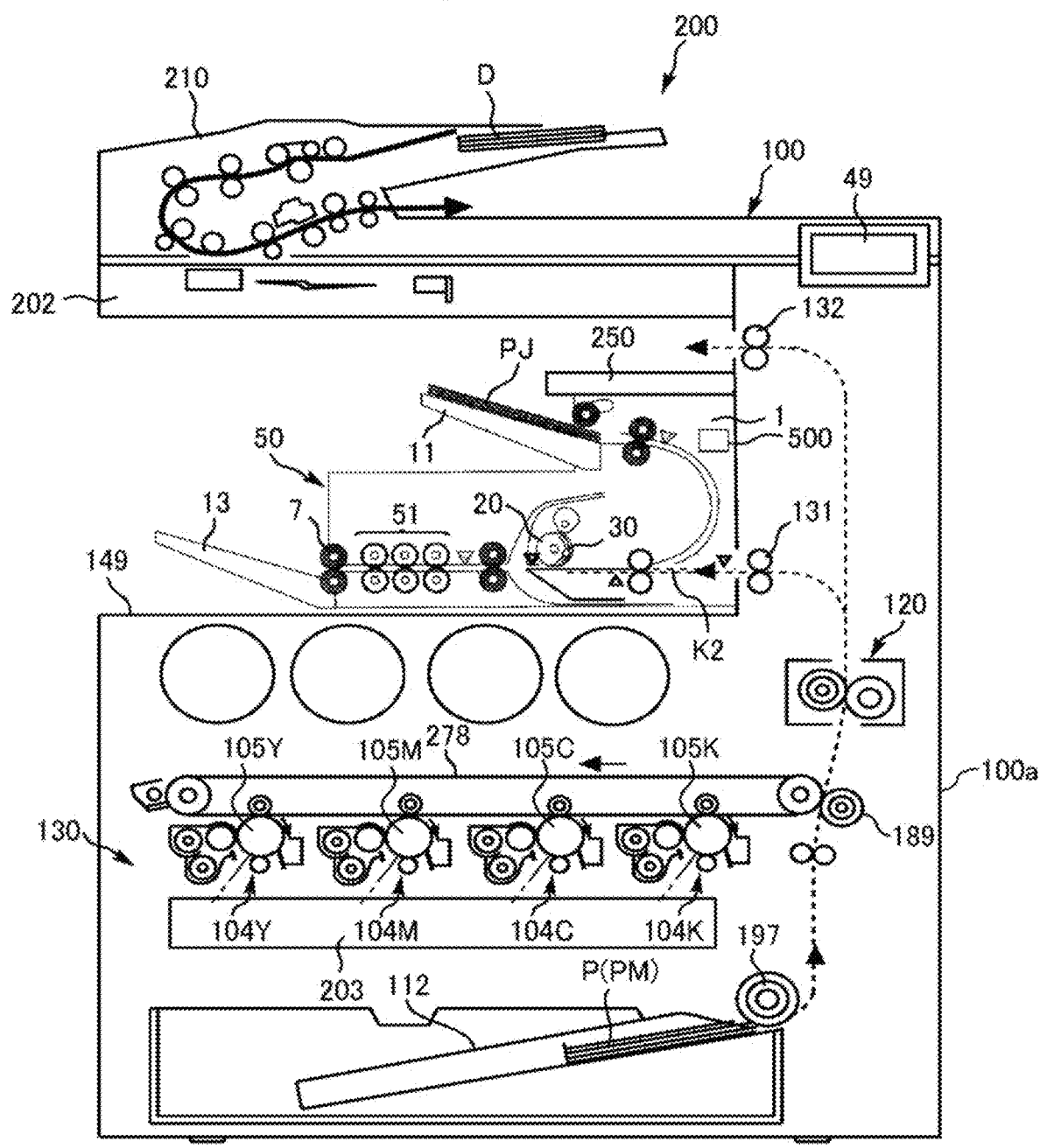
FIG. 20 is a schematic view illustrating an image forming system, according to Variation 7.

A description is given of an image forming system according to Variation 7, with reference to FIG. 20.

FIG. 20 is a schematic view illustrating an image forming system, according to Variation 7.

As illustrated in FIG. 20, an image forming system 200 according to Variation 7 includes the image forming apparatus 100 illustrated in FIG. 19 that forms an image on a sheet P, and the sheet laminator 50 illustrated in FIG. 18 that is detachably attached to the image forming apparatus 100.

In the image forming system 200 illustrated in FIG. 20, the image forming apparatus 100 performs the image forming operations on the sheet P, as described above with reference to FIG. 18. Then, the image forming apparatus 100 ejects the sheet P (that is, the inner sheet PM on which a desired image is formed) from the ejection roller pair 131 to the sheet laminator 50. Then, after the sheet P is conveyed to the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the outside of the sheet laminator 50 to stack the two-ply sheet PJ on the ejection tray 13.

Here, the feeding device 112 provided in the image forming apparatus 100 functions as a second sheet feeder to feed the inner sheet PM. By contrast, the first sheet conveyance passage K1 to convey the two-ply sheet PJ is provided in the sheet laminator 50. Therefore, the length of the sheet conveyance passage to convey the two-ply sheet PJ is shorter than the length of the sheet conveyance passage to convey the inner sheet PM. Therefore, the feeding of the inner sheet PM starts before completion of the sheet separating operation on the two-ply sheet PJ, thereby enhancing the overall productivity of the image forming apparatus 100 and the sheet laminator 50.

When the above-described sheet laminating operation is not performed, the image forming apparatus 100 of the image forming system 200 according to Variation 7 ejects the sheet P having the image formed in the image forming operations, from a second ejection roller pair 132 to the outside of the image forming apparatus 100, so as to stack the sheet P on a second ejection tray 250.

The sheet laminator 50 is detachably attached to the image forming apparatus 100. When the sheet laminator 50 is not used, the sheet laminator 50 may be detached from the image forming apparatus 100. In a case in which the sheet laminator 50 is removed from the image forming apparatus 100, a placement surface 149 on which the sheet laminator 50 was installed functions as an ejection tray, and the sheet P that is ejected from the ejection roller pair 131 to the outside of the image forming apparatus 100 is stacked on the placement surface 149, in other words, the sheet P on which a desired image is formed is stacked on the placement surface 149.

Note that, in Variation 7, the sheet laminator 50 is detachably attached to the image forming system 200. However, the sheet separation device 1 illustrated in FIG. 1 may be detachably attached to the image forming system 200.

Further, the image forming system 200 includes the operation display panel 49. When the controller 500 determines that the abnormal state occurs based on the results detected by the abnormality detection sensor 46, the controller 500 causes the operation display panel 49 to display that the occurrence of the abnormal state stops the sheet separating operation of the two-ply sheet PJ and the sheet inserting operation of the inner sheet PM.

Variation 8

Figure 21A:
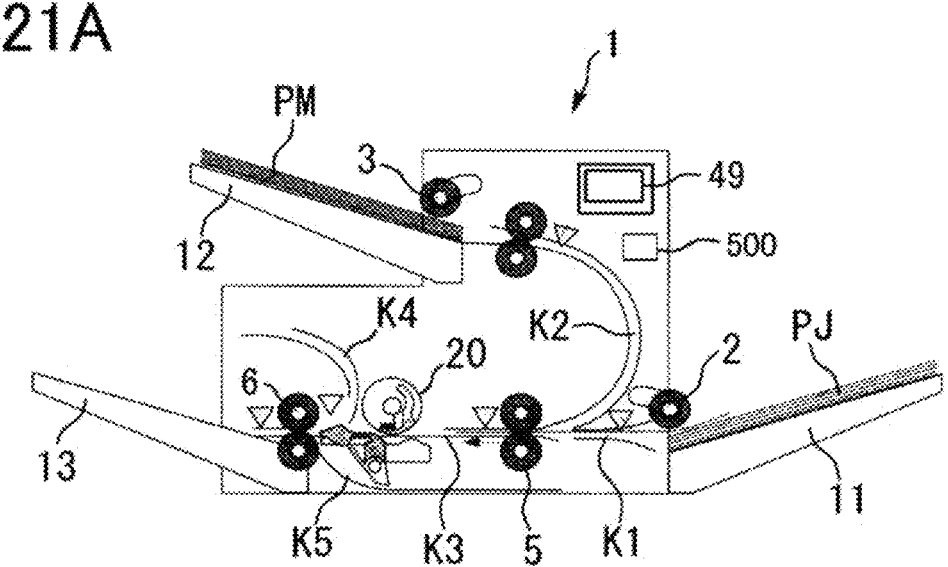
FIG. 21A is a schematic view illustrating a sheet separation device, according to Variation 8.
Figure 21B:
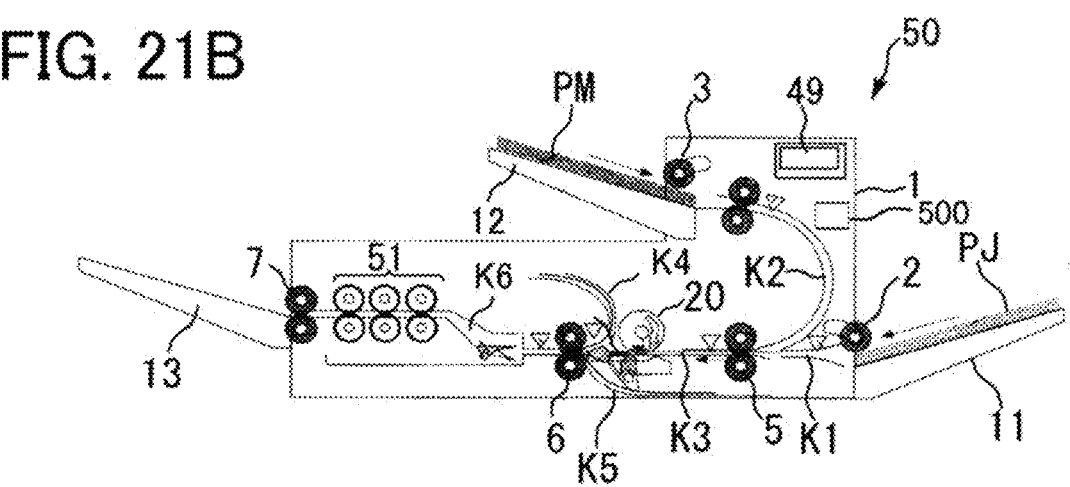
FIG. 21B is a schematic view illustrating a sheet laminator, according to Variation 8.

A description is given of the sheet separation device 1 and the sheet laminator including the sheet separation device 1 according to Variation 8, with reference to FIGS. 21A and 21B.

FIG. 21A is a schematic view illustrating a sheet separation device, according to Variation 8.

FIG. 21B is a schematic view illustrating a sheet laminator, according to Variation 8. As illustrated in FIG. 21A, the sheet separation device 1 includes the first feed tray 11 that functions as a first sheet feeder to feed the two-ply sheet PJ and the second feed tray 12 that functions as a second sheet feeder to feed the inner sheet PM. In the sheet separation device 1 illustrated in FIG. 21A, the position of the first feed tray 11 and the position of the second feed tray 12 are changed from the positions in the sheet separation device 1 illustrated in FIGS. 1 and 16.

Further, as illustrated in FIG. 21B, the sheet laminator 50 includes the first feed tray 11 that functions as a first sheet feeder to feed the two-ply sheet PJ and the second feed tray 12 that functions as a second sheet feeder to feed the inner sheet PM, and the position of the first feed tray 11 and the position of the second feed tray 12 are changed from the positions in the sheet laminator 50 illustrated in FIG. 18.

In Variation 8, the two-ply sheet PJ is conveyed through the first sheet conveyance passage K1 and the third sheet conveyance passage K3, from the first feed tray 11 that functions as a first sheet feeder to the insertion position at which the inner sheet PM is inserted into the two-ply sheet PJ, that is a position near the nip region of the third conveyance roller pair 6. Similarly, in Variation 8, the inner sheet PM is conveyed through the second sheet conveyance passage K2 and the third sheet conveyance passage K3, from the second feed tray 12 that functions as a second sheet feeder to the insertion position. As described above, in Variation 8, the total length of the first sheet conveyance passage K1 and the third sheet conveyance passage K3 is shorter than the total length of the second sheet conveyance passage K2 and the third sheet conveyance passage K3.

To be more specific, in the sheet separation device 1 illustrated in FIG. 21A and the sheet laminator 50 illustrated in FIG. 21B, the first sheet conveyance passage K1 and the third sheet conveyance passage K3, through which the two-ply sheet PJ is conveyed, meet the second sheet conveyance passage K2 and the third sheet conveyance passage K3, through which the inner sheet PM is conveyed, at a meeting point. The first sheet conveyance passage K1 and the third sheet conveyance passage K3, through which the two-ply sheet PJ is conveyed, are straight sheet conveyance passages in which the two-ply sheet PJ is not reversed upside down. On the other hand, the second sheet conveyance passage K2 through which the inner sheet PM is conveyed, from the second feed tray 12 that functions as a second sheet feeder to the meeting point, is a reverse conveyance passage in which the inner sheet PM is reversed upside down.

As described above, in Variation 8, the length of the sheet conveyance passage to convey the two-ply sheet PJ is shorter than the length of the sheet conveyance passage to convey the inner sheet PM. Therefore, the time required for a series of operations from the feeding of the two-ply sheet PJ, the feeding of the inner sheet PM, and the insertion of the inner sheet PM between the two sheets of the two-ply sheet PJ is reduced, thereby enhancing the overall productivity of the image forming apparatus 100 and the sheet laminator 50.

Note that, in Variation 8, the sheet conveyance passage through which the two-ply sheet PJ is conveyed may be a reverse conveyance passage in which the two-ply sheet PJ is reversed upside down and the sheet conveyance passage through which the inner sheet PM is conveyed may be a reverse conveyance passage in which the inner sheet PM is reversed upside down. In that case, the first feed tray 11 that functions as a first sheet feeder is closer than the second feed tray 12 that functions as a second sheet feeder, with respect to the meeting point at which the sheet conveyance passage through which the two-ply sheet PJ is conveyed meets the sheet conveyance passage through which the inner sheet PM is conveyed. That is, in FIGS. 21A and 21B, the first feed tray 11 is disposed below the second feed tray 12 to form a two-step tray including the first feed tray 11 and the second feed tray 12, so that the length of the first sheet conveyance passage K1 is shorter than the length of the second sheet conveyance passage K2. Accordingly, also in this case, the overall productivity of the sheet separation device 1 and the sheet laminator 50 is enhanced.

As described above, the sheet separation device 1 according to the present embodiment The sheet separation device 1 separates the non-bonding portion of the two-ply sheet PJ in which the two sheets, which are the first sheet P1 and the second sheet P2, are overlapped and bonded together at one end as the bonding portion A. The sheet separation device 1 includes the first feed roller 2, the first feed tray 11, the second feed roller 3, and the second feed tray 12. Each of the first feed roller 2 and the first feed tray 11 functions as a first sheet feeder to feed the two-ply sheet PJ. Each of the second feed roller 3 and the second feed tray 12 functions as a second sheet feeder to feed the inner sheet PM to be inserted between the first sheet P1 and the second sheet P2 of the two-ply sheet PJ in which the non-bonding portion is separated in the sheet separation device 1. Then, in the sheet separation device 1 according to the present embodiment, the controller 500 causes the second feed roller 3 to start feeding the inner sheet PM from the second feed tray 12 after the controller 500 has caused the first feed roller 2 to feed the two-ply sheet PJ from the first feed tray 11 and before the operation to separate the non-bonding portion of the two-ply sheet PJ is completed.

Accordingly, the above-described control enhances the productivity of the sheet separation device 1.

Note that, in the present embodiment, the first branched sheet conveyance passage K4 and the second branched sheet conveyance passage K5 branch off in different directions from the third sheet conveyance passage K3 (sheet conveyance passage) between the separation claws 16 each functioning as a separator and the winding roller 20. By contrast, the first branched sheet conveyance passage K4 and the second branched sheet conveyance passage K5 may branch off at the position of the separation claws 16 (each functioning as a separator) in different directions from the third sheet conveyance passage K3 (sheet conveyance passage), resulting that the third sheet conveyance passage K3 is nipped by the first branched sheet conveyance passage K4 and the second branched sheet conveyance passage K5.

Further, in the present embodiment, the first branched sheet conveyance passage K4 and the second branched sheet conveyance passage K5 are formed in a substantially U shape extending from the branch portion to the right side of FIG. 1. However, the shape of the first branched sheet conveyance passage K4 and the second branched sheet conveyance passage K5 is not limited to the above-described U shape. For example, the first branched sheet conveyance passage K4 and the second branched sheet conveyance passage K5 may be formed in a substantially U shape extending from the branch portion to the left in FIG. 1. Alternatively, as illustrated in FIGS. 21A and 21B, the first branched sheet conveyance passage K4 and the second branched sheet conveyance passage K5 may be formed in a substantially S shape extending from the branch portion to both the left and right in FIG. 1.

Further, even when the above-described sheet separation devices are applied, these sheet separation devices achieve the same effect as the effect provided by the configuration(s) in the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

Note that, in the present disclosure, the "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right.

Figure 22:
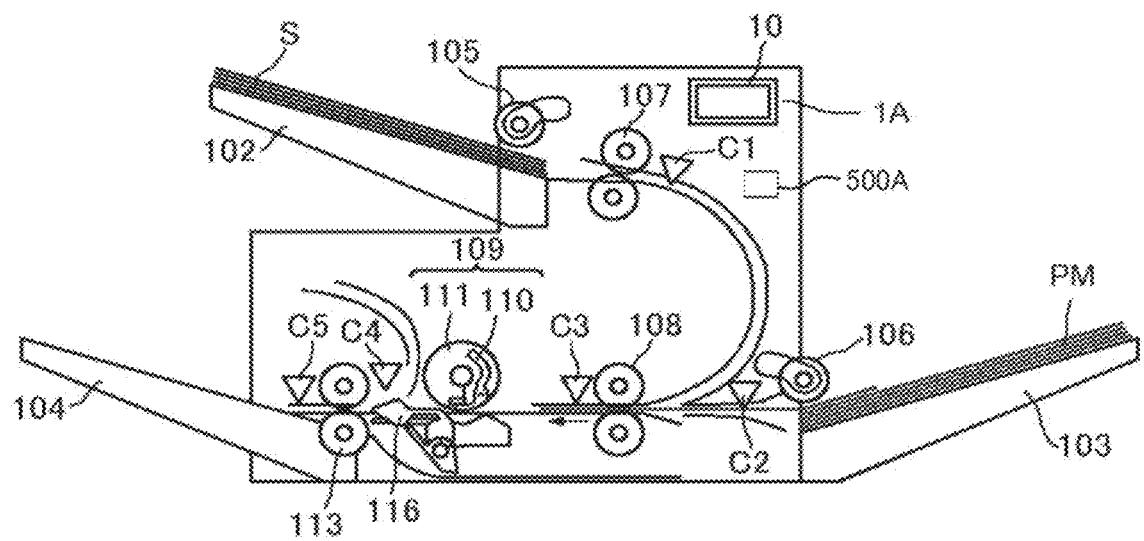
FIG. 22 is a schematic view illustrating the overall configuration of a sheet processing device according to an embodiment of the present disclosure.

Next, a description is given of a sheet processing device according to according to an embodiment of the present disclosure, with reference to FIG. 22.

FIG. 22 is a schematic view illustrating the overall configuration of a sheet processing device according to an embodiment of the present disclosure.

A sheet processing device 1A according to the present embodiment separates two sheets (plies) of a two-ply sheet (hereinafter, referred to as a "lamination sheet S") and to insert and nip a sheet medium (hereinafter, referred to as an "inner sheet PM") between two sheets separated from each other, of the two-ply sheet.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet PM (to be inserted) is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 22, a sheet processing device 1A includes a sheet feed tray 102, a pickup roller 105, and a conveyance roller pair 107. The sheet feed tray 102 functions as a first sheet loader on which the lamination sheets S are placed. The pickup roller 105 feeds the lamination sheet S from the sheet feed tray 102. The sheet processing device 1A further includes a sheet feed tray 103 and a pickup roller 106. The sheet feed tray 103 functions as a second sheet loader on which the inner sheet PM is placed. The pickup roller 106 feeds the inner sheet PM from the sheet feed tray 103.

A sheet sensor C1 is disposed downstream from the conveyance roller pair 107 in the sheet conveyance direction to detect the sheet conveyance position of the lamination sheet S. A sheet sensor C2 is disposed downstream from the pickup roller 106 in the sheet conveyance direction to detect the sheet conveyance position of the inner sheet PM.

The sheet processing device 1A further includes an entrance roller pair 108 that functions as a first conveyor, a winding roller 109 that functions as a rotator, an exit roller pair 113 that functions as a second conveyor, and a sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 1A further includes a separation claw 116 between the winding roller 109 and the exit roller pair 113. The separation claw 116 is movable in the width direction of the lamination sheet S. The winding roller 109 is an example of a separator to separate the lamination sheet S. The sheet processing device 1A further includes a controller 500A that controls sheet conveyance of the sheet (i.e., the lamination sheet S and the inner sheet PM) by performing, e.g., a sheet separating operation, a sheet laminating operation, and a sheet inserting operation. The controller 500A is connected to various drivers driving various parts and units, for example, the above-described parts and units included in the sheet processing device 1A.

A sheet sensor C3 is disposed downstream from the entrance roller pair 108 in the sheet conveyance direction to detect the conveyance position of the lamination sheet S and the sheet conveyance position of the inner sheet PM. An abnormality state detector C4 is disposed downstream from the winding roller 109 in the sheet conveyance direction to detect the state of the lamination sheet S. The abnormality state detector C4 functions as a sheet sensor. A sheet sensor C5 is disposed downstream from the exit roller pair 113 in the sheet conveyance direction to detect the sheet conveyance position of the lamination sheet S. Note that each of the pickup roller 105, the conveyance roller pair 107, the entrance roller pair 108, and the winding roller 109 is an example of a first sheet feeder, and each of the pickup roller 106, the entrance roller pair 108, and the winding roller 109 is an example of a second sheet feeder.

A control panel 10 is provided on the exterior of the sheet processing device 1A. The control panel 10 functions as a display-operation device to display information of the sheet processing device 1A and receives input of the operation of the sheet processing device 1A. The control panel 10 also functions as a notification device to output a perceptual signal to a user. Note that, as an alternative, a notification device other than the control panel 10 may be separately provided in the sheet processing device 1A.

The sheet processing device 1A according to the present embodiment loads the lamination sheet S and the inner sheet PM on separate trays. As the lamination sheet S is conveyed in the sheet processing device 1A, the sheet processing device 1A separates and opens the lamination sheet S into two sheets and inserts the inner sheet PM into the lamination sheet S. Then, the exit roller pair 113 ejects and stacks the lamination sheet S in which the inner sheet PM is inserted, onto the sheet ejection tray 104.

Figure 23:
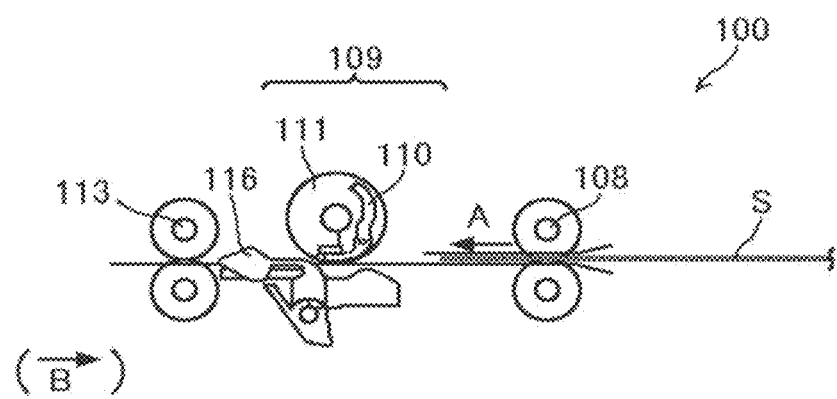
FIG. 23 is a schematic view illustrating a main part of the sheet processing device of FIG. 22.

FIG. 23 is a schematic view illustrating the main part of the sheet processing device of FIG. 22.

As illustrated in FIG. 23, each of the entrance roller pair 108 and the exit roller pair 113 is, for example, two rollers paired with each other and driven by a driver such as a motor. The controller 500A causes the driver to control rotations of the entrance roller pair 108 and the exit roller pair 113. The entrance roller pair 108 rotates in one direction. The exit roller pair 113 rotates in forward and reverse directions, thereby nipping and conveying the lamination sheet S and the inner sheet PM.

The entrance roller pair 108 conveys the lamination sheet S and the inner sheet PM toward the exit roller pair 113. The sheet conveyance direction indicated by arrow A in FIG. 23 is hereinafter referred to as a "forward conveyance direction" or a sheet conveyance direction A.

On the other hand, the exit roller pair 113 is capable of switching the direction of rotation between the forward direction and the reverse direction. The exit roller pair 113 conveys the lamination sheet S nipped by the rollers of the exit roller pair 113 toward the sheet ejection tray 104 (see FIG. 22) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (that is, the direction opposite the forward conveyance direction) indicated by arrow B in FIG. 23 is hereinafter referred to as a reverse conveyance direction or a sheet conveyance direction B.

The sheet processing device 1A is provided with the winding roller 109 that functions as a rotator and the separation claw 116, each of which being disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 500A causes the driver to control rotations of the winding roller 109 and operations of the separation claw 116. The winding roller 109 is an example of a separator to separate the lamination sheet S.

The winding roller 109 includes a roller 111 and a sheet gripper 110 movably disposed on the roller 111 to grip the lamination sheet S. The sheet gripper 110 that is movable grips the leading end of the lamination sheet S together with the roller 111. The sheet gripper 110 may be formed on the outer circumference of the roller 111 as a single unit or may be formed as a separate unit. The controller 500A causes a driver to move the sheet gripper 110.

Next, a description is given of a series of operations performed in the sheet processing device 1A, with reference to FIGS. 22 to 33B.

The series of operations performed by the sheet processing device 1A indicates the operations from separating the lamination sheet S to inserting the inner sheet PM into the lamination sheet S. The controller 500A controls the series of operations performed by the sheet processing device 1A. Note that, in FIGS. 24 to 33, elements identical to the elements illustrated in FIGS. 22 and 23 are given identical reference numerals, and the descriptions these elements are omitted.

In FIG. 22, the lamination sheets S is loaded on the sheet feed tray 102 such that a part of the bonded side of the lamination sheet S is located downstream from the pickup roller 105 in the sheet feed direction (sheet conveyance direction). In the sheet processing device 1A, the pickup roller 105 picks up the lamination sheet S from the sheet feed tray 102, and the conveyance roller pair 107 conveys the lamination sheet S toward the entrance roller pair 108.

Next, as illustrated in FIG. 23, the entrance roller pair 108 conveys the lamination sheet S toward the winding roller 109. In the sheet processing device 1A, the entrance roller pair 108 conveys the lamination sheet S with the bonded end, which is one of four sides of the lamination sheet S, as the downstream side in the forward conveyance direction A as indicated by arrow A in FIG. 23.

Figure 24:
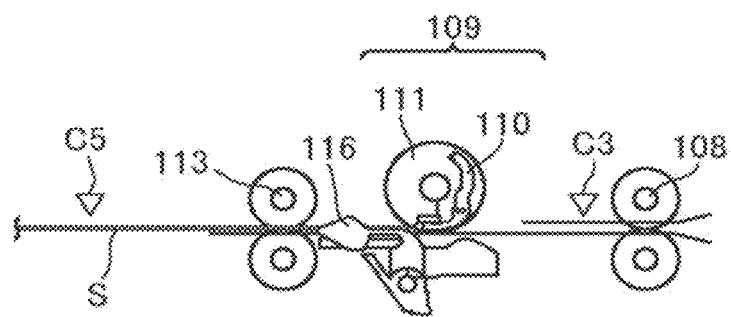
FIG. 24 is a schematic view illustrating the main part of the sheet processing device, subsequent to the state in FIG. 23.

Subsequently, as illustrated in FIG. 24, the controller 500A of the sheet processing device 1A temporarily stops conveyance of the lamination sheet S when the trailing end of the lamination sheet S in the forward conveyance direction has passed the winding roller 109. Note that these operations are performed by conveying the lamination sheet S from the sheet sensor C3 by a specified amount in response to the timing at which the sheet sensor C3 detected the leading end of the lamination sheet S.

Figure 25:
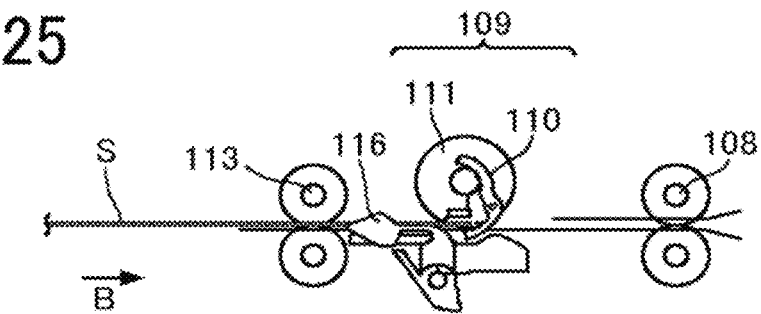
FIG. 25 is a schematic view illustrating the main part of the sheet processing device, subsequent to the state in FIG. 24.

Next, as illustrated in FIG. 25, the controller 500A of the sheet processing device 1A causes the sheet gripper 110 to open and the exit roller pair 113 to rotate in the reverse direction to convey the lamination sheet S in the reverse conveyance direction (sheet conveyance direction B) toward the opened portion of the sheet gripper 110.

Figure 26:
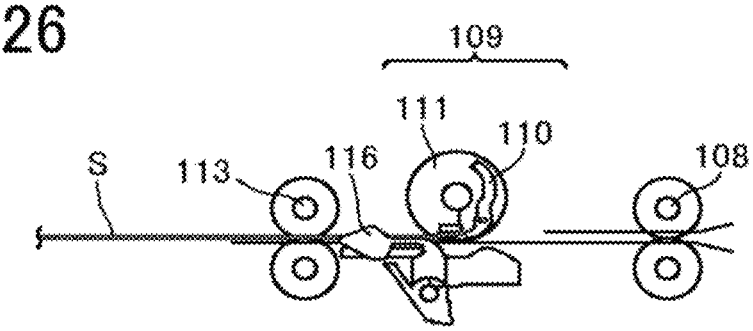
FIG. 26 is a schematic view illustrating the main part of the sheet processing device, subsequent to the state in FIG. 25.

Subsequently, as illustrated in FIG. 26, the controller 500A of the sheet processing device 1A causes the exit roller pair 113 to stop rotating to stop conveyance of the lamination sheet S when the end of the lamination sheet S is inserted into the opened portion of the sheet gripper 110 and causes the driver to close the sheet gripper 110 to grip the end of the lamination sheet S. Note that these operations are performed when the lamination sheet S is conveyed by the specified amount.

Figure 27:
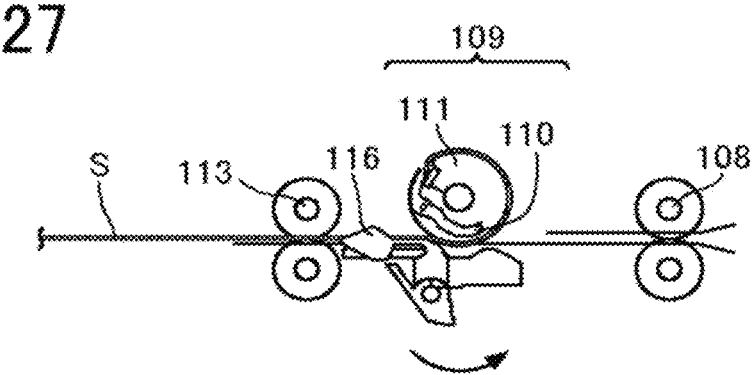
FIG. 27 is a schematic view illustrating the main part of the sheet processing device, subsequent to the state in FIG. 26.

Then, as illustrated in FIG. 27, the controller 500A of the sheet processing device 1A causes the driver to rotate the winding roller 109 in the counterclockwise direction in FIG. 27 to wind the lamination sheet S around the winding roller 109. Here, the lamination sheet S is wound around the winding roller 109 from the side where the two sheets of the lamination sheet S are overlapped but not bonded.

Figure 28:
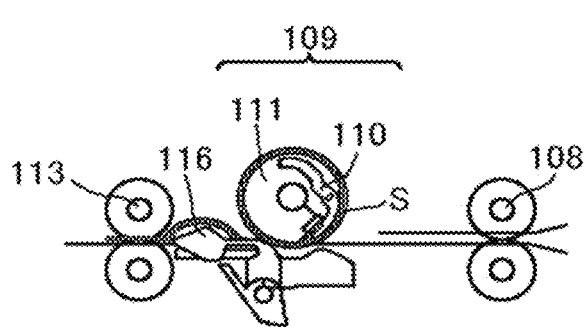
FIG. 28 is a schematic view illustrating the main part of the sheet processing device, subsequent to the state in FIG. 27.

As illustrated in FIG. 28, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As the separation claws 116 are inserted into the space generated as described above, from both sides of the lamination sheet S, the space between the two sheets is reliably maintained. Note that these operations are performed by conveying the lamination sheet S from the sheet sensor C5 by a specified amount in response to the timing at which the sheet sensor C5 detected the leading end of the lamination sheet S.

Here, a description is given of the separation claws 116.

Figure 34:
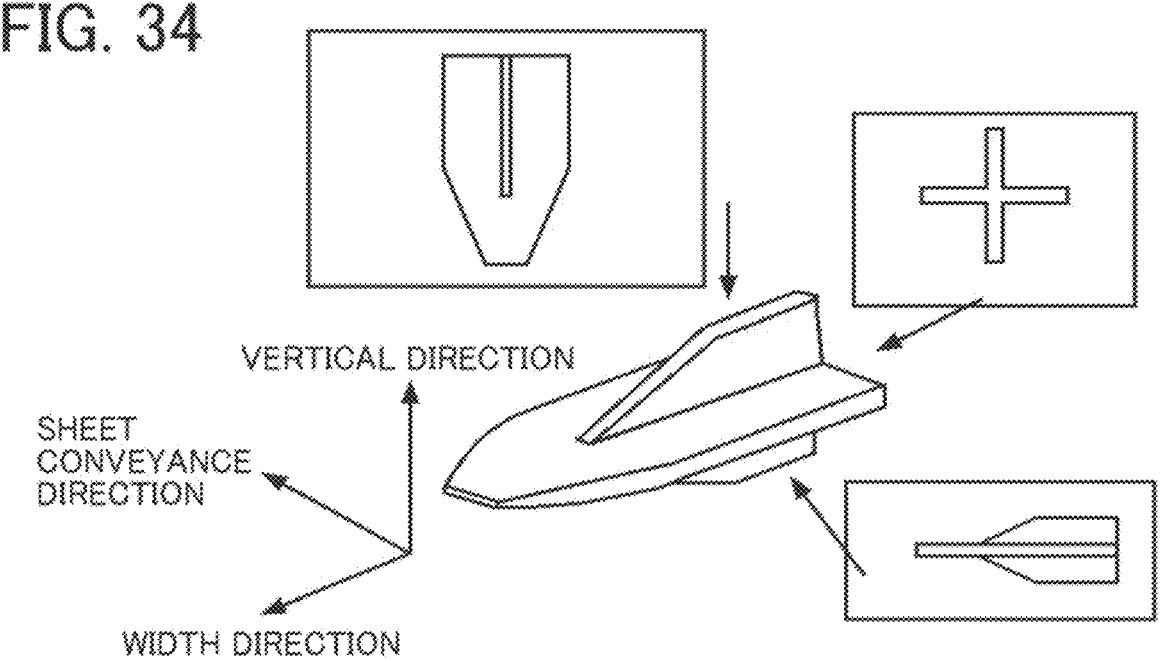
FIG. 34 is a schematic view illustrating one of separation claws provided in the sheet processing device.

FIG. 34 is a schematic view illustrating the separation claw 116 of the sheet processing device 1A.

FIGS. 35A and 35B are schematic views illustrating an example of a drive configuration of the separation claw 116.

Figure 36:
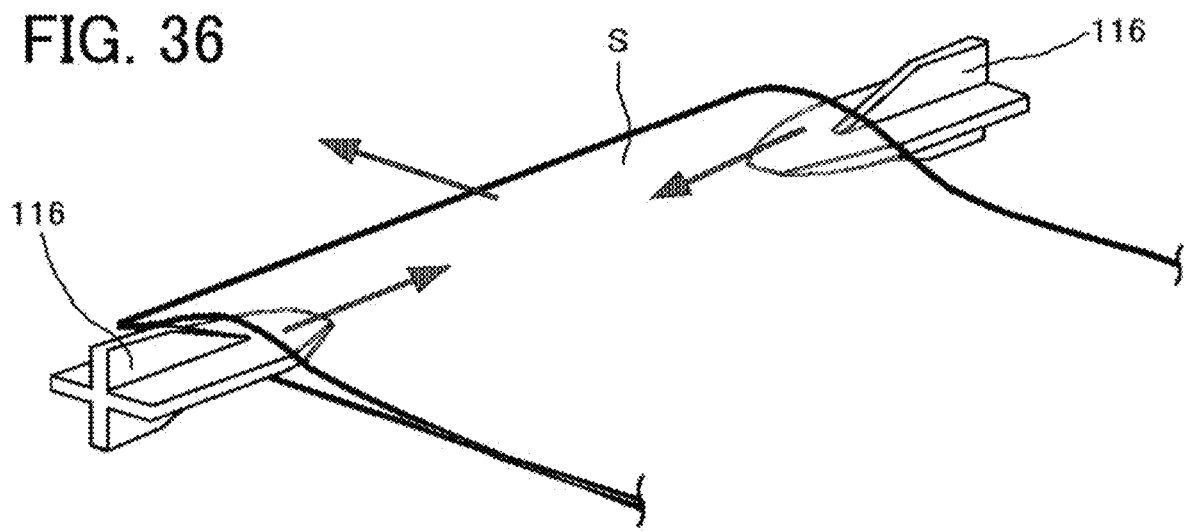
FIG. 36 is a perspective view illustrating a state in which the separation claws are inserted into a sheet S.

Further, FIG. 36 is a perspective view illustrating a state in which the separation claws 116 are inserted in the lamination sheet S.

As illustrated in FIG. 34, when viewed from the upstream side in the sheet conveyance direction, the size in the height (vertical direction) of the separation claw 116 gradually increases from the center in the width direction to the trailing end (right end in FIG. 34). Further, when viewed from the vertical direction, the size of the separation claw 116 in the sheet conveyance direction gradually increases from the tip to the center. And, when viewed from the width direction, the separation claw 116 is shaped like a cross.

Further, in the present embodiment, referring to FIGS. 35A and 35B, the two separation claws 116 are disposed facing each other and moved in the approaching direction and the separating direction, for example, by a belt drive mechanism as illustrated in FIG. 35A and by a rack and pinion mechanism illustrated in FIG. 35B.

As described above, in the present embodiment, each of the separation claws 116 having the above-mentioned shape is movable in the width direction of the lamination sheet S. Accordingly, the separation claws 116 are smoothly inserted into the gap created in the lamination sheet S as illustrated in FIG. 36.

Now, the description is returned to the series of operations performed in the sheet processing device 1A.

Figure 29:
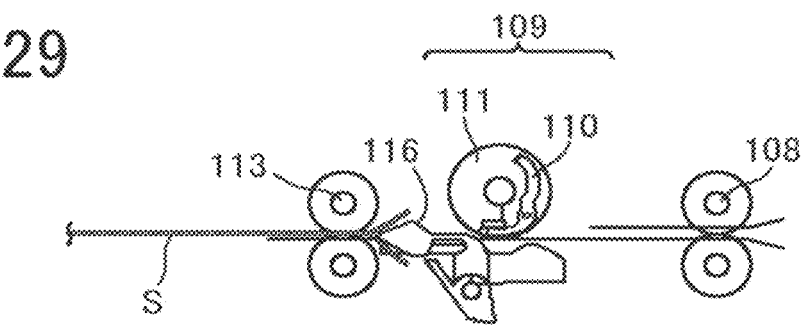
FIG. 29 is a schematic view illustrating the main part of the sheet processing device, subsequent to the state in FIG. 28.

With the separation claws 116 inserted in the space in the lamination sheet S, the controller 500A in the sheet processing device 1A causes the driver to rotate the winding roller 109 in the clockwise direction (see FIG. 28). The controller 500A then causes the space generated in the lamination sheet S to shift to the trailing end of the lamination sheet S in the forward conveyance direction (sheet conveyance direction A), as illustrated in FIG. 29. After the winding roller 109 has been rotated by a specified amount, the controller 500A causes the driver to open the sheet gripper 110. As a result, the trailing end of the lamination sheet S is separated into the upper and lower sheets.

In this state, the controller 500A of the sheet processing device 1A causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the sheet sensor C5 by a specified amount in response to the timing at which the sheet sensor C5 detected the leading end of the lamination sheet S.

Figure 37:
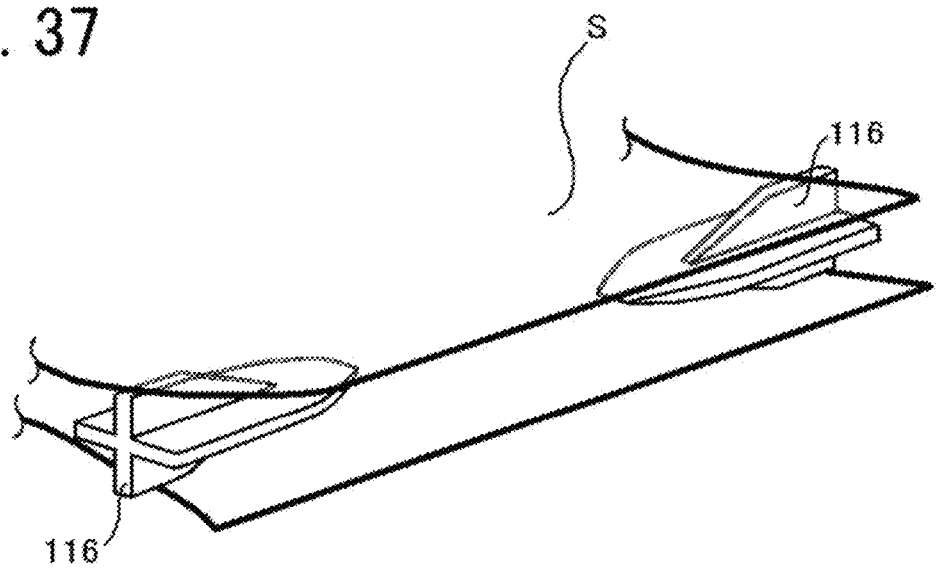
FIG. 37 is a perspective view illustrating the separation claws and the sheet S in a state illustrated in FIG. 29.

FIG. 37 is a perspective view illustrating the separation claws 116 and the lamination sheet S in the state illustrated in FIG. 29.

Since each separation claw 116 further has a branching guide that functions as a guide to guide the two sheets separated from the lamination sheet S in different directions due to the above-described shape (see FIG. 34), the two sheets separated from the lamination sheet S may be kept in postures to be conveyed to different sheet conveyance passages.

Figure 38:
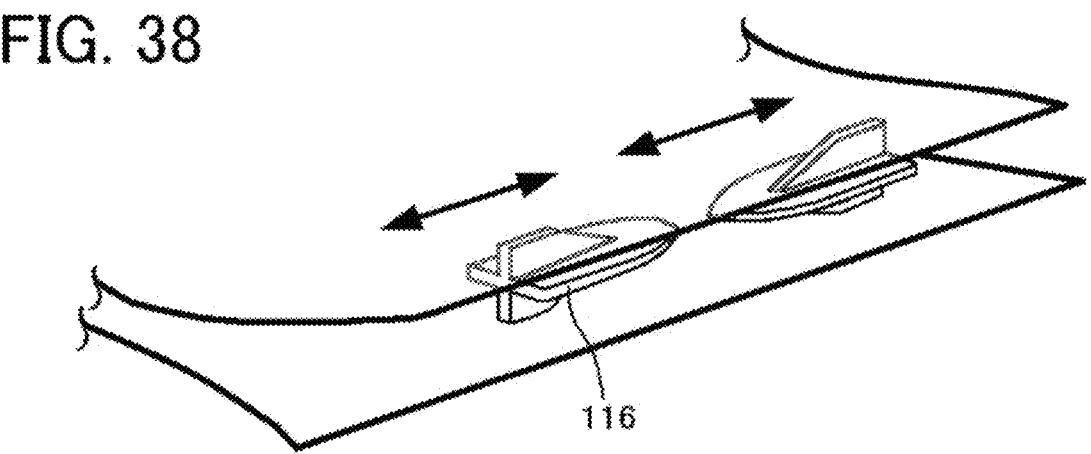
FIG. 38 is a perspective view illustrating the separation claws and the sheet S in another state illustrated in FIG. 29.

Further, since the separation claws 116 are movable in the width direction (see FIGS. 35A and 35B), the separation claws 116 are positioned suitably to support the postures of the two sheets of the lamination sheet S as illustrated in FIG. 38. Therefore, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a sheet separating member over the whole area in the width direction of the sheet conveyance passage and a driver to drive the sheet separating member, thereby reducing the cost when compared with the configuration of a known sheet processing device.

Figure 30:
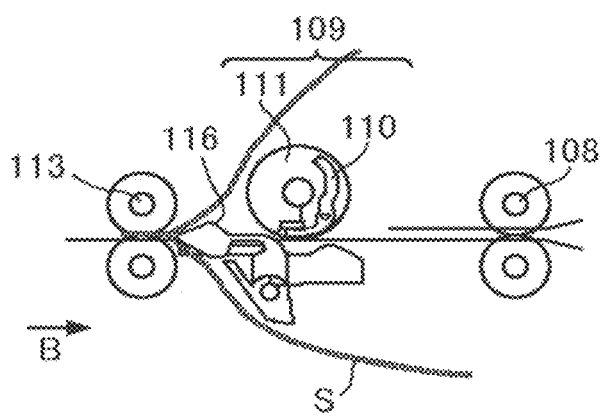
FIG. 30 is a schematic view illustrating the main part of the sheet processing device, subsequent to the state in FIG. 29.

Next, as illustrated in FIG. 30, after the separation claws 116 have separated the whole area of the trailing end of the lamination sheet S, the controller 500A of the sheet processing device 1A causes the driver to rotate the exit roller pair 113 in the counterclockwise direction in FIG. 30 to convey the lamination sheet S in the reverse conveyance direction (sheet conveyance direction B). That is, the separation claws 116 guide the two sheets separated from the lamination sheet S in the upper and lower directions, respectively, and therefore the two sheets are fully separated. This operation is referred to as a sheet separating operation.

Then, the controller 500A of the sheet processing device 1A causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that these operations are performed by conveying the lamination sheet S from the sheet sensor C5 by a specified amount in response to the timing at which the sheet sensor C5 detected the leading end of the lamination sheet S.

Figure 39A:
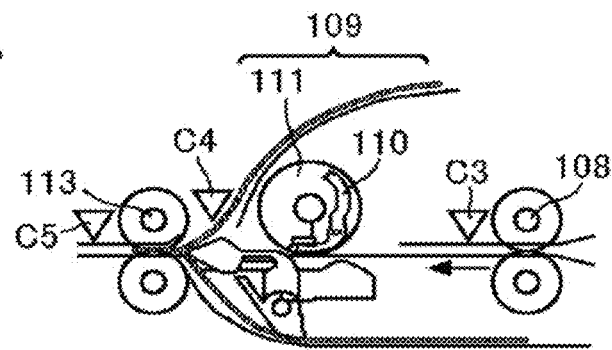
FIGS. 39A, 39B, and 39C are schematic views, each illustrating a sheet guide passage of the two sheets separated from the sheet S, according to another example of the present disclosure.
Figure 39B:
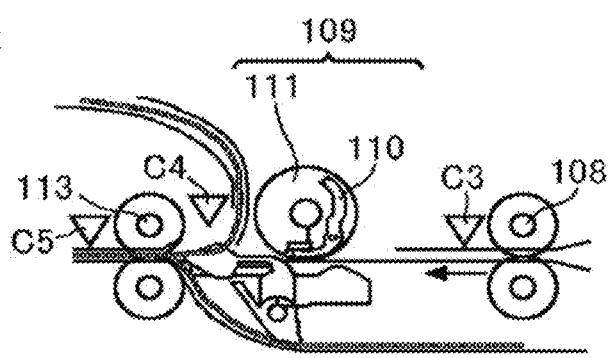
Figure 39C:
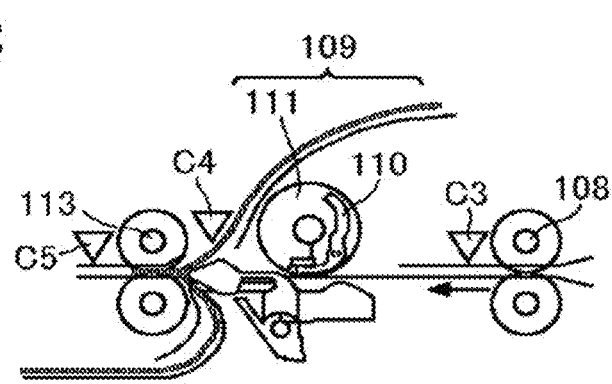

Another Example A description is given of the sheet processing device having another example of a sheet guide passage of the two sheets separated from the lamination sheet S, with reference to FIGS. 39A, 39B, and 39C.

FIGS. 39A, 39B, and 39C are schematic views, each illustrating another example of a sheet guide passage of the two sheets separated from the sheet S.

The sheet processing device 1A illustrated in FIG. 39A has the same sheet guide passages as the sheet processing device 1A illustrated in FIG. 30 to guide the upper and lower sheets in the same direction from the bonded portion of the lamination sheet S. Alternatively, as illustrated in FIG. 39B, the sheet processing device 1A may have sheet guide passages extending in different directions in an inverted S shape to guide the upper and lower sheets in different directions. Further, as illustrated in FIG. 39C, the sheet processing device 1A may have sheet guide passages extending in different directions in an S shape to guide the upper and lower sheets in different directions which are opposite the directions of the sheet guide passages in the sheet processing device 1A illustrated in FIG. 39B.

Figure 31:
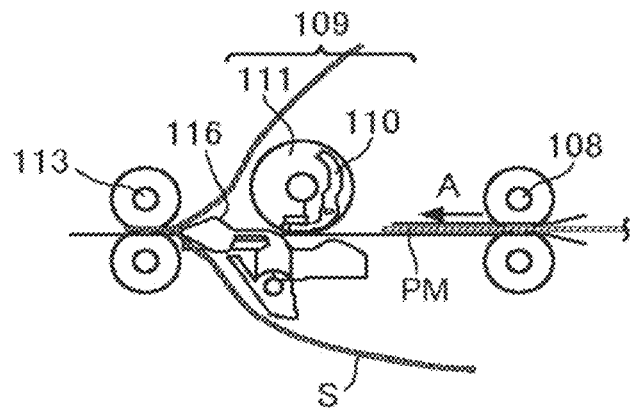
FIG. 31 is a schematic view illustrating the main part of the sheet processing device, subsequent to the state in FIG. 30.

Then, as illustrated in FIG. 31, the controller 500A of the sheet processing device 1A causes the entrance roller pair 108 to rotate to convey the inner sheet PM conveyed from the sheet feed tray 103 (see FIG. 22) toward the exit roller pair 113 in the forward conveyance direction (sheet conveyance direction A).

Figure 32:
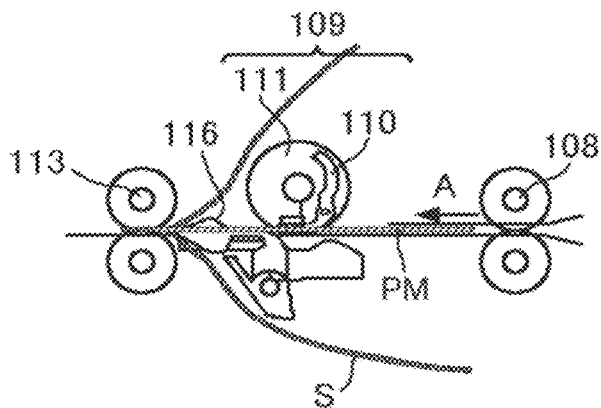
FIG. 32 is a schematic view illustrating the main part of the sheet processing device, subsequent to the state in FIG. 31.

Subsequently, as illustrated in FIG. 32, the controller 500A of the sheet processing device 1A causes the exit roller pair 113 to rotate so that the lamination sheet S and the inner sheet PM converge to insert the inner sheet PM into the lamination sheet S from the opened portion (on the other end) of the lamination sheet S.

Figure 33A:
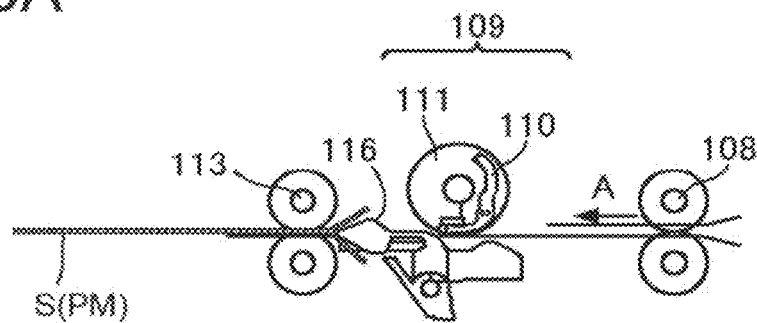
FIGS. 33A and 33B are schematic views, each illustrating the main part of the sheet processing device, subsequent to the state in FIG. 32.

Then, as illustrated in FIG. 33A, the controller 500A of the sheet processing device 1A causes the exit roller pair 113 to convey the lamination sheet S in which the inner sheet PM is inserted, in the forward conveyance direction (sheet conveyance direction A). By so doing, the two sheets of the lamination sheet S are overlapped one on another again so as to close the opened portion of the lamination sheet S. Then, a roller disposed downstream from the exit roller pair 113 ejects and stacks the lamination sheet S with the inner sheet PM inserted, on the sheet ejection tray 104 (that is, a sheet ejecting operation).

Figure 33B:
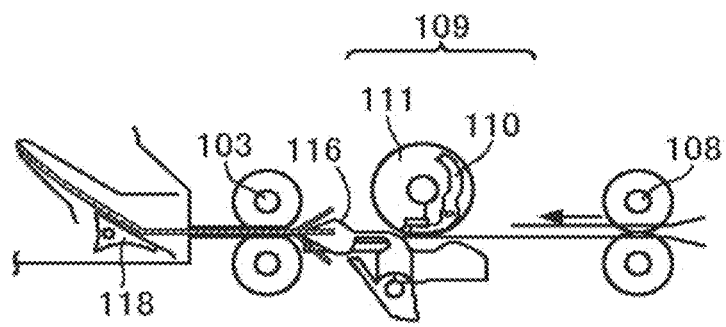

As an alternative example, in a case in which a sheet processing device includes a heat-pressure device capable of heating and pressing the lamination sheet S, as illustrated in FIG. 33B, a branching claw 118 may change (switch) the sheet conveyance passage of the lamination sheet S to convey the lamination sheet S to the heat-pressure device.

As described above, the controller 500A of the sheet processing device 1A according to the present embodiment causes the driver to open the lamination sheet S largely and perform insertion processing to insert and nip the inner sheet PM into the lamination sheet S. Accordingly, since the configuration of the sheet processing device 1A is simpler than the configuration of a known sheet laminator employing a vacuum device, the entire sheet processing device has a simpler and smaller configuration.

As illustrated in FIG. 22, the sheet processing device 1A according to the present embodiment loads the lamination sheet S and the inner sheet PM on separate trays and feeds and conveys the lamination sheet S and the inner sheet PM separately. Accordingly, the convenience is enhanced without loading the lamination sheet S and the inner sheet PM in the predetermined order. Note that, in the present embodiment, the lamination sheet S is loaded on the sheet feed tray 102 and the inner sheet PM is loaded on the sheet feed tray 103. However, the tray on which the lamination sheet S is loaded and the tray on which the inner sheet PM is loaded are not limited to the above-described trays. For example, the inner sheet PM may be loaded on the sheet feed tray 102 and the lamination sheet S may be loaded on the sheet feed tray 103.

Next, a description is given of a sheet laminator, an image forming apparatus, and an image forming system, each including the sheet processing device according to an embodiment of the present disclosure.

Figure 40:
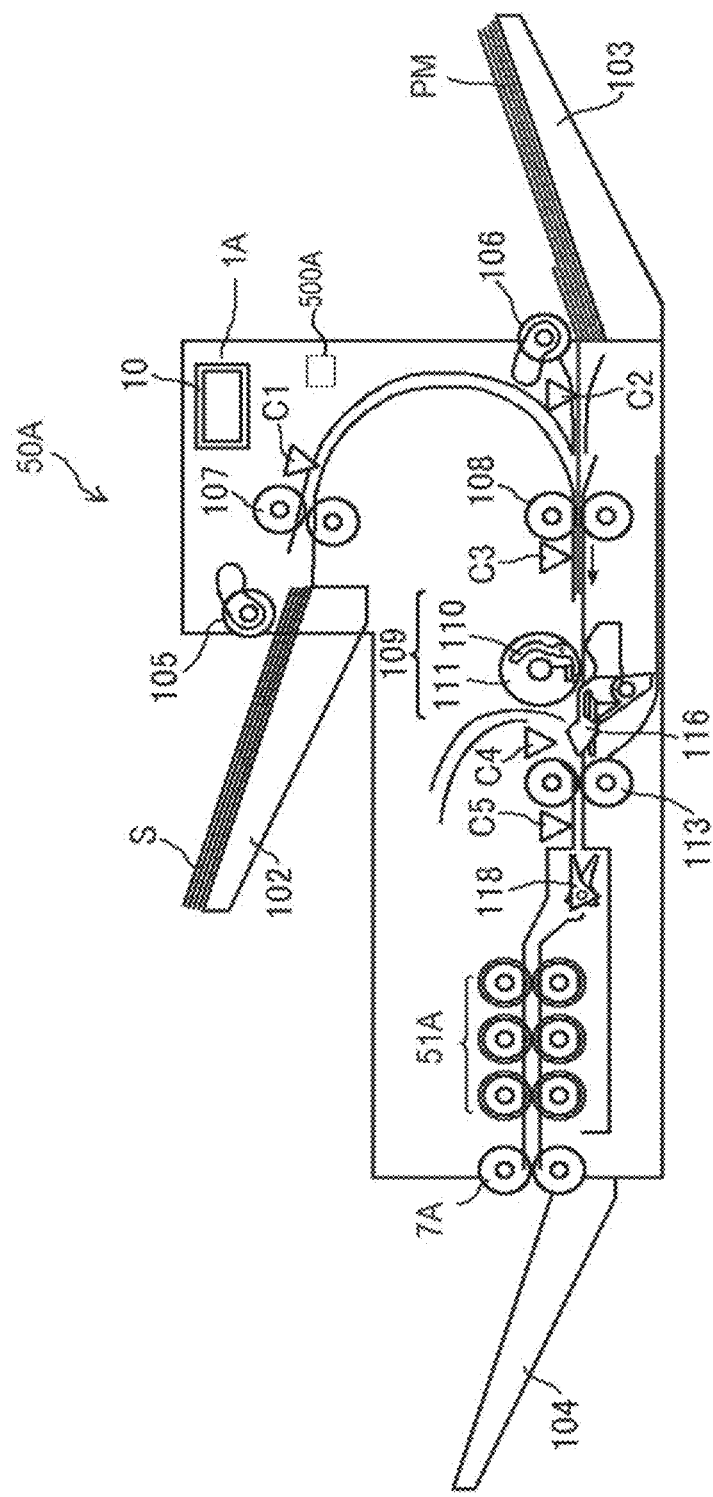
FIG. 40 is a schematic view illustrating the overall configuration of an example of a sheet laminator according to an embodiment of the present disclosure, including the sheet processing device illustrated in FIG. 22.

FIG. 40 is a schematic view illustrating the overall configuration of an example of a sheet laminator according to an embodiment of the present disclosure, including the sheet processing device illustrated in FIG. 22.

As illustrated in FIG. 40, a sheet laminator 50A includes the sheet processing device 1A, the branching claw 118, heat-pressure rollers 51A, and a sheet ejection roller 7A. The branching claw 118 changes (switches) the sheet conveyance passage of the lamination sheet S. The heat-pressure rollers 51A that function as a heat-pressure member and a sheet laminating device capable of heating and pressing the lamination sheet S. The heat-pressure rollers 51A is disposed downstream from the separator (e.g., the winding roller 109) that separates the lamination sheet S. The sheet ejection roller 7A is disposed downstream from the heat-pressure rollers 51A in the sheet conveyance direction.

The sheet laminator 50A performs a series of operations, in this order, of feeding the lamination sheet S, separating the lamination sheet S, inserting the inner sheet PM into the lamination sheet S, and laminating the lamination sheet S with the inner sheet PM being inserted, by application of heat and pressure, on a stand-alone basis. This series of operations is carried out automatically without any aid of a user, and therefore the sheet laminator 50A enhances and provides the convenience better than a know sheet laminator employing a known technique.

Figure 41:
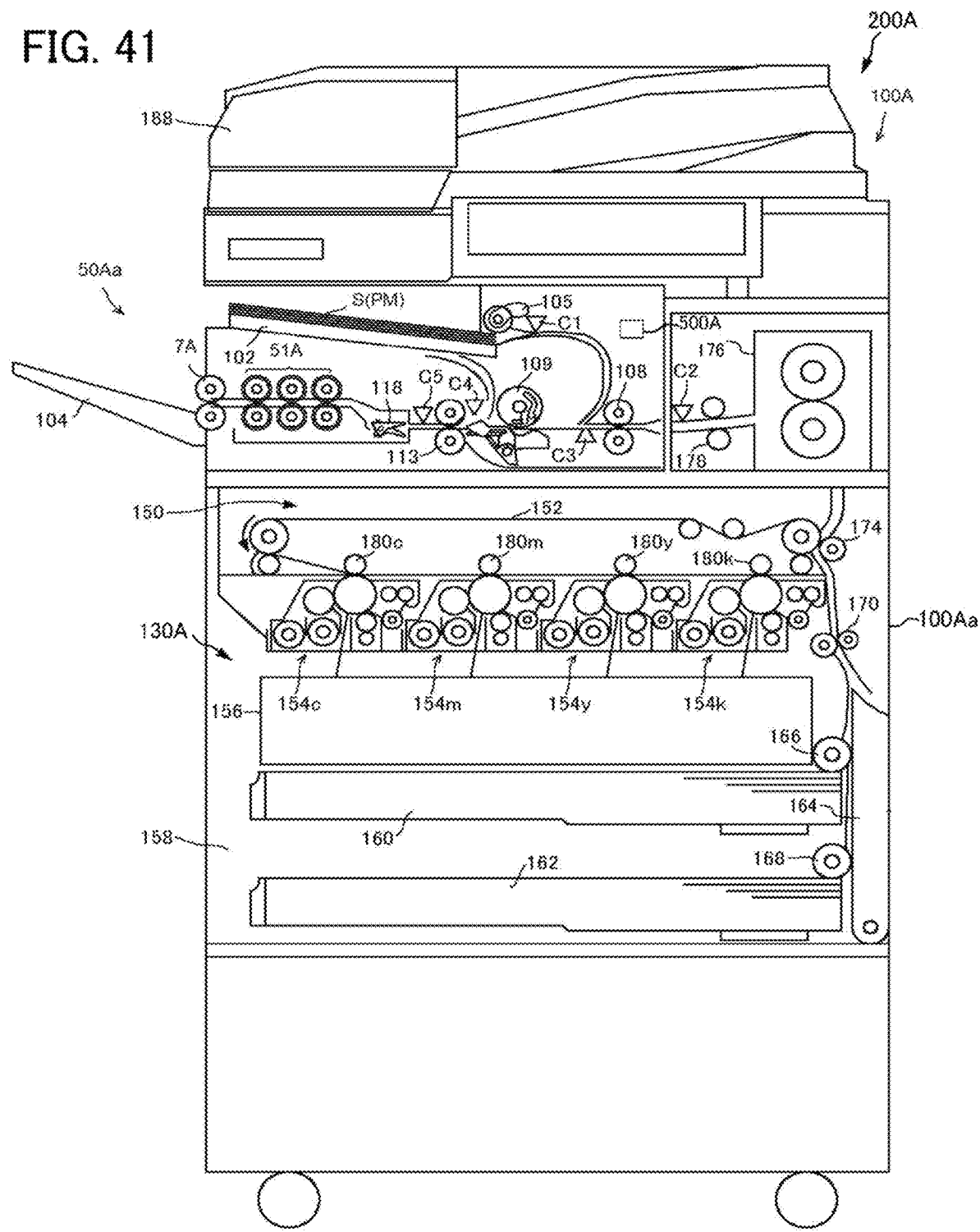
FIG. 41 is a schematic view illustrating the overall configuration of an example of an image forming apparatus according to an embodiment of the present disclosure, including the sheet laminator illustrated in FIG. 40.

FIG. 41 is a schematic view illustrating the overall configuration of an example of an image forming apparatus according to an embodiment of the present disclosure, including the sheet laminator illustrated in FIG. 40.

An image forming apparatus 100A includes the sheet laminator 50Aa as a device that performs sheet lamination in the housing 100Aa of the image forming apparatus 100A.

The sheet laminator 50Aa includes the sheet feed tray 102 on which the lamination sheet S or the inner sheet PM are loaded. The sheet laminator 50Aa is capable of receiving the lamination sheet S, the inner sheet PM, or both from the image forming apparatus 100A. Therefore, the image forming apparatus 100A (e.g., printer and copier) is capable of adding (forming) an image on the lamination sheet S or the inner sheet PM by the in-line connection.

Now, a detailed description is given of the configuration of the housing 100Aa of an image forming apparatus 100A, with reference to FIG. 41.

As illustrated in FIG. 41, an image forming apparatus 100A includes a housing 100Aa. The image forming apparatus 100A includes an intermediate transfer device 150 in the housing 100Aa. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 41.

The image forming apparatus 100A further includes an image forming device 130A including image forming units 154c, 154m, 154y, and 154k for yellow (Y), magenta (M), cyan (C), and black (K), respectively. The image forming units 154c, 154m, 154y, and 154k are disposed below the intermediate transfer device 150 in the housing 100Aa. The image forming units 154c, 154m, 154y, and 154k are arranged in a quadruple tandem manner along an extended direction of the intermediate transfer belt 152. Each of the image forming units 154c, 154m, 154y, and 154k includes a drum-shaped image bearer that rotates in the clockwise direction in FIG. 41. Various image forming components, for example, a charging device, a developing device, a transfer device, and a cleaning device, are disposed around each of the image forming units 154c, 154m, 154y, and 154k. An exposure device 156 is disposed below the image forming units 154c, 154m, 154y, and 154k in the housing 100Aa of the image forming apparatus 100A.

A sheet feeder 158 is disposed below the exposure device 156 in the housing 100Aa of the image forming apparatus 100A. The sheet feeder 158 includes a first sheet feed tray 160 that loads and contains the lamination sheet S and a second sheet feed tray 162 that loads and contains the inner sheet PM. Note that the first sheet feed tray 160 is an example of a third sheet loader on which a two-ply sheet such as the lamination sheet S is loaded. Similarly, the second sheet feed tray 162 is an example of a fourth sheet loader on which a sheet medium (e.g., the inner sheet PM) is loaded.

A first feed roller 166 is disposed at a position upper right of the first sheet feed tray 160. The first feed roller 166 feeds out the lamination sheet S one by one from the first sheet feed tray 160 to a sheet conveyance passage 164. A second feed roller 168 is disposed at a position upper right of the second sheet feed tray 162. The second feed roller 168 feeds out the inner sheet PM one by one from the second sheet feed tray 162 to the sheet conveyance passage 164.

The sheet conveyance passage 164 extends upwardly on the right side in the housing 100Aa of the image forming apparatus 100A and communicates with the sheet laminator 50Aa provided in the housing 100Aa of the image forming apparatus 100A. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Note that the first feed roller 166, the conveyance roller 170, and the sheet conveyance passage 164 are examples of a third sheet feeder to feed the two-ply sheet from the first sheet feed tray 160 (third sheet loader). Further, the second feed roller 168, the conveyance roller 170, and the sheet conveyance passage 164 are examples of a fourth sheet feeder to feed a sheet medium from the second sheet feed tray 162 (fourth sheet loader). Further, the intermediate transfer device 150 and the fixing device 176 are included in the image forming device 130A that forms an image on a two-ply sheet or a sheet medium.

Next, a description is given of operations of the image forming apparatus 100A according to the present embodiment, to form an image on the lamination sheet S and then perform a sheet laminating operation on the lamination sheet S.

When forming an image on the lamination sheet S, firstly, an image reading device 188 reads the image on an original document, and the exposure device 156 then performs image writing. Thereafter, the image forming units 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 100A rotates the first feed roller 166 to feed and convey the lamination sheet S to the sheet conveyance passage 164. Then, the lamination sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the image has been transferred onto the lamination sheet S, the fixing device 176 fixes the image on the lamination sheet S to the lamination sheet S, and the sheet ejection device 178 ejects to convey the lamination sheet S to the sheet laminator 50Aa.

Further, the image forming apparatus 100A rotates the second feed roller 168 to feed the inner sheet PM to the sheet conveyance passage 164, and the sheet ejection device 178 ejects to convey the inner sheet PM to the sheet laminator 50Aa.

As described above, the lamination sheet S on which the image has been formed and the inner sheet PM are conveyed to the sheet laminator 50Aa, so that the sheet laminating operation is performed by the sheet laminator 50Aa. Since the details of the sheet laminating operation have been described above, the redundant descriptions are omitted. According to the above-described configuration of the image forming apparatus 100A according to the present embodiment, the sheet laminator 50Aa may perform the sheet laminating operation after an image is formed on the inner sheet PM. In addition, the sheet laminator 50Aa may perform the sheet laminating operation after the image forming operation has been performed on the inner sheet PM and the lamination sheet S.

Further, an image forming system 200A may include the image forming apparatus 100A provided with the image forming device 130A, the sheet processing device 1A detachably attached to the image forming apparatus 100A or the sheet laminator 50A detachably attached to the image forming apparatus 100A.

Next, a description is given of a sheet laminator, an image forming apparatus, and an image forming system, each including the sheet processing device according to another example of the present disclosure.

Figure 42:
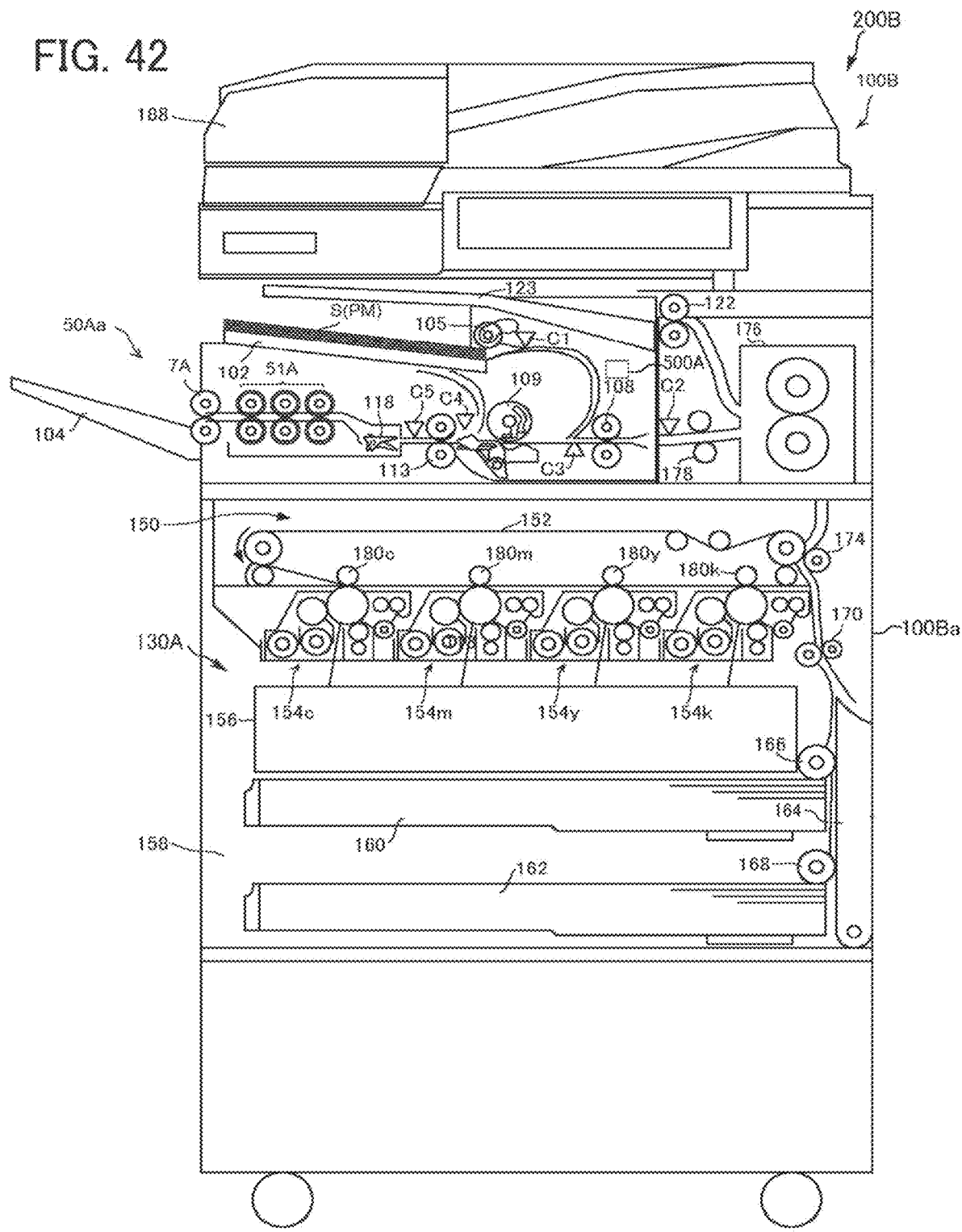
FIG. 42 is a schematic view illustrating the overall configuration of an image forming apparatus according to another example of the present disclosure, including the sheet laminator illustrated in FIG. 40.

FIG. 42 is a schematic view illustrating the overall configuration of an image forming apparatus according to another example of the present disclosure, including the sheet laminator illustrated in FIG. 40.

An image forming apparatus 100B illustrated in FIG. 42 is basically same as the image forming apparatus 100A illustrated in FIG. 41. However, different from the image forming apparatus 100A illustrated in FIG. 41, the image forming apparatus 100B includes a main ejection roller pair 122 and a main ejection tray 123, each of which is provided in a housing 100Ba of the image forming apparatus 100B.

When the sheet laminating operation is not performed, the image forming apparatus 100B may eject the recording medium on which the image is formed, by a main ejection roller pair 122 to a main ejection tray 123. Therefore, the image forming apparatus 100B does not decrease the image output speed when the sheet laminating operation is not performed.

Note that the image forming apparatus 100B may include the sheet laminator 50Aa in the housing 100Ba to be detachably attached to the housing 100Ba. That is, when the sheet laminating operation is not required, the sheet laminator 50Aa may be detached from the image forming apparatus 100B.

In addition, in the sheet laminator 50Aa thus removed, a sheet feed tray (e.g., the sheet feed tray 103 illustrated in FIG. 40) on which the inner sheet PM is loaded and a pickup roller (e.g., the pickup roller 106 illustrated in FIG. 40) to feed the inner sheet PM from the sheet feed tray 103 may be attached to the sheet laminator 50Aa, so that the sheet laminator 50Aa is used as a stand-alone machine similar to the sheet laminator 50Aa illustrated in FIG. 40.

The image forming apparatus 100A illustrated in FIG. 41 and the image forming apparatus 100B illustrated in FIG. 42 may include a sheet processing device instead of the sheet laminator 50Aa. Further, the image forming apparatus 100B illustrated in FIG. 42 may include a sheet processing device that is detachably attached to the image forming apparatus 100B.

Further, an image forming system 200B may include the image forming apparatus 100B provided with the image forming device 130A, the sheet processing device 1A detachably attached to the image forming apparatus 100B or the sheet laminator 50A detachably attached to the image forming apparatus 100B. Furthermore, another image forming system may further include at least one of a sheet feeder (a stacker), a case binding device, or both. Note that, in a case in which the lamination sheet S passes through the fixing device 176, the lamination sheet S is not bonded at the fixing temperature but is bonded by application of heat higher than the fixing temperature.

Although the image forming apparatus 100A illustrated in FIG. 41 and the image forming apparatus 100B illustrated in FIG. 42 employ electrophotography for image formation on the lamination sheet S and the inner sheet PM in the description above, the image formation method is not limited to the above-described configuration. For example, inkjet, stencil printing, or other printing method may be employed to the image forming apparatuses 100A and 100B.

Figure 43A:
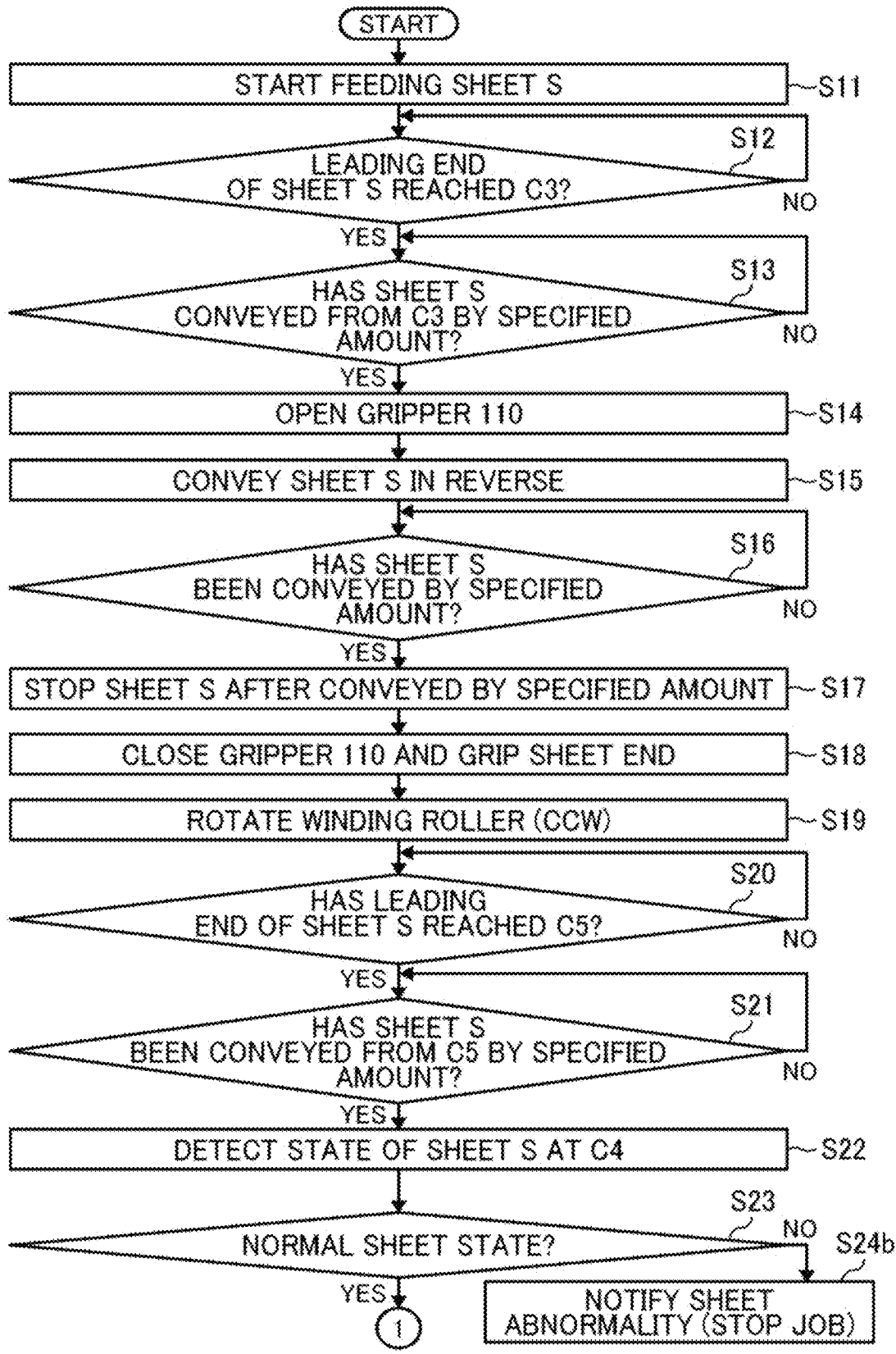
FIGS. 43A and 43B is a flowchart illustrating a series of operations from feeding a two-ply sheet, inserting an inner sheet, and laminating the two-play sheet with the inner sheet being inserted.
Figure 43B:
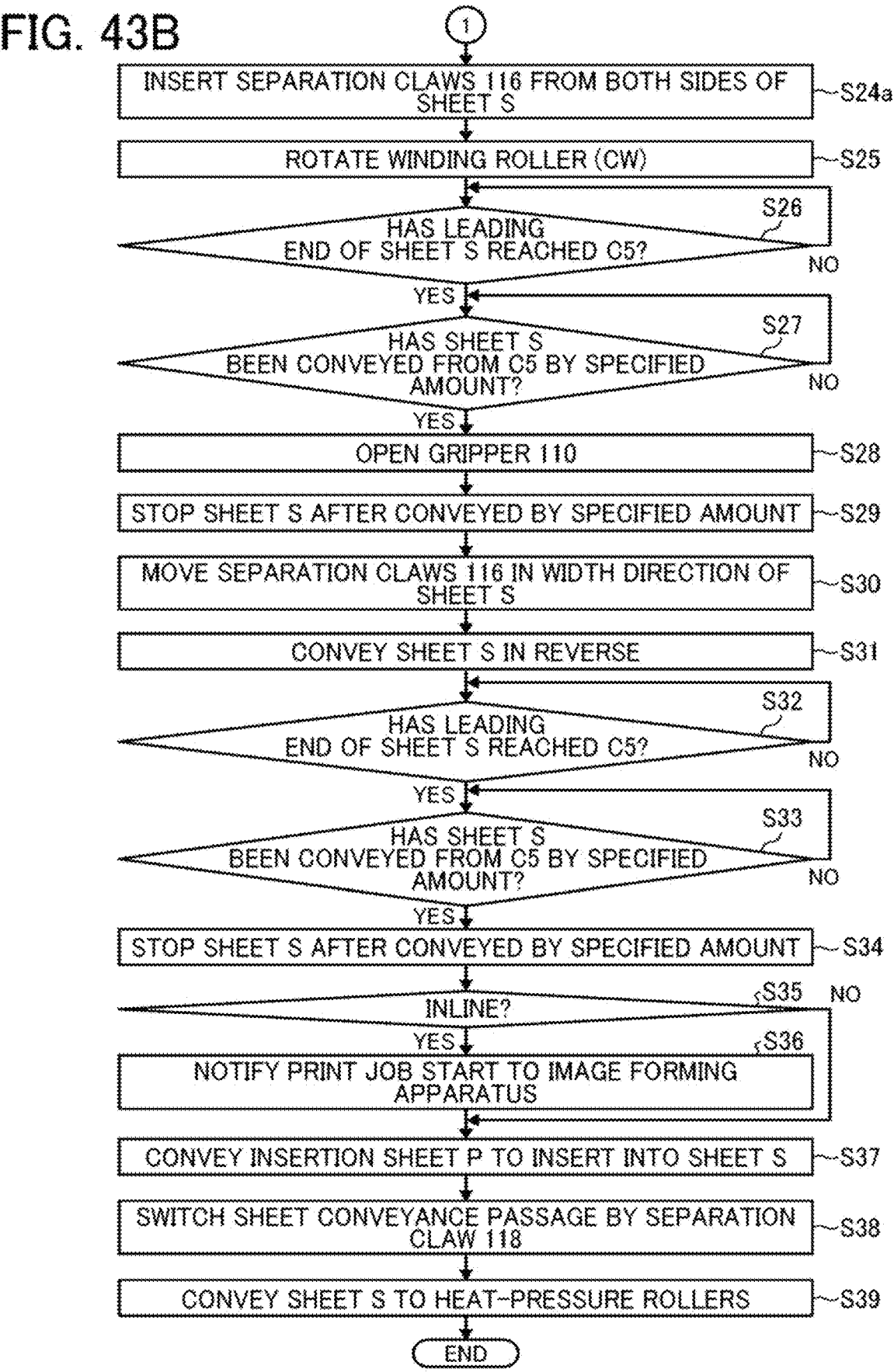

FIG. 43 including FIGS. 43A and 43B is a flowchart illustrating a series of operations of feeding a two-ply sheet, inserting an inner sheet, and laminating the two-play sheet with the inner sheet being inserted.

A description is given of the series of operations, with reference to the reference numerals indicated in the flowchart of FIG. 43 including FIGS. 43A and 43B.

Next, in step S11 of FIG. 43A, the controller 500A of the sheet processing device 1A causes the driver to start feeding the lamination sheet S (see FIG. 22). In step S12 of FIG. 43A, the controller 500A of the sheet processing device 1A determines whether the leading end of the lamination sheet S has reached the sheet sensor C3 based on the detection result of the sheet sensor C3 (see FIG. 23). When the leading end of the lamination sheet S has not reached the sheet sensor C3 (NO in step S12 of FIG. 43A), step S12 is repeated until the leading end of the lamination sheet S reaches the sheet sensor C3. By contrast, when the leading end of lamination sheet S has reached the sheet sensor C3 (YES in step S12 of FIG. 43A), the series of operations in the flowchart of FIG. 43 including FIGS. 43A and 43B goes on to step S13. In step S13 of FIG. 43A, the controller 500A determines whether the lamination sheet S has been conveyed by the specified amount from the sheet sensor C3, that is, whether a specified time has passed since the sheet sensor C3 detects the leading end of the lamination sheet S. When the lamination sheet S has not been conveyed by the specified amount from the sheet sensor C3 (NO in step S13 of FIG. 43A), step S13 is repeated until the lamination sheet S is conveyed by the specified amount from the sheet sensor C3. By contrast, when the lamination sheet S has been conveyed by the specified amount from the sheet sensor C3 (YES in step S13 of FIG. 43A), the controller 500A of the sheet processing device 1A causes the driver to temporarily stop conveying the lamination sheet S (see FIGS. 24). For example, the "specified amount" used here and those in subsequent steps are stored in a memory by a manufacturer based on empirical data. Subsequently, the controller 500A of the sheet processing device 1A causes the driver to open the sheet gripper 110 in step S14 of FIG. 43A. Then, the controller 500A causes the driver to convey the lamination sheet S in the reverse conveyance direction in step S15 of FIG. 43A (see FIG. 25).

In step S16 of FIG. 43A, the controller 500A of the sheet processing device 1A determines whether the lamination sheet S has been conveyed by a specified amount. When the lamination sheet S has not been conveyed by the specified amount (NO in step S16 of FIG. 43A), step S16 is repeated until the lamination sheet S is conveyed by the specified amount. By contrast, when the lamination sheet S has been conveyed by the specified amount (YES in step S16 of FIG. 43A), the controller 500A causes the driver to temporarily stop conveying the lamination sheet S in step S17 of FIG. 43A. In step S18 of FIG. 43A, the controller 500A causes the driver to close the sheet gripper 110 to grip the end of the lamination sheet S (see FIG. 26).

In step S19 of FIG. 43A, the controller 500A of the sheet processing device 1A causes the driver to rotate the winding roller 109 in the counterclockwise direction (i.e., in the reverse direction) and wind the lamination sheet S around the winding roller 109 (see FIG. 27). In step S20 of FIG. 43A, the controller 500A determines whether the leading end of the lamination sheet S has reached at the sheet sensor C5. When the leading end of the lamination sheet S has not reached the sheet sensor C5 (NO in step S20 of FIG. 43A), step S20 is repeated until the leading end of the lamination sheet S reaches the sheet sensor C5. By contrast, when the leading end of lamination sheet S has reached the sheet sensor C5 (YES in step S20 of FIG. 43A), the series of operations in the flowchart of FIG. 43 including FIGS. 43A and 43B goes on to step S21. In step S21 of FIG. 43A, the controller 500A of the sheet processing device 1A determines whether the lamination sheet S has been conveyed by the specified amount from the sheet sensor C5. When the lamination sheet S has not been conveyed by the specified amount from the sheet sensor C5 (NO in step S21 of FIG. 43A), step S21 is repeated until the lamination sheet S is conveyed by the specified amount from the sheet sensor C5. By contrast, when the lamination sheet S has been conveyed by the specified amount from the sheet sensor C5 (YES in step S21 of FIG. 43A), the controller 500A causes the abnormality state detector C4 to detect the state of the lamination sheet S in step S22 of FIG. 43A. Then, the controller 500A determines whether the state of the lamination sheet S is normal based on the detection results of the abnormality state detector C4 in step S23 of FIG. 43A.

The abnormality state detector C4 is an abnormality detector to detect the size of the gap between the two sheets of the lamination sheet S for the sheet processing device 1A to determine whether or not the size of the gap exceeds the predetermined threshold. In step S23 of FIG. 43A, the controller 500A of the sheet processing device 1A determines whether the state of the lamination sheet S is normal, that is, whether the size of the gap between the two sheets of the lamination sheet S is equal to or greater than the predetermined threshold based on the detection result of the abnormality state detector C4. When the state of the lamination sheet S is normal (YES in step S23 of FIG. 43A), the series of operations in the flowchart of FIG. 43 including FIGS. 43A and 43B goes on to step S24a.

By contrast, when it is determined that the state of the lamination sheet S is abnormal, in other words, when the size of the gap is smaller than the predetermined threshold (NO in step S23 of FIG. 43A), the controller 500A of the sheet processing device 1A causes the control panel 10 to display the abnormality (e.g., displays an error message) and stops the series of operations of sheet processing job in step S24b of FIG. 43A.

In step S24a of FIG. 43B, the controller 500A of the sheet processing device 1A causes the driver to insert the separation claws 116 from both sides of the lamination sheet S into the gap between the sheets of the lamination sheet S (see FIG. 28). In step S25 of FIG. 43B, the controller 500A of the sheet processing device 1A causes the driver to rotate the winding roller 109 in the clockwise direction (i.e., in the forward direction) with the separation claws 116 inserted from both sides of the lamination sheet S, and convey the lamination sheet S in the forward conveyance direction.

Then, in step S26 of FIG. 43B, the controller 500A determines whether the leading end of the lamination sheet S has reached the sheet sensor C5. When the leading end of the lamination sheet S has not reached the sheet sensor C5 (NO in step S26 of FIG. 43B), step S26 is repeated until the leading end of the lamination sheet S reaches the sheet sensor C5. By contrast, when the leading end of lamination sheet S has reached the sheet sensor C5 (YES in step S26 of FIG. 43B), the series of operations in the flowchart of FIG. 43 including FIGS. 43A and 43B goes on to step S27. In step S27 of FIG. 43B, the controller 500A of the sheet processing device 1A determines whether the lamination sheet S has been conveyed by the specified amount from the sheet sensor C5. When the lamination sheet S has not been conveyed by the specified amount from the sheet sensor C5 (NO in step S27 of FIG. 43B), step S27 is repeated until the lamination sheet S is conveyed by the specified amount from the sheet sensor C5. By contrast, when the lamination sheet S has been conveyed by the specified amount from the sheet sensor C5 (YES in step S27 of FIG. 43B), the controller 500A causes the driver to open the sheet gripper 110 in step S28 of FIG. 43B.

Then, the controller 500A of the sheet processing device 1A causes the driver to temporarily stop conveying the lamination sheet S after the lamination sheet S has been conveyed by the specified amount in step S29 of FIG. 43B. Then, in step S30 of FIG. 43B, the controller 500A causes the separation claws 116 to move further in the sheet width direction of the lamination sheet S (see FIG. 29). As a result, the trailing end of the lamination sheet S in the forward conveyance direction is separated into the upper and lower sheets.

In step S31 of FIG. 43B, the controller 500A of the sheet processing device 1A causes the driver to convey the lamination sheet S in the reverse conveyance direction. Then, in step S32 of FIG. 43B, the controller 500A determines whether the leading end of the lamination sheet S in the forward conveyance direction has reached the sheet sensor C5. When the leading end of the lamination sheet S has not reached the sheet sensor C5 (NO in step S32 of FIG. 43B), step S32 is repeated until the leading end of the lamination sheet S reaches the sheet sensor C5. By contrast, when the leading end of lamination sheet S has reached the sheet sensor C5 (YES in step S32 of FIG. 43B), the series of operations in the flowchart of FIG. 43 including FIGS. 43A and 43B goes on to step S33. In step S33 of FIG. 43B, the controller 500A of the sheet processing device 1A determines whether the lamination sheet S has been conveyed by a specified amount from the sheet sensor C5. When the lamination sheet S has not been conveyed by the specified amount from the sheet sensor C5 (NO in step S33 of FIG. 43B), step S33 is repeated until the lamination sheet S is conveyed by the specified amount from the sheet sensor C5. By contrast, when the lamination sheet S has been conveyed by the specified amount from the sheet sensor C5 (YES in step S33 of FIG. 43B), the controller 500A causes the driver to temporarily stop conveying the lamination sheet S in step S34 of FIG. 43B (see FIG. 30). As a result, the separation of the lamination sheet S is completed.

Subsequently, in step S35 of FIG. 43B, the controller 500A of the sheet processing device 1A determines whether or not to perform the image forming operation (with an inline image forming apparatus) on the inner sheet PM to be inserted into the lamination sheet S. When the image forming operation is performed with an inline image forming apparatus (YES in step S35 of FIG. 43B), the controller 500A of the sheet processing device 1A sends a signal to notify the inline image forming apparatus to start the print job (printing operation) to form an image on the inner sheet PM in step S36 of FIG. 43B. Then, the series of operations moves on to step S37 of FIG. 43B.

By contrast, when the image forming operation is not performed with an inline image forming apparatus (NO in step S35 of FIG. 43B), the series of operations moves on to step S37 of FIG. 43B.

In step S37 of FIG. 43B, the controller 500A of the sheet processing device 1A causes the driver to convey the inner sheet PM in the forward conveyance direction to be inserted into the opened portion of the lamination sheet S (see FIGS. 31 and 32).

Then, in step S38 of FIG. 43B, the controller 500A causes the driver to rotate the branching claw 118 to switch (change) the sheet conveyance passage of the lamination sheet S. In step S39, the controller 500A causes the lamination sheet S in which the inner sheet PM is inserted and nipped, to be conveyed to the heat-pressure device (heat-pressure rollers 51A) where heat and pressure are applied to the lamination sheet S to complete the sheet laminating operation (see FIG. 33B).

Next, a description is given of the configuration of the sheet processing device 1A.

In the sheet processing device 1A according to the embodiment of the present disclosure, the lamination sheet S functions as a two-ply sheet made of two sheets overlapped and bonded together at one end and the inner sheet PM functions as a sheet medium is nipped by the lamination sheet S. The sheet processing device 1A includes the sheet feed tray 102 that functions as a first sheet loader to load the lamination sheet S and the sheet feed tray 103 that functions as a second sheet loader to load the inner sheet PM that functions as a sheet medium. Further, the sheet processing device 1A includes the winding roller 109 that functions as a separator that separates the lamination sheet S, and a sheet detector that detects the end of the sheet separating operation of the lamination sheet S. In the sheet processing device 1A, the controller 500A stops conveying the inner sheet PM after the inner sheet PM has been fed and before the inner sheet PM reaches the winding roller 109. Then, the sheet detector detects the end of sheet separating operation. Thereafter, the controller 500A starts conveying the inner sheet PM again. With this operation, the inner sheet PM is conveyed closer to the winding roller 109, thereby reducing the time required for the sheet processing and enhancing the productivity. The description of the sheet detector to detect the end of the sheet separating operation of the lamination sheet S is given below.

Figure 44:
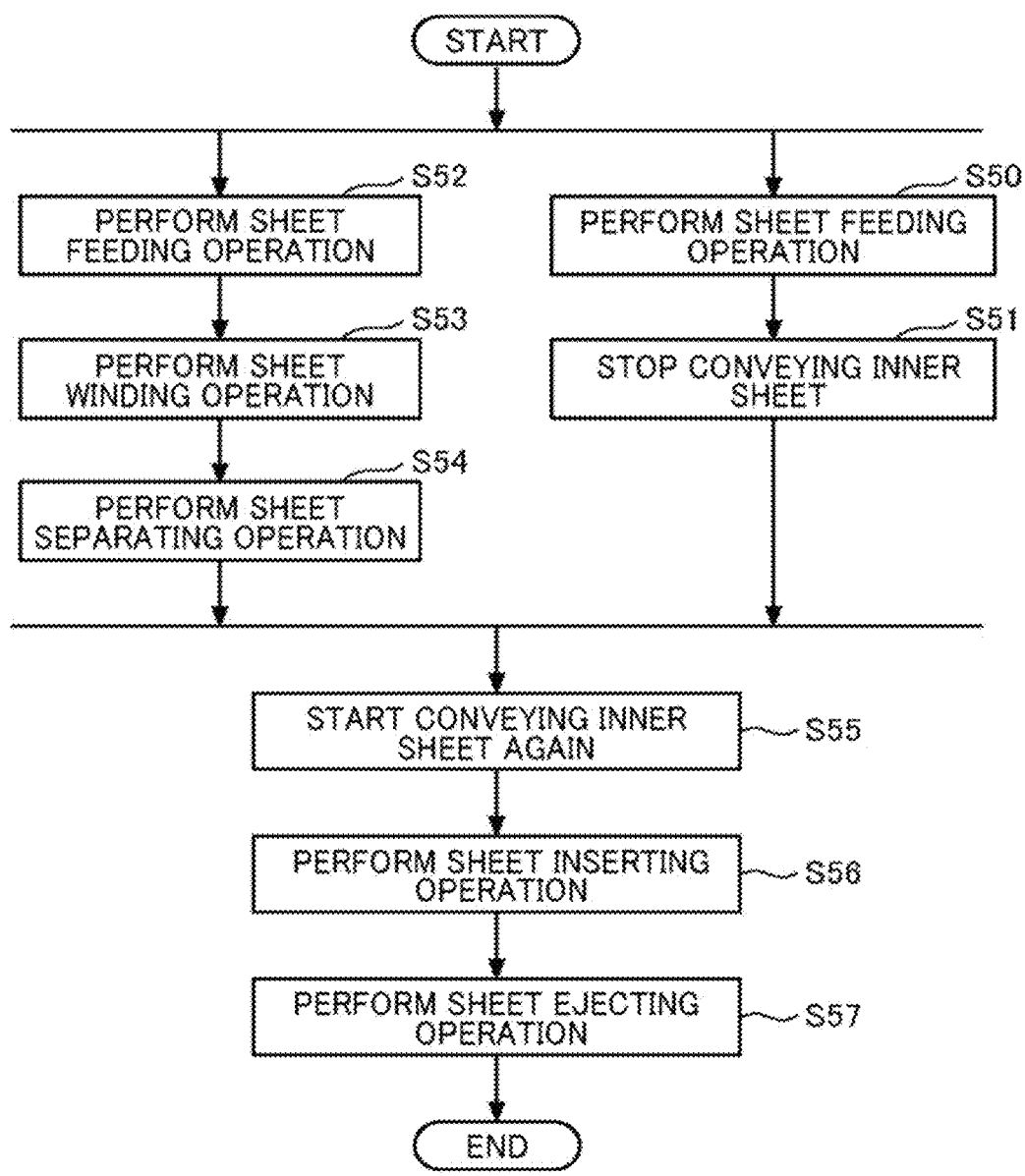
FIG. 44 is a flowchart illustrating a sheet conveying operation of the two-ply sheet and the inner sheet, according to an embodiment of the present disclosure.

FIG. 44 is a flowchart illustrating a sheet conveying operation of a lamination sheet and an inner sheet, according to an embodiment of the present disclosure.

As the controller 500A starts the sheet processing, the sheet processing device 1A performs the sheet feeding operation of the inner sheet PM in step S50 of FIG. 44 (see FIG. 22). Then, the controller 500A causes the driver to temporarily stop conveying the inner sheet PM in step S51 of FIG. 44.

By contrast, as the controller 500A of the sheet processing device 1A starts the sheet processing, the sheet processing device 1A performs the sheet feeding operation of the lamination sheet S in step S52 of FIG. 44 (see FIG. 22), performs the sheet winding operation of the lamination sheet S in step S53 of FIG. 44 (see FIG. 27), and performs the sheet separating operation of the lamination sheet S in step S54 of FIG. 44 (see FIG. 30).

After completion of the sheet separating operation, the controller 500A of the sheet processing device 1A causes the driver to start conveying the inner sheet PM again in step S55 of FIG. 44. Then, the sheet processing device 1A performs the sheet inserting operation of the inner sheet PM into the lamination sheet S in step S56 of FIG. 44 (see FIG. 32), and performs the sheet ejecting operation in step S57 of FIG. 44 (see FIG. 33).

The sheet processing device 1A includes the sheet detector that detects the end of the sheet separating operation of the lamination sheet S. The sheet detector is a sheet sensor disposed on the sheet conveyance passage of the lamination sheet S. Therefore, in response to the change of the state of the sheet sensor, the end of the sheet separating operation of the lamination sheet S is determined. Accordingly, the sheet processing device 1A measures the timing of the end of the sheet separating operation of the lamination sheet S, and therefore obtains the optimum productivity. The sheet sensor particularly refers to the sheet sensor C3 that is an entrance sensor, the sheet sensor C5 that is an exit sensor, and a sheet sensor C1 that is a sheet feed sensor.

Instead of the detection by the sheet sensor, the sheet detector may be a time measuring unit that measures a specified elapsed time for each size of the lamination sheet S after the lamination sheet S is fed. In this case, the end of the sheet separating operation is determined when the specified time has elapsed after the lamination sheet S is fed. Since the specified time from the sheet feeding operation differs depending on the size of the lamination sheet S, the specified time is switched depending on the size of the lamination sheet S. Accordingly, the sheet processing device 1A obtains the optimum productivity for each size of the lamination sheet S.

Figure 45:
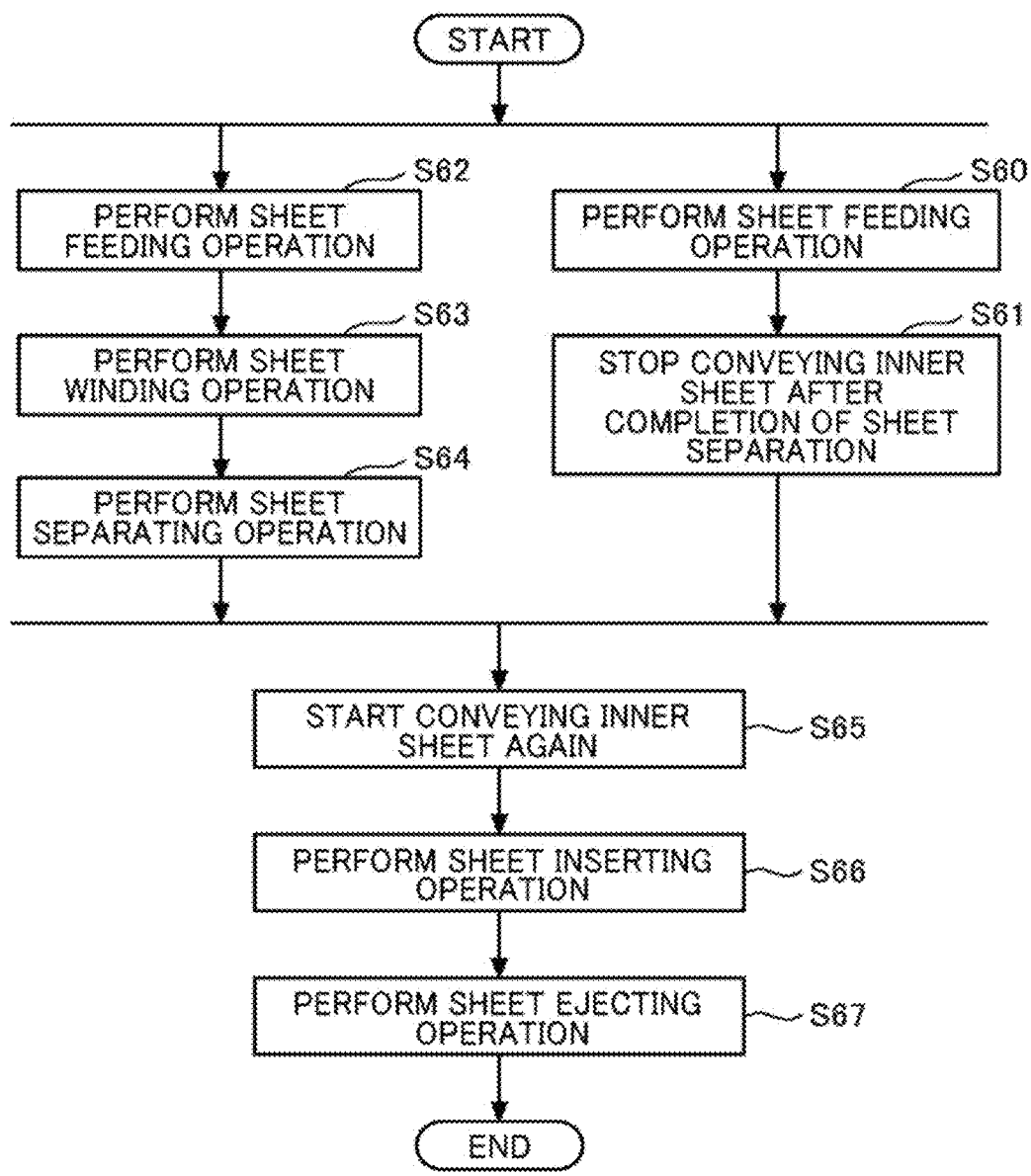
FIG. 45 is a flowchart illustrating the sheet conveying operation of the two-ply sheet and the inner sheet, according to another embodiment of the present disclosure.

FIG. 45 is a flowchart illustrating the sheet conveying operation of the lamination sheet and the inner sheet, according to another embodiment of the present disclosure.

As the controller 500A starts the sheet processing, the sheet processing device 1A performs the sheet feeding operation of the inner sheet PM in step S60 of FIG. 45 (see FIG. 22). Then, the controller 500A causes the driver to temporarily stop conveying the inner sheet PM after completion of separation and conveyance of the inner sheet PM, in step S61 of FIG. 45. With this operation, the inner sheet PM is conveyed to the position at which the separation and conveyance of the inner sheet PM is completed, thereby further reducing the time required for the sheet processing and further enhancing the productivity of the sheet processing device 1A.

Here, the completion of separation and conveyance of the inner sheet PM indicates, for example, the state in which the uppermost inner sheet PM of one inner sheet PM or a plurality of inner sheets PM loaded on the sheet feed tray 103 is picked up by the pickup roller 106 to be fed from the sheet feed tray 103 or separated from the remaining inner sheets PM. Further, the separation and conveyance completion position of the inner sheet PM is, for example, a position at which the leading end of the inner sheet PM is between the entrance roller pair 108 and the winding roller 109, in particular, immediately before the winding roller 109.

On the other hand, as the controller 500A starts the sheet feeding, the sheet processing device 1A performs the sheet feeding operation of the lamination sheet S in step S62 of FIG. 45 (see FIG. 22), performs the sheet winding operation of the lamination sheet S in step S63 of FIG. 45 (see FIG.

27), and performs the sheet separating operation of the lamination sheet S in step S64 of FIG. 45 (see FIG. 30).

After completion of the sheet separating operation, the controller 500A of the sheet processing device 1A causes the driver to start conveying the inner sheet PM again in step S65 of FIG. 45. Then, the sheet processing device 1A performs the sheet inserting operation of the inner sheet PM into the lamination sheet S in step S66 of FIG. 45 (see FIG. 32), and performs the sheet ejecting operation in step S67 of FIG. 45 (see FIG. 33).

Figure 46:
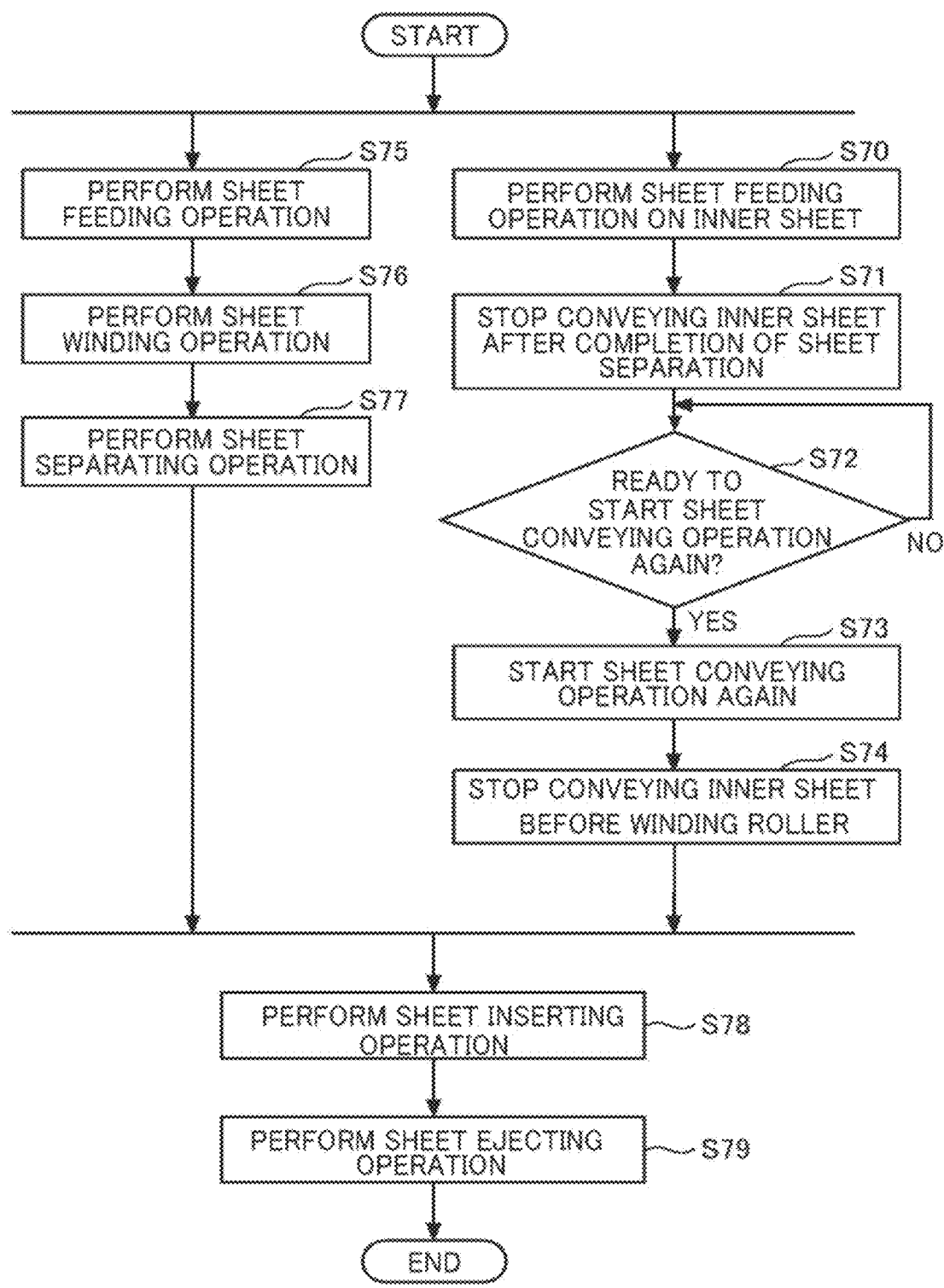
FIG. 46 is a flowchart illustrating the sheet conveying operation of the two-ply sheet and the inner sheet, according to yet another embodiment of the present disclosure.

FIG. 46 is a flowchart illustrating the sheet conveying operation of the lamination sheet and the inner sheet, according to yet another embodiment of the present disclosure. As the controller 500A starts the sheet processing, the sheet processing device 1A performs the sheet feeding operation of the inner sheet PM in step S70 of FIG. 46 (see FIG. 22). Then, the controller 500A causes the driver to temporarily stop conveying the inner sheet PM after completion of separation and conveyance of the inner sheet PM, in step S71 of FIG. 46.

Next, the controller 500A of the sheet processing device 1A determines whether the sheet processing device 1A is ready to start the sheet conveying operation of the inner sheet PM again in step S72 in FIG. 46. When the sheet processing device 1A is not ready to start the sheet conveying operation of the inner sheet PM again (NO in step S72 in FIG. 46), step S72 is repeated until the sheet processing device 1A becomes ready to start the sheet conveying operation of the inner sheet PM again. By contrast, when the sheet processing device 1A is ready to start the sheet conveying operation of the inner sheet PM again (YES in step S72 in FIG. 46), the sheet processing device 1A starts the sheet conveying operation of the inner sheet PM again in step S73 of FIG. 46. Then, the controller 500A of the sheet processing device 1A causes the driver to stop conveying the inner sheet PM before the winding roller 109 in step S74 of FIG. 46. With this operation, the inner sheet PM is conveyed before the winding roller 109, thereby further reducing the time required for the sheet processing and enhancing the productivity of the sheet processing device 1A.

In step S72, as long as the trailing end of the lamination sheet S has passed the entrance roller pair 108 that functions as a sheet conveyor disposed upstream from the winding roller 109 and the leading end of the inner sheet PM has not reached the entrance roller pair 108 or has just reached the entrance roller pair 108, the controller 500A determines that the sheet processing device 1A is ready to start the sheet conveying operation of the inner sheet PM again.

On the other hand, as the controller 500A starts the sheet feeding, the sheet processing device 1A performs the sheet feeding operation of the lamination sheet S in step S75 of FIG. 46 (see FIG. 22), performs the sheet winding operation of the lamination sheet S in step S76 of FIG. 46 (see FIG. 27), and performs the sheet separating operation of the lamination sheet S in step S77 of FIG. 46 (see FIG. 30).

After completion of the sheet separating operation, the sheet processing device 1A performs the sheet inserting operation of the inner sheet PM into the lamination sheet S in step S78 of FIG. 46 (see FIG. 32), and performs the sheet ejecting operation in step S79 of FIG. 46 (see FIG. 33).

As described above, according to the present disclosure, the inner sheet PM is fed, and then the conveyance of the inner sheet PM is stopped. Then, after the end of the sheet separating operation of the lamination sheet S, the conveyance of the inner sheet PM is started again. By so doing, the productivity of the sheet processing device is enhanced.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing device configured to insert an inner sheet between two sheets of a two-ply sheet, the sheet processing device comprising:
   a first sheet loader to load the two-ply sheet;
   a second sheet loader to load the inner sheet;
   a separator to separate the two-ply sheet;
   a sensor to detect an end of a sheet separating operation of the two-ply sheet; and
   circuitry configured to:
   feed the inner sheet;
   temporarily stop the inner sheet after a start of a sheet feeding operation of the inner sheet;
   separate the two-ply sheet;
   cause the sensor to detect the end of the sheet separating operation of the two-ply sheet; and
   start conveyance of the inner sheet in response to a detection of the end of the sheet separating operation of the two-ply sheet.

2. The sheet processing device according to claim 1, wherein the circuitry is configured to:
   stop conveyance of the inner sheet after completion of separation and conveyance of the inner sheet; and
   start the conveyance of the inner sheet after completion of the sheet separating operation of the two-ply sheet.

3. The sheet processing device according to claim 1, wherein the circuitry is configured to:
   stop conveyance of the inner sheet after completion of separation and conveyance of the inner sheet;

start the conveyance of the inner sheet after a trailing end of the two-ply sheet passes through a conveyor disposed upstream from the separator in a conveyance direction of the inner sheet and before a leading end of the inner sheet reaches the conveyor;

stop the conveyance of the inner sheet when the leading end of the inner sheet is between the conveyor and the separator; and start the conveyance of the inner sheet after completion of the sheet separating operation of the two-ply sheet.

4. The sheet processing device according to claim 1, wherein the sensor includes a sheet sensor disposed on a sheet conveyance passage of the two-ply sheet.

5. The sheet processing device according to claim 1, wherein the sensor includes a time measuring unit configured to measure a specified elapsed time for each size of the two-ply sheet after the two-ply sheet is fed.

6. A sheet laminator comprising:

the sheet processing device according to claim 1; and a heat-pressure member disposed downstream from the separator in the conveyance direction of the two-ply sheet, the heat-pressure member being configured to apply heat and pressure to the two-ply sheet.

7. An image forming apparatus comprising the sheet processing device according to claim 1.

8. An image forming system comprising the sheet processing device according to claim 1.

* * * * *